United States Patent
Suzuki et al.

(10) Patent No.: US 9,069,655 B2
(45) Date of Patent: Jun. 30, 2015

(54) ON-VEHICLE APPARATUS, AND METHOD AND COMPUTER PROGRAM FOR TRANSMITTING POSITIONAL INFORMATION

(71) Applicant: JVC KENWOOD Corporation, Kanagawa (JP)

(72) Inventors: Takumi Suzuki, Sagamihara (JP); Koichi Nakajima, Fussa (JP)

(73) Assignee: JVC Kenwood Corporation, Kanagawa (JP)

( * ) Notice: Subject to any disclaimer, the term of this patent is extended or adjusted under 35 U.S.C. 154(b) by 209 days.

(21) Appl. No.: 13/725,467

(22) Filed: Dec. 21, 2012

(65) Prior Publication Data

US 2013/0173879 A1    Jul. 4, 2013

(30) Foreign Application Priority Data

Dec. 28, 2011  (JP) .................................. 2011-289759
Dec. 28, 2011  (JP) .................................. 2011-289760
Dec. 28, 2011  (JP) .................................. 2011-289761

(51) Int. Cl.

| | |
|---|---|
| G06F 12/02 | (2006.01) |
| G08G 1/01 | (2006.01) |
| G08G 1/0969 | (2006.01) |
| G01C 21/26 | (2006.01) |
| G08G 1/0968 | (2006.01) |

(52) U.S. Cl.
CPC ................ *G06F 12/02* (2013.01); *G01C 21/26* (2013.01); *G08G 1/0112* (2013.01); *G08G 1/096827* (2013.01); *G08G 1/0969* (2013.01)

(58) Field of Classification Search
CPC .... G06F 12/02; G08G 1/0112; G08G 1/0969; G08G 1/096827; G01C 21/26
USPC .......................................................... 701/517
See application file for complete search history.

(56) References Cited

U.S. PATENT DOCUMENTS

| | | | | |
|---|---|---|---|---|
| 6,810,325 | B2 * | 10/2004 | Amano et al. ................. | 701/517 |
| 7,102,491 | B2 * | 9/2006 | Ando et al. ................. | 340/426.1 |
| 7,236,878 | B2 * | 6/2007 | Watanabe ..................... | 701/517 |
| 7,599,794 | B2 * | 10/2009 | Nou ............................. | 701/484 |
| 8,219,052 | B2 * | 7/2012 | Ueoka et al. ............... | 455/161.1 |

FOREIGN PATENT DOCUMENTS

JP   2011-154494   8/2011

* cited by examiner

*Primary Examiner* — Mary Cheung
*Assistant Examiner* — Frederick Brushaber
(74) *Attorney, Agent, or Firm* — Louis Woo

(57) ABSTRACT

At every first prescribed timing, a positional information piece is generated. Each generated positional information piece represents a position of a vehicle which occurs at the corresponding first prescribed timing. Each generated positional information piece is written into one of storage areas in a storage device. At every second prescribed timing, positional information pieces in the storage areas are sent to a positional information collecting apparatus, and new positional information pieces are allowed to be written into the storage areas in which the sent positional information pieces are stored. In the event that sending the positional information pieces in the storage areas to the positional information collecting apparatus is impossible, a new positional information piece or pieces are allowed to be written into one or more of the storage areas which store a positional information piece or pieces having not been sent yet.

10 Claims, 32 Drawing Sheets

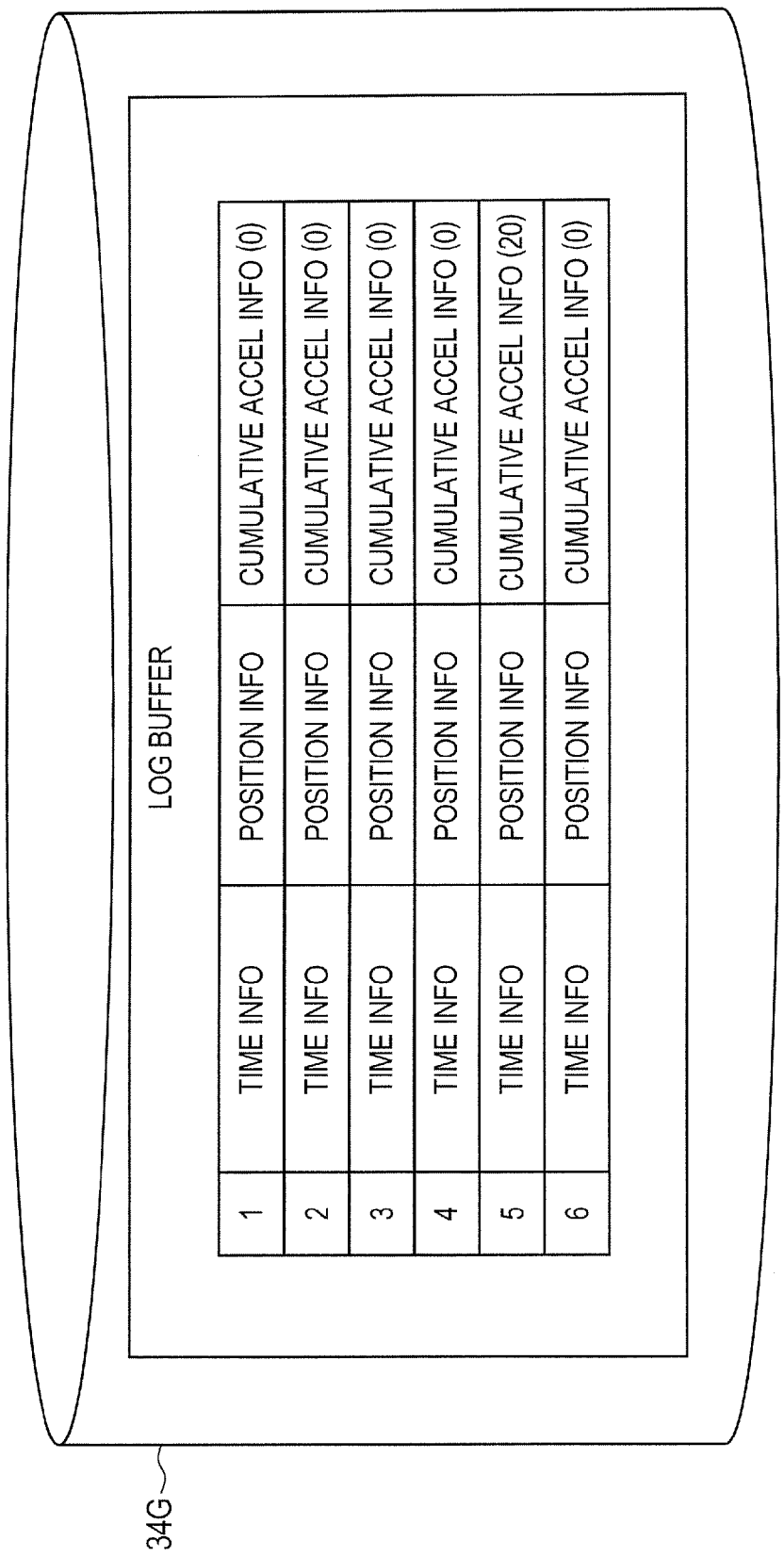

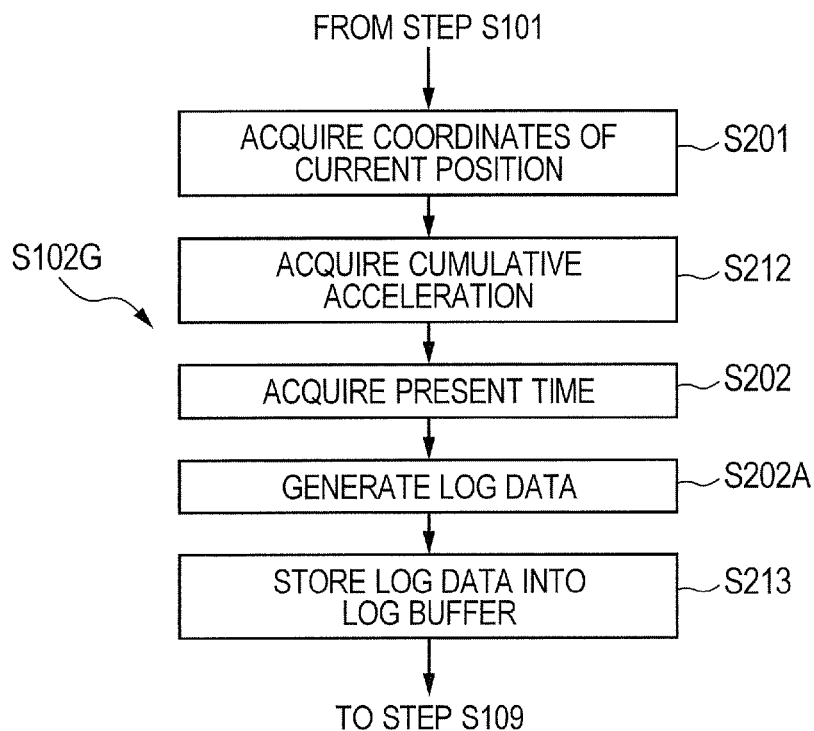
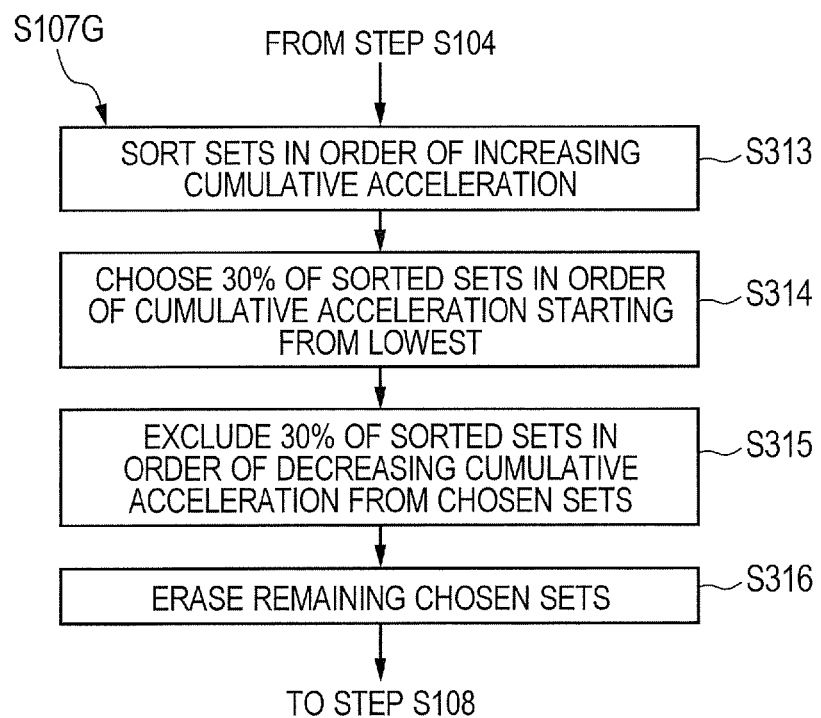

US 9,069,655 B2

ON-VEHICLE APPARATUS, AND METHOD AND COMPUTER PROGRAM FOR TRANSMITTING POSITIONAL INFORMATION

CROSS-REFERENCE TO RELATED APPLICATIONS

This application claims priority from Japanese patent application numbers 2011-289759, 2011-289760, and 2011-289761, filed on Dec. 28, 2011, the disclosures of which are hereby incorporated by reference.

BACKGROUND OF THE INVENTION

1. Field of the Invention

This invention generally relates to an on-vehicle apparatus, and a method and a computer program for transmitting positional information. This invention particularly relates to a technology for transmitting information representative of the position of a vehicle to a positional information collecting apparatus.

2. Description of the Related Art

Japanese patent application publication number 2011-154494 discloses a traffic information collecting system in which on-vehicle apparatuses transmit probe information pieces concerning the travel trajectories or loci of related vehicles respectively, and a processing apparatus in a traffic information center collects the transmitted probe information pieces and detects traffic conditions in response to the collected probe information pieces. The processing apparatus also calculates travel times for respective road links from the collected probe information pieces.

A probe information piece generated by an on-vehicle apparatus has a sequence of samples each representing a point passed by the related vehicle and the time at which the point is passed by the vehicle. In the system of Japanese application 2011-154494, each on-vehicle apparatus selects, from samples, those representing points at or near ends of road links, and transmits only the selected samples to the traffic information center as a probe information piece. Thereby, it is possible to reduce the computation load on the processing apparatus which occurs during the calculation of travel times for road links.

A known on-vehicle apparatus repetitively records an information piece representative of the current position of the related vehicle at prescribed distance intervals or prescribed time intervals during the travel of the vehicle, and transmits the recorded positional information piece to a server. The known on-vehicle apparatus includes a memory for temporarily storing every positional information piece until it is transmitted. Generally, an on-vehicle apparatus can provide only a narrow space for such a memory, and the storage capacity of the memory is severely limited.

In the case where the vehicle having the known on-vehicle apparatus travels outside the service area about the server or in the event that the known on-vehicle apparatus falls incapable of communicating with the server, positional information pieces in the memory can not be transmitted while the amount of the positional information pieces in the memory gradually increases. When the memory is fully occupied by the positional information pieces, a new positional information piece can not be stored into the memory. It should be noted that the amount of the positional information pieces in the memory continues to increase until the on-vehicle apparatus resumes communications with the server.

It is conceivable to set relatively great the prescribed time intervals or the prescribed distance intervals for the repetitively recording of positional information pieces to delay a timing at which the memory becomes fully occupied by positional information pieces or to extend a distance to a point at which the memory becomes fully occupied by positional information pieces. In this conceivable case, it is possible to lower a probability that the memory will be fully occupied during a term from the moment of occurrence of a communication failure to the moment of occurrence of a communication recovery. On the other hand, as the prescribed time intervals or the prescribed distance intervals for the repetitively recording of positional information pieces are greater, a vehicle travel route calculated from the recorded positional information pieces is lower in accuracy.

SUMMARY OF THE INVENTION

It is a first object of this invention to provide an on-vehicle apparatus which can repetitively record a positional information piece for a longer term in such a manner as to be able to suppress a reduction in accuracy of a vehicle travel route computed from the recorded positional information pieces.

It is a second object of this invention to provide a method of transmitting positional information which is designed so that a positional information piece can be repetitively recorded for a longer term while a reduction in accuracy of a vehicle travel route computed from the recorded positional information pieces can be suppressed.

It is a third object of this invention to provide a computer program for transmitting positional information which is designed so that a positional information piece can be repetitively recorded for a longer term while a reduction in accuracy of a vehicle travel route computed from the recorded positional information pieces can be suppressed.

A first object of this invention provides an on-vehicle apparatus comprising a storage device including a plurality of storage areas; a positional information generating section for generating, at every first prescribed timing, a positional information piece representing a position of the vehicle which occurs at the first prescribed timing, and for writing the generated positional information piece into one of the storage areas; and a positional information controlling section for sending positional information pieces in the storage areas to a positional information collecting apparatus at every second prescribed timing, and for allowing new positional information pieces to be written into the storage areas in which the sent positional information pieces are stored. In cases where it is impossible for the positional information controlling section to send the positional information pieces in the storage areas to the positional information collecting apparatus, the positional information controlling section allows a new positional information piece or pieces to be written into one or more of the storage areas which store a positional information piece or pieces having not been sent yet.

A second aspect of this invention is based on the first aspect thereof, and provides an on-vehicle apparatus further comprising an angle deciding section for, in cases where the positional information pieces having not been sent yet include a first positional information piece, a second positional information piece generated after generation of the first positional information piece, and a third positional information piece generated after generation of the second positional information piece, calculating a first straight line connecting a position represented by the first positional information piece and a position represented by the second positional information piece, calculating a second straight line connecting the position represented by the second positional information piece and a position represented by the third positional information piece, calculating an angle formed between the first straight line and the second straight line, and deciding whether or not the calculated angle is smaller than a prescribed threshold angle. In cases where the angle deciding section decides that the calculated angle is smaller than the prescribed threshold angle, the positional information controlling section inhibits a new positional information piece from being written into the storage area storing the second positional information piece.

A third aspect of this invention is based on the first aspect thereof, and provides an on-vehicle apparatus wherein the storage device stores information representing a map. The on-vehicle apparatus further comprises a detour deciding section for deciding whether or not a detour is present in a route portion between positions represented by two among the positional information pieces having not been sent yet on the basis of the map. In cases where the detour deciding section decides that a detour is present in the route portion, the positional information controlling section inhibits a new positional information piece from being written into the storage area storing a positional information piece generated between the moments of generation of said two among the positional information pieces.

A fourth aspect of this invention is based on the first aspect thereof, and provides an on-vehicle apparatus wherein the storage device stores information representing a map. The on-vehicle apparatus further comprises a fork deciding section for deciding whether or not a fork is present in a route portion between positions represented by two among the positional information pieces having not been sent yet on the basis of the map. In cases where the fork deciding section decides that a fork is present in the route portion, the positional information controlling section inhibits a new positional information piece from being written into one of the storage areas storing said two among the positional information pieces.

A fifth aspect of this invention is based on the first aspect thereof, and provides an on-vehicle apparatus further comprising a route search section for searching a desired route to a destination which should be taken by the vehicle; a deviation information generating section for deciding whether or not the vehicle deviates from the desired route at every first prescribed timing to generate a deviation information piece representing a result of said deciding, and for storing the generated deviation information piece into the storage device in a manner such that the generated deviation information piece and a positional information piece generated at the same first prescribed timing are in correspondence; and a deviation deciding section for referring to the generated deviation information pieces and thereby detecting, among the positional information pieces having not been sent yet, a positional information piece or pieces generated during a term in which the vehicle deviates from the desire route. The positional information controlling section inhibits a new positional information piece or pieces from being written into the storage area or areas storing the positional information or pieces detected by the deviation deciding section.

A sixth aspect of this invention is based on the first aspect thereof, and provides an on-vehicle apparatus further comprising a distance deciding section for deciding whether or not the distance between positions represented by two among the positional information pieces having not been sent yet is shorter than a prescribed threshold distance. In cases where the distance deciding section decides that the distance between the positions is not shorter than the prescribed threshold distance, the positional information controlling section inhibits new positional information pieces from being written into the storage areas storing said two among the positional information pieces having not been sent yet.

A seventh aspect of this invention is based on the first aspect thereof, and provides an on-vehicle apparatus further comprising a speed-related information generating section for detecting a physical quantity related to a speed of the vehicle at every first prescribed timing to generate a speed-related information piece representing the detected physical quantity, and for storing the generated speed-related information piece into the storage device in a manner such that the generated speed-related information piece and a positional information piece generated at the same first prescribed timing are in correspondence; and a speed-related deciding section for deciding whether or not the physical quantity represented by the generated speed-related information piece is so small as to meet prescribed conditions. In cases where the speed-related deciding section decides that the physical quantity represented by the speed-related information piece is not so small, the positional information controlling section inhibits a new positional information piece from being written into one of the storage areas which stores the positional information piece corresponding to said speed-related information piece.

An eighth aspect of this invention is based on the seventh aspect thereof, and provides an on-vehicle apparatus wherein the first prescribed timings are timings spaced at constant time intervals, and the physical quantity is the speed of the vehicle.

A ninth aspect of this invention is based on the seventh aspect thereof, and provides an on-vehicle apparatus wherein the physical quantity is an acceleration of the vehicle in its transverse direction.

A tenth aspect of this invention is based on the seventh aspect thereof, and provides an on-vehicle apparatus wherein the speed-related information generating section detects an acceleration of the vehicle in its transverse direction twice or more during a term between adjacent two among the first prescribed timings, and adds up the detected accelerations to obtain a cumulative acceleration and labels the obtained cumulative acceleration as a physical quantity corresponding to later one of said adjacent two among the first prescribed timings.

An eleventh aspect of this invention is based on the tenth aspect thereof, and provides an on-vehicle apparatus wherein the speed-related deciding section decides whether or not the cumulative acceleration represented by the speed-related information piece is so great as to meet given conditions. In cases where the speed-related deciding section decides that the cumulative acceleration represented by the speed-related information piece is so great, the positional information controlling section inhibits a new positional information piece from being written into one of the storage areas which stores the positional information piece corresponding to said speed-related information piece.

A twelfth aspect of this invention provides a method of generating and sending positional information pieces representative of positions of a vehicle. The method comprises the steps of generating, at every first prescribed timing, a positional information piece representing a position of the vehicle which occurs at the first prescribed timing; writing the generated positional information piece into one of storage areas in a storage device; sending positional information pieces in the storage areas to a positional information collecting apparatus at every second prescribed timing, and allowing new positional information pieces to be written into the storage areas in which the sent positional information pieces are stored; and in cases where sending the positional information pieces in the storage areas to the positional information collecting apparatus is impossible, allowing a new positional information piece or pieces to be written into one or more of the storage areas which store a positional information piece or pieces having not been sent yet.

A thirteenth aspect of this invention provides a recording medium storing a computer program for generating and sending positional information pieces representative of positions of a vehicle. The computer program enables a computer to perform a positional information generating process and a positional information controlling process. The positional information generating process is for generating, at every first prescribed timing, a positional information piece representing a position of the vehicle which occurs at the first prescribed timing, and for writing the generated positional information piece into one of storage areas in a storage device. The positional information controlling process is for sending positional information pieces in the storage areas to a positional information collecting apparatus at every second prescribed timing, and for allowing new positional information pieces to be written into the storage areas in which the sent positional information pieces are stored. In cases where it is impossible to send the positional information pieces in the storage areas to the positional information collecting apparatus, the positional information controlling process allows a new positional information piece or pieces to be written into one or more of the storage areas which store a positional information piece or pieces having not been sent yet.

A fourteenth aspect of this invention provides an on-vehicle apparatus comprising a storage device including a plurality of storage areas; an information generating section for sequentially generating positional information pieces each representing a current position of the vehicle, and for writing the generated positional information pieces into the storage areas; a communication condition deciding section for repetitively deciding whether communications with an external information collecting apparatus are possible or impossible; and a controlling section for, each time the communication condition deciding section decides that communications with the external information collecting apparatus are possible, sending positional information pieces in the storage areas to the positional information collecting apparatus, and for, each time the communication condition deciding section decides that communications with the external information collecting apparatus are impossible, allowing a positional information piece or pieces to be erased from one or more of the storage areas.

A fifteenth aspect of this invention is based on the fourteenth aspect thereof, and provides an on-vehicle apparatus wherein each time the communication condition deciding section decides that communications with the external information collecting apparatus are impossible, the controlling section allows the information generating section to write a new positional information piece or pieces over a positional information piece or pieces in one or more of the storage areas and hence allows a positional information piece or pieces to be erased from one or more of the storage areas, and wherein each time the communication condition deciding section decides that communications with the external information collecting apparatus are possible, the controlling section allows the information generating section to write new positional information pieces over the sent positional information pieces in the storage areas.

A sixteenth aspect of this invention is based on the fourteenth aspect thereof, and provides an on-vehicle apparatus wherein each time the communication condition deciding section decides that communications with the external information collecting apparatus are impossible, the controlling section positively erases a positional information piece or pieces from one or more of the storage areas to make said one or more unoccupied, wherein each time the communication condition deciding section decides that communications with the external information collecting apparatus are possible, the controlling section erases the sent positional information pieces from the storage areas to make the storage areas unoccupied, and wherein the information generating section writes each generated positional information piece into unoccupied one of the storage areas.

This invention offers the advantage that a positional information piece can be repetitively recorded for a longer term while a reduction in accuracy of a vehicle travel route computed from the recorded positional information pieces can be suppressed.

BRIEF DESCRIPTION OF THE DRAWINGS

FIG. 32 is a diagram of a storage device in a navigation apparatus according to an eighth embodiment of this invention.

FIG. 35 is a flowchart of the details of a log data storing block in FIG. 34.

FIG. 36 is a flowchart of the details of a data thinning block in FIG. 34.

DETAILED DESCRIPTION OF THE INVENTION

First Embodiment

Figure 1:
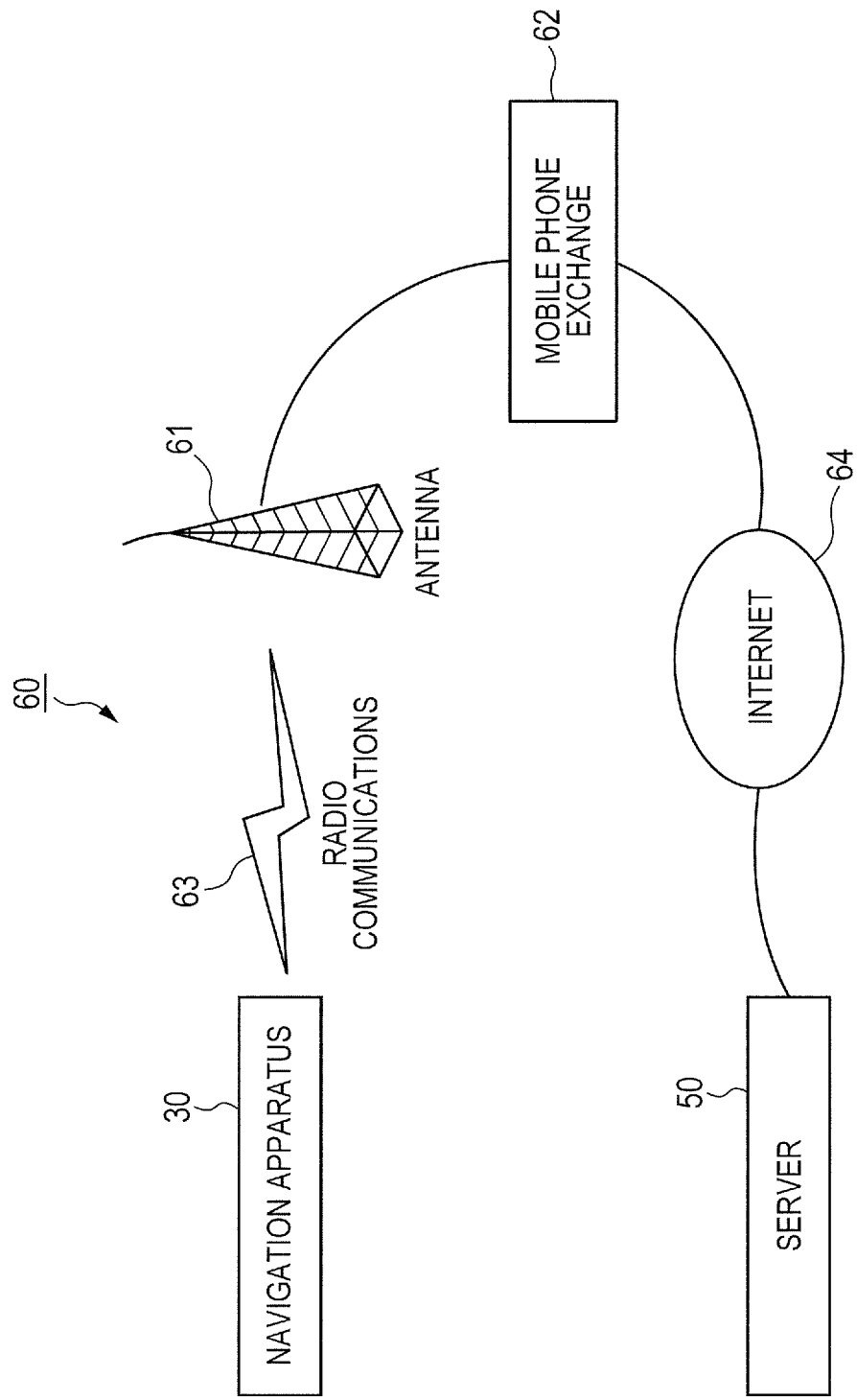
FIG. 1 is a diagram of a positional information collecting system according to a first embodiment of this invention.

FIG. 1 shows a positional information collecting system 60 according to a first embodiment of this invention.

As shown in FIG. 1, the positional information collecting system 60 includes a navigation apparatus 30, a server 50, a radio antenna 61, and a mobile phone exchange 62. The radio antenna 61 is provided in a mobile phone base station connected with the mobile phone exchange 62. In general, a plurality of mobile phone base stations are connected with the mobile phone exchange 62. The mobile phone exchange 62 and the server 50 are connected via the Internet 64.

The navigation apparatus 30 can send and receive arbitrary information to and from the server 50 via the radio antenna 61, the mobile phone base station, the mobile phone exchange 62, radio communications 63, and the Internet 64. Similarly, the server 50 can send and receive arbitrary information to and from the navigation apparatus 30. The radio communications 63 are done between the navigation apparatus 30 and the mobile phone base station via the radio antenna 61.

The navigation apparatus 30 is a car navigation system provided on a vehicle. Thus, the navigation apparatus 30 is an on-vehicle apparatus. The navigation apparatus 30 notifies a driver or a passenger in the vehicle of the current position of the vehicle, and gives guidance to the driver or passenger about a route from the departure point to a destination. The navigation apparatus 30 repetitively generates an information piece (a positional information piece) representative of the current position of the vehicle, and sends the generated information piece to the server 50. Specifically, the navigation apparatus 30 transmits the positional information piece toward the radio antenna 61 via the radio communications 63. Then, the positional information piece is sent from the antenna 61 to the server 50 via the mobile phone base station, the mobile phone exchange 62, and the Internet 64.

The server 50 is an information processing apparatus which collects positional information pieces from the navigation apparatus 30. Positional information pieces sent from the navigation apparatus 30 reach the mobile phone exchange 62 via the mobile phone base station. The server 50 receives the positional information pieces from the mobile phone exchange 62 via the Internet 64. In this way, the server 50 collects the positional information pieces. The server 50 provides various services to information processing devices connected to the Internet 64 on the basis of the collected positional information pieces. The information processing devices are, for example, PCs (personal computers) and smartphones.

The mobile phone base station receives information from the navigation apparatus 30 via the radio communications 63 and the radio antenna 61, and sends the received information to the mobile phone exchange 62. The mobile phone base station receives information from the mobile phone exchange 62, and sends the received information to the navigation apparatus 30 via the radio antenna 61 and the radio communications 63.

The mobile phone exchange 62 receives information from the navigation apparatus 30 via the mobile phone base station, and sends the received information to the server 50 via the Internet 64. The mobile phone exchange 62 receives information from the server 50 via the Internet 64, and sends the received information to the mobile phone base station.

The Internet 64 for connection between the server 50 and the mobile phone exchange 62 may be replaced by another network such as a private line network or a telephone line network. Furthermore, the Internet 64 may be replaced by a combination of at least two of the Internet, the private line network, and the telephone line network.

Another navigation apparatus 30 or other navigation apparatuses 30 may be provided. In this case, the server 50 collects positional information pieces from the plural navigation apparatuses 30. Thus, the positional information collecting system 60 may include a plurality of navigation apparatuses 30 equal in structure.

Figure 2:
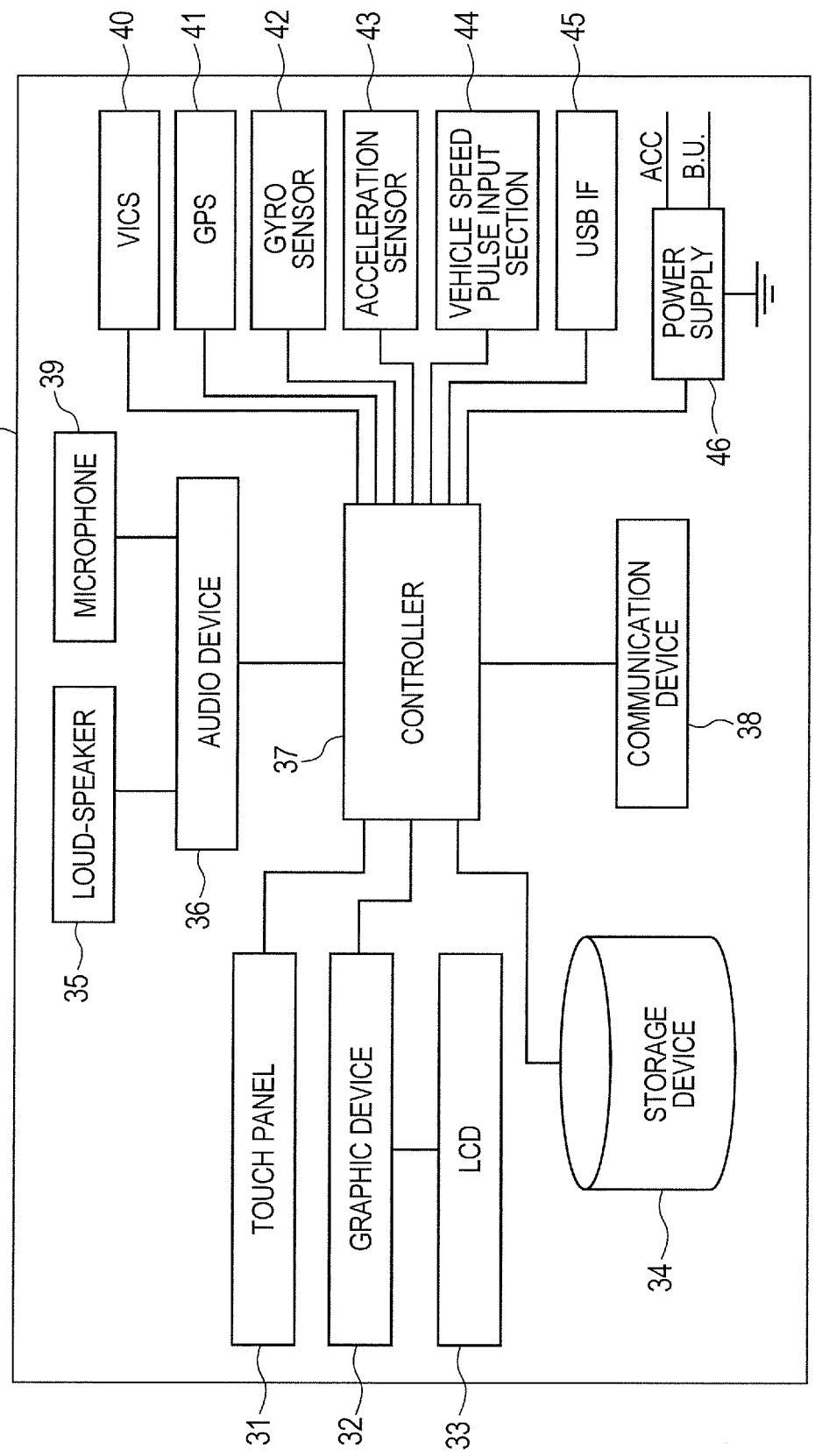
FIG. 2 is a block diagram of a navigation apparatus in FIG. 1.

With reference to FIG. 2, the navigation apparatus 30 includes a touch panel 31, a graphic device 32, an LCD (Liquid Crystal Display) 33, a storage device 34, a loudspeaker or loudspeakers 35, an audio device 36, a controller 37, a communication device 38, a microphone 39, a VICS (Vehicle Information Communication System) device 40, a GPS (Global Positioning System) receiver 41, a gyro sensor 42, an acceleration sensor 43, a vehicle speed pulse input section 44, an USB (Universal Serial Bus) interface 45, and a power supply 46.

The touch panel 31 is an input device for allowing the user to input information into the navigation apparatus 30 through actuation of the touch panel 31. The touch panel 31 and the LCD 33 are combined into a single laminar unit. The touch panel 31 generates an input signal representative of the contents of information inputted by the user, and outputs the generated input signal to the controller 37 as input information.

The graphic device 32 receives image information from the controller 37, and controls the LCD 33 to indicate a picture represented by the received image information. The LCD 33 is a display for indicating a picture under the control by the graphic device 32.

The storage device 34 can store information of various types such as positional information, map information, image information, and audio information. The storage device 34 is, for example, a set of a hard disc and a drive therefor or a flash memory. The storage device 34 may be a combination of at least two among a set of a hard disc and a drive therefor, a flash memory, a ROM (Read Only Memory), and a set of an optical disc and a drive therefor.

The loudspeaker 35 generates a sound while being driven and controlled by the audio device 36. The audio device 36 receives audio information from the controller 37, and drives and controls the loudspeaker 35 to emit a sound represented by the received audio information. The controller 37 operates to control the navigation apparatus 30.

The controller 37 includes a CPU (Central Processing Unit) and memories. The CPU performs arithmetic operations by use of the memories, and thereby later-mentioned processes by the controller 37 are implemented.

The controller 37 controls the devices 31-36 and 38-45 and sends and receives information to and from the devices 31-36 and 38-45, and thereby implements processes in the navigation apparatus 30. At prescribed intervals, the controller 37 repetitively generates a positional information piece representative of the current position of the vehicle on the basis of information outputted from the GPS receiver 41. The controller 37 stores the generated positional information piece into the storage device 34. At every prescribed transmission timing, the controller 37 transfers positional information pieces from the storage device 34 to the communication device 38 and controls the communication device 38 to send the positional information pieces toward the server 50.

The communication device 38 sends and receives information through radio communications. Specifically, the communication device 38 receives information outputted from the controller 37. The received information contains positional information pieces transferred from the storage device 34. The communication device 38 sends the received information to the mobile phone base station via the radio communications 63 and the radio antenna 61. In addition, the communication device 38 receives information from the mobile phone base station via the radio antenna 61 and the radio communications 63, and outputs the received information to the controller 37. Thereby, information is transmitted between the navigation apparatus 30 and the server 50.

The microphone 39 converts user's voice into corresponding audio information, and feeds the audio information to the controller 37 through the audio device 36.

The VICS device 40 receives road traffic information from a beacon provided on a road. The VICS device 40 feeds the controller 37 with the received road traffic information. The controller 37 outputs the road traffic information to the graphic device 32, and controls the graphic device 32 to indicate the road traffic information on the LCD 33.

The GPS receiver 41 determines its current position, that is, the current position of the vehicle on the basis of signals from GPS satellites. The GPS receiver 41 generates information representing the coordinates (latitude and longitude) of the current position of the vehicle. The GPS receiver 41 outputs the generated information to the controller 37.

The gyro sensor 42 detects the angular velocity of the vehicle which occurs, for example, when the user changes the direction of travel of the vehicle by operating vehicle's steering wheel. The gyro sensor 42 generates angular velocity information, that is, information representing the detected angular velocity. The gyro sensor 42 outputs the angular velocity information to the controller 37.

The acceleration sensor 43 detects the 2-axis accelerations of the vehicle, that is, the acceleration in the longitudinal direction and the acceleration in the transverse direction with respect to the vehicle. The acceleration sensor 43 generates information (longitudinal-direction acceleration information) representing the detected longitudinal-direction acceleration and information (transverse-direction acceleration information) representing the detected transverse-direction acceleration. The acceleration sensor 43 outputs the longitudinal-direction acceleration information and the transverse-direction acceleration information to the controller 37.

The vehicle speed pulse input section 44 receives, from a known device in the vehicle, a pulse signal in which the number of successive pulses occurring per unit time is proportional to the speed of the vehicle. The vehicle speed pulse input section 44 generates vehicle speed information, that is, information representative of the vehicle speed on the basis of the received pulse signal. The vehicle speed pulse input section 44 outputs the vehicle speed information to the controller 37.

The USB interface 45 is a connection terminal for an arbitrary external device. A device connected to the USB interface 45 can input information into the navigation apparatus 30 through the USB interface 45. The USB interfaced 45 passes the inputted information to the controller 37.

The power supply 46 feeds electric power to the controller 37 and other devices in the navigation apparatus 30 to make them in operation. On the other hand, the power supply 46 is fed with electric power from an ACC (accessory) power supply and a BU (backup) power supply in the vehicle. Thus, the power supply 46 transfers electric power from the vehicle to the devices in the navigation apparatus 30.

Figure 3:
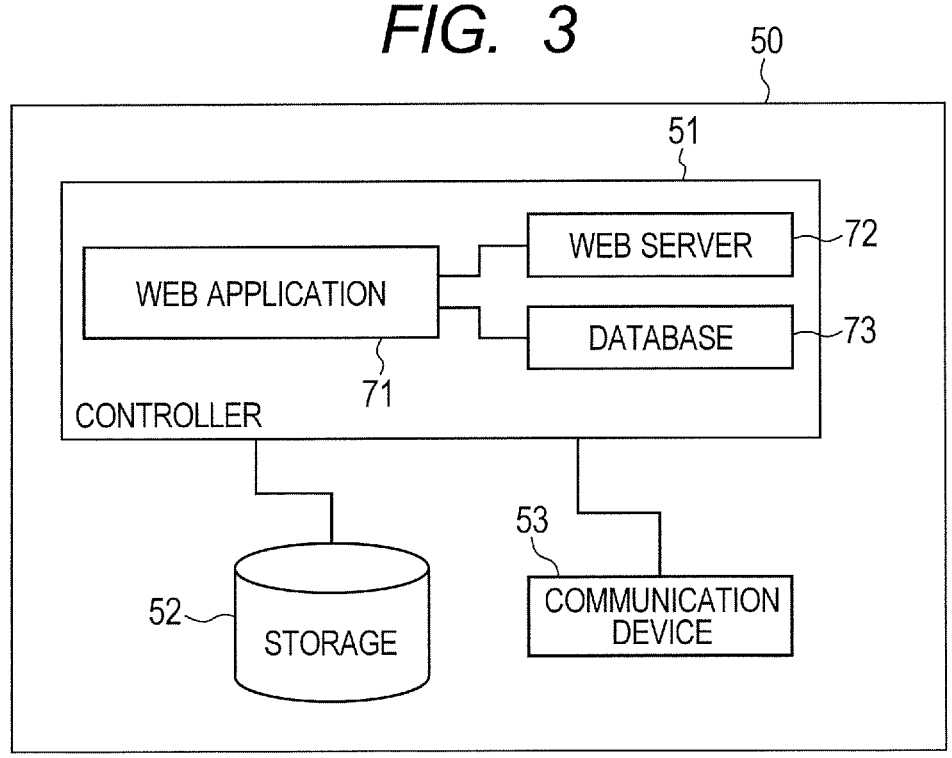
FIG. 3 is a block diagram of a server in FIG. 1.

As shown in FIG. 3, the server 50 includes a controller 51, a storage 52, and a communication device 53. The controller 51 executes computer programs such as a web application 71, a web server 72, and a database 73.

The controller 51 operates to control the server 50. The controller 51 includes a CPU and memories. The CPU performs arithmetic operations by use of the memories, and thereby later-mentioned processes and other processes by the server 50 are implemented. The processes by the server 50 contain processes implemented by the execution of the web application 71, the web server 72, and the database 73 by the CPU. The controller 51 implements the processes in the server 50 by controlling the devices 52 and 53 while sending and receiving information to and from the devices 52 and 53.

The storage 52 can store information of various types such as positional information, map information, image information, and audio information. In addition, the storage 52 stores computer programs such as the web application 71, the web server 72, and the database 73. The CPU in the controller 51 loads these computer programs into one or more of the memories in the controller 51 from the storage 52 and executes the loaded computer programs, thereby implementing the processes in the server 50. The storage 52 is, for example, a set of a hard disc and a drive therefor or a flash memory. The storage 52 may be a combination of at least two among a set of a hard disc and a drive therefor, a flash memory, a ROM (Read Only Memory), and a set of an optical disc and a drive therefor.

The communication device 53 sends and receives information via the Internet 64. Specifically, the communication device 53 sends information, which is outputted from the controller 51, to the mobile phone exchange 62 or an information processing device (referred to as a client hereafter) via the Internet 64. The client obtains service from the server 50. The communication device 53 receives information from the mobile phone exchange 62 or the client, and transfers the received information to the controller 51. Thereby, information is transmitted between the server 50 and the navigation apparatus 30 or the client. Generally, there are plural clients with respect to the server 50. The navigation apparatus or apparatuses 30 connected to the server 50 may be regarded as clients with respect thereto.

The web application 71 is a computer program for collecting positional information pieces from the navigation apparatus or apparatuses 30 and providing services thereto on the basis of the collected positional information pieces. The web application 71 is designed so that the controller 51 will receive positional information pieces from the navigation apparatus or apparatuses 30 via the communication device 53 and store the received positional information pieces into the storage 52. In addition, the web application 71 is designed for offering services such as providing the history of travel of the vehicle, providing traffic jam information, and providing information about usable routes to be taken by the vehicle after a disaster. Thus, the web application 71 enables the controller 51 to generate, on the basis of positional information pieces in the storage 52, the above-mentioned information (the travel history information, the traffic jam information, and the usable route information) to be provided to the user of each navigation apparatus 30. The travel history information represents a picture in which the route taken by the vehicle in the past is superimposed on a map. According to the web application 71, the controller 51 computes that route on the basis of positions represented by positional information pieces sent from the navigation apparatus 30.

The web server 72 is web server software that operates for a client connected to the Internet 64 or the mobile phone exchange 62. The web server 72 is designed so that the controller 51 will send information, which is generated according to the web application 71, to the client or the mobile phone exchange 62 via the communication device 53 in response to a request from the client or the mobile phone exchange 62.

The database 73 is a RDBMS (Relational DataBase Management System). The web application 71 uses the functions provided by the database 73 in enabling the controller 51 to store information into the storage 52 and search information in the storage 52 for a target piece, and obtain information from the storage 52.

Figure 4:
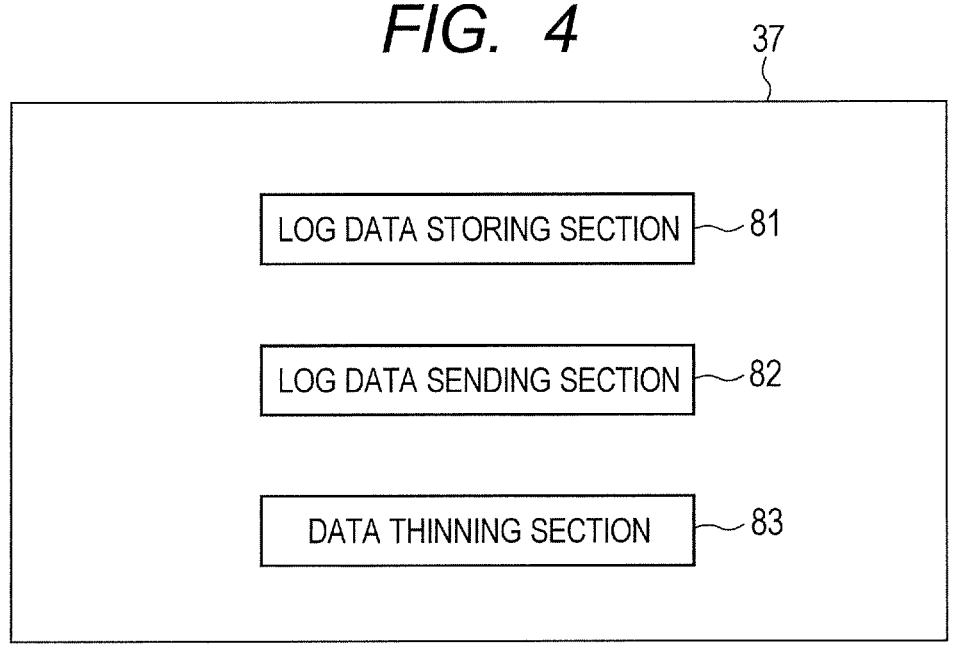
FIG. 4 is a diagram of a controller in FIG. 2.

As shown in FIG. 4, the controller 37 in the navigation apparatus 30 includes a log data storing section 81, a log data sending section 82, and a data thinning section 83.

There are prescribed timings referred to as log timings. Log timings may be called generation timings or store timings. At every log timing, the log data storing section 81 generates a log data piece and stores the generated log data piece into the storage device 34. Specifically, the log data storing section 81 generates an information piece (a positional information piece) representative of the position of the vehicle on the basis of information outputted from the GPS receiver 41 at the log timing. The positional information piece may be of any expression format provided that it specifies the position of the vehicle. The log data storing section 81 generates a log data piece including a set of an information piece (a time information piece) representative of the time coincident with the log timing and the positional information piece obtained at the log timing. The log data storing section 81 stores the generated log data piece into the storage device 34.

Thus, a positional information piece in each log data piece represents the position (vehicle position) at which the log data piece is generated and stored into the storage device 34 while a time information piece therein represents the time at which the log data piece is generated and stored into the storage device 34, that is, the generation time or store time of the log data piece.

Preferably, the log timings are timings spaced at prescribed intervals. For example, the log timings are timings temporally spaced at prescribed time intervals. The log timings may be timings corresponding to positions spaced at prescribed travel distance intervals.

Figure 5:
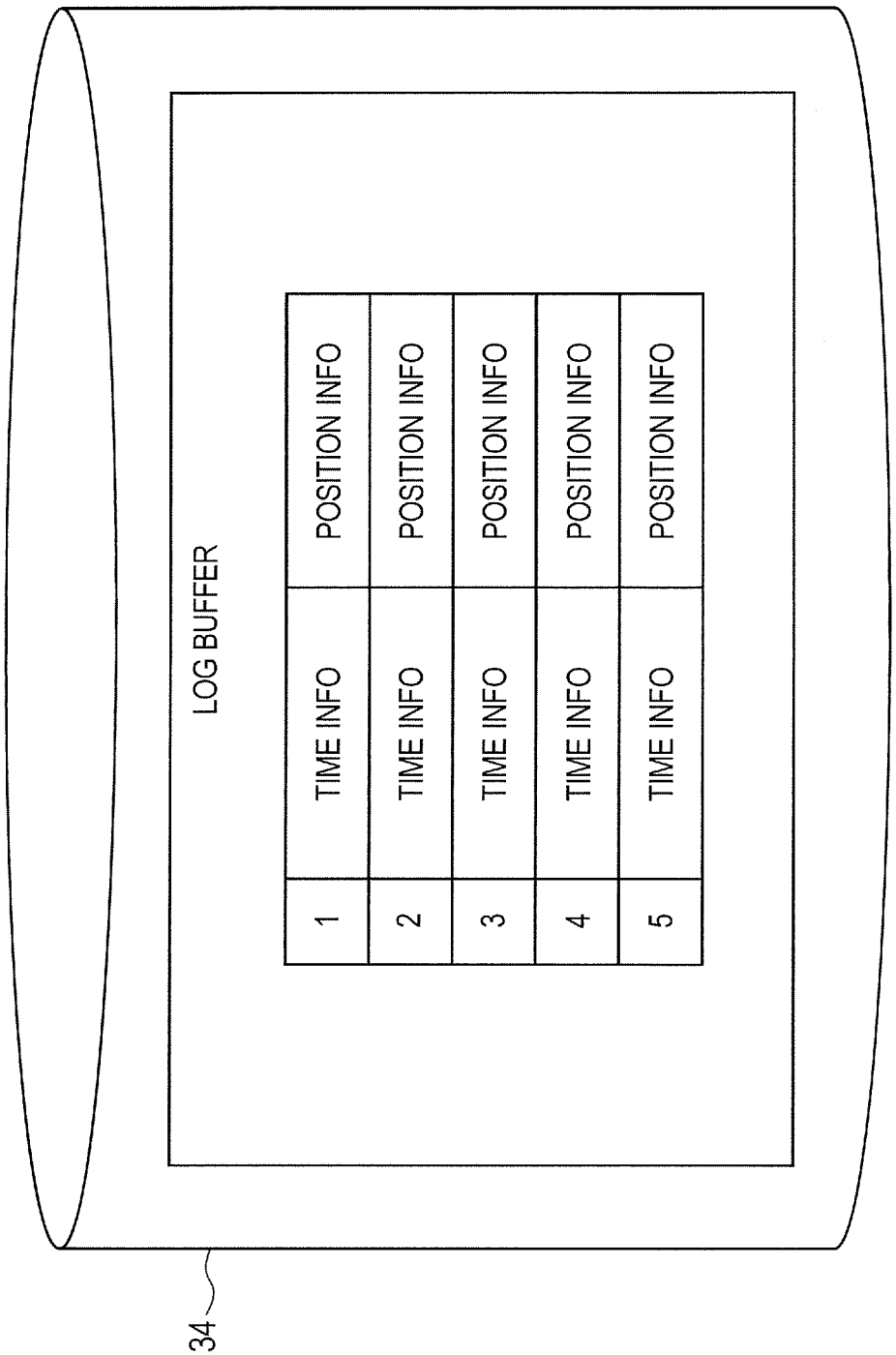
FIG. 5 is a diagram of a storage device in FIG. 2.

As shown in FIG. 5, a log buffer is provided in the storage device 34. The log buffer has a prescribed number of log data storage areas identified by address numbers "1", "2", "3", . . . and assigned to log data pieces respectively. Thus, the log data storing section 81 stores a currently-generated log data piece into one of the log data storage areas in the log buffer. In FIG. 5, the number of log data storage areas in the log buffer is five. The number of log data storage areas in the log buffer may differ from five.

At every transmission timing for log data pieces, the log data sending section 82 reads out log data pieces from the log buffer and sends the read-out log data pieces to the server 50. The transmission timing coincides with the time at which an unoccupied log data storage area becomes absent from the log buffer, that is, at which all the log data storage areas in the log buffer are occupied by log data pieces. When sending all the log data pieces read out from the log buffer has been completed, the log data sending section 82 clears the log buffer and hence erases the log data pieces from all the log data storage areas in the log buffer. As a result, all the log data storage areas in the log buffer are unoccupied and usable for storing new log data pieces.

In the event that the log data sending section 82 fails to send the log data pieces to the server 50 at the transmission timing, the data thinning section 83 thins out the log data pieces in the log buffer. Specifically, the data thinning section 83 selects one or more of the log data pieces in the log buffer and erases the selected log data piece or pieces from the log buffer. The data thinning section 83 may select one or more of the log data storage areas in the log buffer and erase the log data piece or pieces from the selected log data storage area or areas. As a result, one or more of the log data storage areas in the log buffer are unoccupied and usable for storing new log data pieces.

With respect to thinning out log data pieces in the log buffer, the selection of one or more of the log data pieces by the data thinning section 83 may be in one of various ways. For example, log data pieces in the log buffer are arranged in order of store time or generation time (time represented by each time information piece therein). In this case, from among log data pieces in the log buffer, ones spaced at prescribed intervals may be selected or ones may be selected at random.

It is preferable for the data thinning section 83 to use a later-mentioned data thinning method in selecting a log data piece or pieces to be erased from the log buffer by. The later-mentioned data thinning method can suppress a reduction in the accuracy of the route taken by the vehicle that is computed on the basis of non-erased log data pieces.

Preferably, the data thinning section 83 thins out log data pieces in the log buffer at a prescribed thinning rate. In the case where the log buffer has five log data storage areas as shown in FIG. 5 and the thinning rate is equal to 40%, the data thinning section 83 erases two log data pieces from the log buffer. The thinning rate may differ from 40%. Preferably, the information representative of the thinning rate is prestored in the storage device 34. In this case, the data thinning section 83 reads out the thinning rate information from the storage device 34 and thins out log data pieces in the log buffer at a thinning rate equal to that represented by the read-out information.

The thinning rate may be settable or adjustable by the user. For example, the combination of the touch panel 31 and the LCD 33 is controlled to indicate a picture that allows the user to designate an arbitrary thinning rate. In this case, when operated by the user, the touch panel 31 inputs information representative of the designated thinning rate to the controller 37. The controller 37 responds to the inputted information and updates the thinning rate information in the storage device 34 to represent a thinning rate equal to designated one.

Preferably, the controller 37 operates in accordance with a computer program executed by the CPU therein. The computer program is stored in one of the memories in the controller 37 or the storage device 34.

Figure 6:
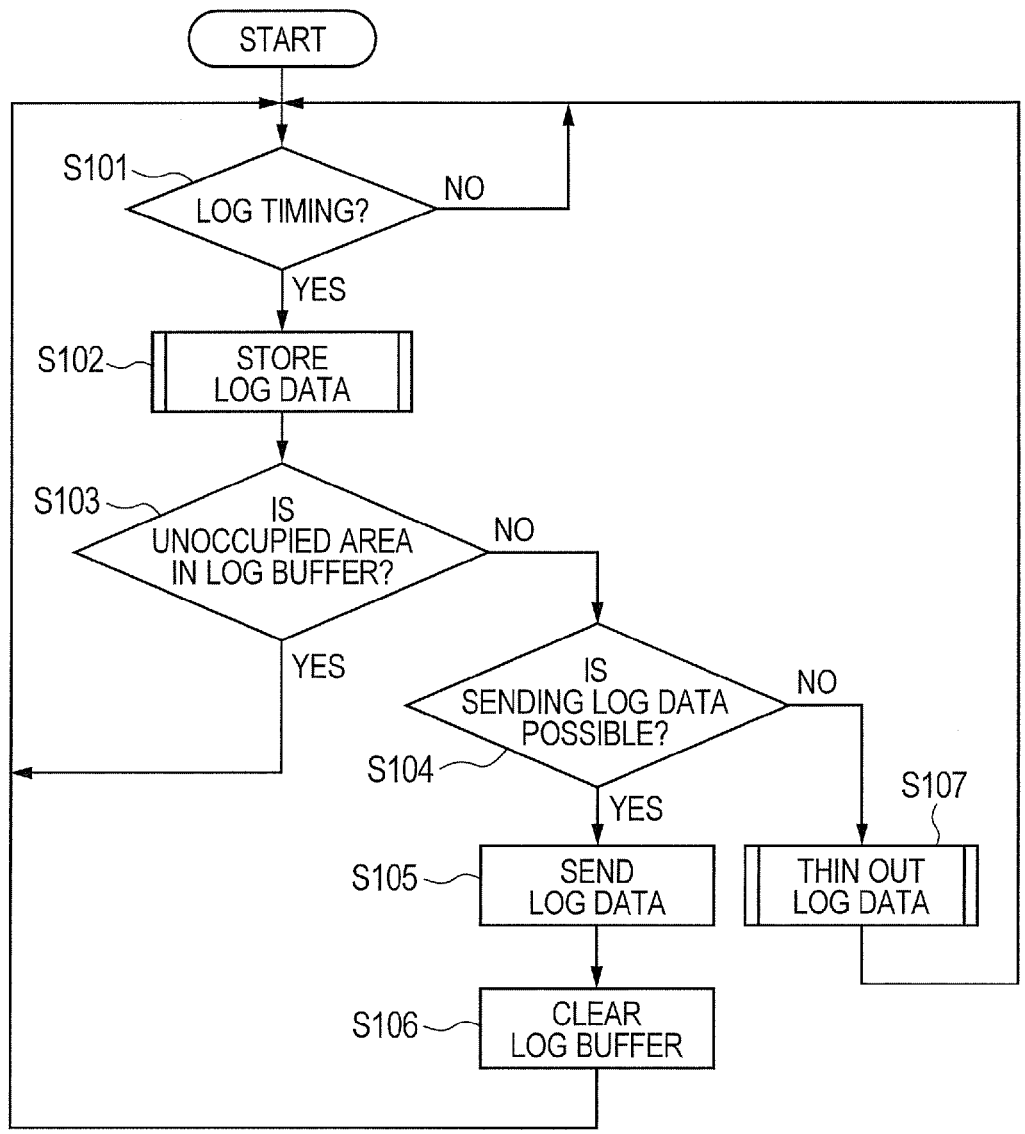
FIG. 6 is a flowchart of a segment of a computer program for the controller in FIGS. 2 and 4 which relates to a tracklog process.

FIG. 6 is a flowchart of a segment (subroutine) of the computer program for the controller 37 which relates to a tracklog process. With reference to FIG. 6, in a first step S101 of the program segment, the log data storing section 81 decides whether or not the present time is a log timing in one of various ways. Log timings may be set to timings spaced at regular time intervals. In this case, it is preferable to measure the lapse of time by using timer interrupt responsive to operation of a timer in the controller 37. To implement the above-mentioned decision in the step S101, the measured lapse of time is compared to a constant value corresponding to the regular time intervals. Log timings may be set to timings corresponding to positions spaced at constant travel distance intervals. In this case, it is preferable to measure the distance traveled by the vehicle through the integral of the vehicle speed represented by the information outputted from the vehicle speed pulse input section 44. To implement the above-mentioned decision in the step S101, the measured distance is compared to a given value corresponding to the constant travel distance intervals. When the log data storing section 81 decides that the present time is a log timing, the program advances from the step S101 to a log data storing block S102. Otherwise, the step S101 is repeated to await a log timing.

In the block S102, the log data storing section 81 generates a log data piece and stores the generated log data piece into the log buffer in the storage device 34. The details of the block S102 will be explained later. After the block S102, the program advances to a step S103.

In the step S103, the log data sending section 82 decides whether or not at least one unoccupied log data storage area is in the log buffer in the storage device 34. When at least one unoccupied log data storage area is in the log buffer, the program returns from the step S103 to the step S101. Otherwise, the program advances from the step S103 to a step S104.

In the step S104, the log data sending section 82 decides whether sending log data pieces to the server 50 is possible or impossible in one of various ways. For example, sending log data pieces to the server 50 may be decided to be impossible when the log data sending section 82 fails to establish a session with the server 50 for sending log data pieces thereto. In this case, sending log data pieces to the server 50 is decided to be possible when the log data sending section 82 succeeds in establishing the session with the server 50. When the log data sending section 82 decides that sending log data pieces is possible, the program advances from the step S104 to a step S105. On the other hand, when the log data sending section 82 decides that sending log data pieces is impossible, the program advances from the step S104 to a data thinning block S107.

In the step S105, the log data sending section 82 reads out log data pieces from all the log data storage areas in the log buffer, and sends the read-out log data pieces to the server 50 via the communication device 38.

In a step S106 following the step S105, the log data sending section 82 clears the log buffer and hence erases the log data pieces from all the log data storage areas in the log buffer. After the step S106, the program returns to the step S101.

In the block S107, the data thinning section 83 thins out the log data pieces in the log buffer. Specifically, the data thinning section 83 erases one or more of the log data pieces in the log buffer. As a result, one or more of the log data storage areas from which the log data piece or pieces have been erased are now unoccupied and usable for storing new log data pieces. After the block S107, the program returns to the step S101.

Figure 7:
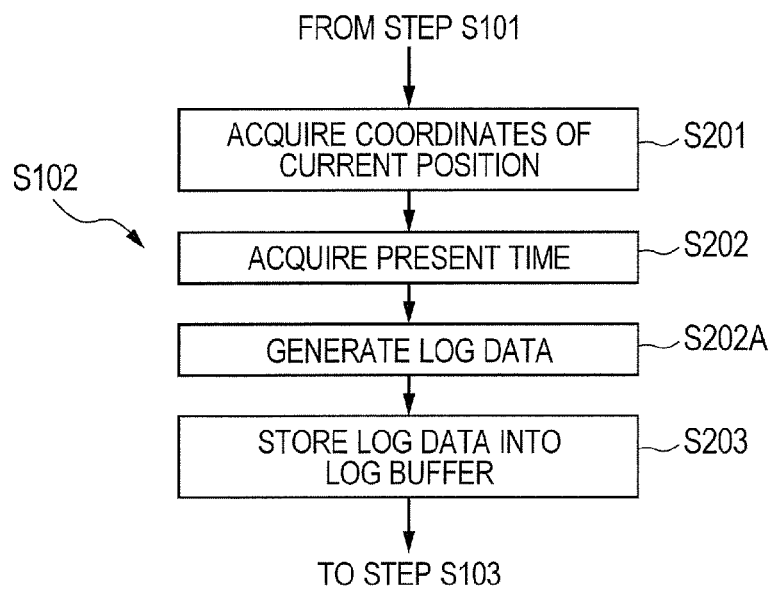
FIG. 7 is a flowchart of the details of a log data storing block in FIG. 6.

As shown in FIG. 7, the log data storing block S102 has a sequence of steps S201, S202, S202A, and S203. The step S201 follows the step S101 of FIG. 6. The step S203 is followed by the step S103 of FIG. 6.

In the step S201, the log data storing section 81 acquires the coordinates of the current position of the vehicle from the information outputted by the GPS receiver 41.

In the step S202 following the step S201, the log data storing section 81 acquires the present time. The controller 37 may be designed to maintain and manage a system clock. In this case, to acquire the present time, it is preferable to refer to the time indicated by the system clock.

In the step S202A subsequent to the step S202, the log data storing section 81 generates a log data piece from the acquired coordinates of the current position of the vehicle and the acquired present time.

In the step S203 following the step S202A, the log data storing section 81 stores the generated log data piece into unoccupied one among the log data storage areas in the log buffer.

As previously explained, in the case where all the log data storage areas in the log buffer are occupied, the log data sending section 82 decides whether sending log data pieces from the log buffer to the server 50 is possible or impossible. When sending is possible, sending is actually performed and the log data storage areas are made unoccupied for allowing the acceptance of new log data pieces. On the other hand, when sending is impossible, one or more of the log data pieces in the log data storage areas are erased to make one or more of the log data storage areas unoccupied for allowing the acceptance of a new log data piece or pieces. Thus, only in the event that all the log data storage areas in the log buffer are occupied and sending log data pieces from the log buffer to the server 50 is impossible, erasing one or more of the log data pieces in the log data storage areas is implemented.

Accordingly, as compared to a design in which the amount of positional information stored in a storage device is previously and forcedly reduced, it is possible to suppress a reduction in the accuracy of the route taken by the vehicle which is computed from non-erased log data pieces. In addition, since one or more of log data pieces are erased from the log buffer for allowing the log buffer to accept a new log data piece or pieces, the log data pieces in the log buffer can more continue to be repetitively updated.

Second Embodiment

A second embodiment of this invention is similar to the first embodiment thereof except for design changes mentioned hereafter. In the second embodiment of this invention, a method of thinning out log data pieces in the storage device 34 is designed to further suppress a reduction in the accuracy of the route taken by the vehicle which is computed from non-erased log data pieces.

Figure 8A:
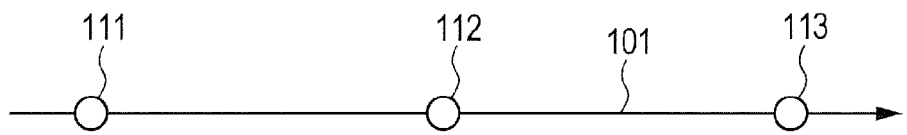
FIG. 8A is a diagram of a first example of the route taken by a vehicle and positions at which log data pieces are generated respectively.

With reference to FIG. 8A, on a straight route 101 taken by the vehicle, there are equally-spaced positions (locations) 111, 112, and 113 at each of which a log data piece is generated and stored into the log buffer in the storage device 34.

In the case where the direction of travel of the vehicle remains unchanged and the straight route 101 is formed as shown in FIG. 8A, even if the log data piece generated at the position 112 is erased, the position 112 can be correctly recovered through interpolation calculating the middle point on a straight line between the positions 111 and 113 and labeling the calculated middle point as the position 112. From the positions 111 and 113 and the recovered position 112, it is possible to correctly compute the route 101. Thus, even if the log data piece generated at the position 112 is erased so that only the log data pieces generated at the positions 111 and 113 are sent to the server 50 from the navigation apparatus 30, the server 50 can correctly recover the position 112 by implementing interpolation using the positions 111 and 113 represented by the log data pieces sent from the navigation apparatus 30. Accordingly, in this case, the server 50 can correctly recognize or detect the route 101 and provide correct information to a client or clients.

Figure 8B:
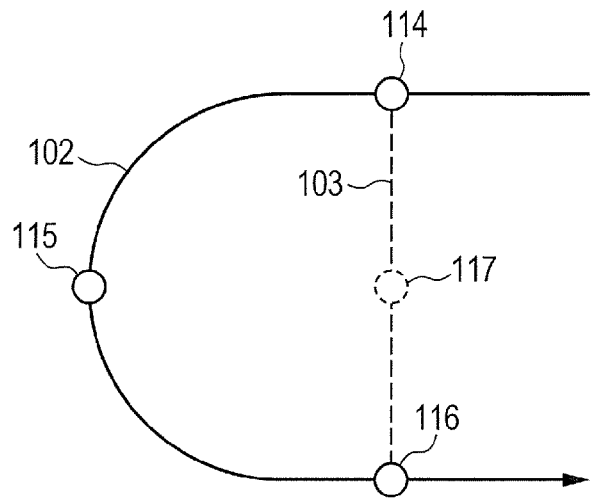
FIG. 8B is a diagram of a second example of the route taken by the vehicle and positions at which log data pieces are generated respectively.

With reference to FIG. 8B, on a curved route 102 taken by the vehicle, there are equally-spaced positions 114, 115, and 116 at each of which a log data piece is generated and stored into the log buffer in the storage device 34.

In the case where the direction of travel of the vehicle is changed and the curved route 102 is formed as shown in FIG. 8B, if the log data piece generated at the position 115 was erased, the position 115 could not be correctly recovered through interpolation using the positions 114 and 116. Specifically, the interpolation would calculate the middle point 117 on a straight line 103 between the positions 114 and 116 and label the calculated middle point 117 as the position 115. The straight line 103 would be recognized as a portion of a route taken by the vehicle. As shown in FIG. 8B, the middle point 117 is separate from the position 115, and the straight line 103 differs from the actual route 102. Thus, in this case, the server 50 would incorrectly recognize or detect the route 102 and hence provide incorrect information to the client or clients.

Accordingly, to prevent the server 50 from providing incorrect information to the client or clients, the navigation apparatus 30 makes a decision regarding whether or not second one, that is, intermediate one, among three successive log data pieces generated at three successive positions (first, second, and third positions) respectively should be designated as an object to be erased (a to-be-erased object) on the basis of the relation among the three positions. Specifically, the first straight line is calculated which connects the first position and the second position. The second straight line is calculated which connects the second position and the third position. The angle formed between the first straight line and the second straight line is calculated. The calculated angle is compared with a prescribed threshold value. When the calculated angle is equal to or greater than the threshold value, the log data piece generated at the second position is actually designated as an object to be erased. On the other hand, when the calculated angle is smaller than the threshold value, the log data piece generated at the second position is not designated as a to-be-erased object.

Figure 8C:
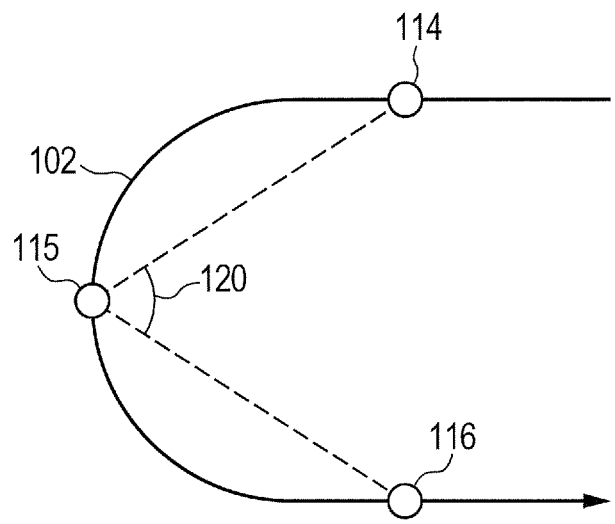
FIG. 8C corresponds to FIG. 8B and is another diagram of the above second example.

With reference to FIG. 8C showing the conditions same as those of FIG. 8B, the positions 114, 115, and 116 are called the first, second, and third positions respectively. The first straight line is calculated which connects the first position 114 and the second position 115. The second straight line is calculated which connects the second position 115 and the third position 116. At the second position 115, the angle 120 formed between the first straight line and the second straight line is calculated. A threshold value for the angle 120 is set to, for example, 180 degrees. In the case where the angle 120 is equal to 180 degrees (the threshold value), the direction of travel of the vehicle at the third position 116 remains the same as that at the first position 114. In this case, the log data piece generated at the second position 115 is designated as an object to be erased. On the other hand, in the case where the angle 120 is smaller than 180 degrees, the direction of travel of the vehicle at the third position 116 is changed from that at the first position 114. Under the conditions of FIG. 8C, since the angle 120 is smaller than 180 degrees, the direction of travel of the vehicle at the third position 116 is changed from that at the first position 114. Thus, in the conditions of FIG. 8C, if the log data piece generated at the second position 115 was erased, the second position 115 could not be correctly recovered through interpolation using the first and third positions 114 and 116. To prevent such a problem, the log data piece generated at the second position 115 is not designated as an object to be erased.

The threshold value for the angle 120 may differ from 180 degrees. The threshold value may be equal to (180−α) degrees, where "α" denotes a predetermined positive angle. Preferably, the predetermined angle "α" is chosen so that the threshold value will be near 180 degrees. In this case, the angle 120 being equal to or greater than the threshold value corresponds to almost no difference between the direction of travel of the vehicle at the first position 114 and that at the third position 116. Thus, when the angle 120 is equal to or greater than the threshold value, the log data piece generated at the second position 115 is designated as an object to be erased and the second position 115 can be substantially correctly recovered through interpolation using the first and third positions 114 and 116. On the other hand, when the angle 120 is smaller than the threshold value, the log data piece generated at the second position 115 is not designated as an object to be erased. Most preferably, the predetermined angle "α" is significantly smaller than 180 degrees. The predetermined angle "α" may be smaller than 18 degrees (10% of 180 degrees).

Figure 9:
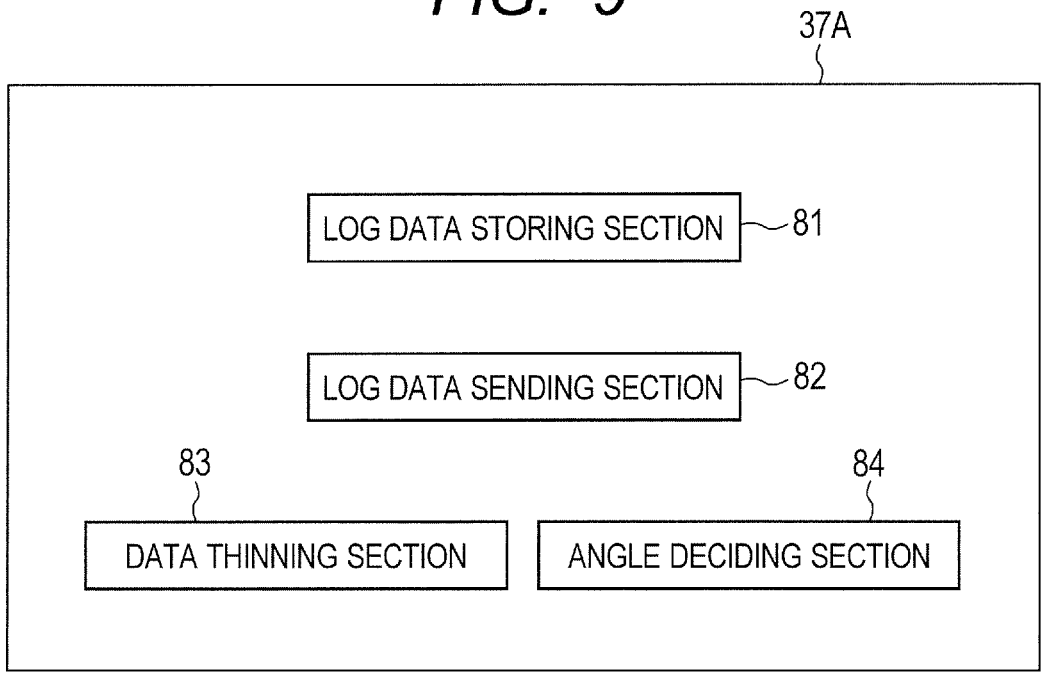
FIG. 9 is a diagram of a controller in a navigation apparatus according to a second embodiment of this invention.

FIG. 9 shows a controller 37A used instead of the controller 37 in FIGS. 2 and 4. The controller 37A is similar to the controller 37 except that an angle deciding section 84 is additionally provided therein.

The angle deciding section 84 refers to three successive log data pieces (first, second, and third log data pieces) in the log buffer in the storage device 34. The angle deciding section 84 calculates the first straight line connecting the positions represented by the first and second log data pieces, and the second straight line connecting the positions represented by the second and third log data pieces. The angle deciding section 84 calculates the angle between the first and second straight lines at the position represented by the second log data piece. The angle deciding section 84 compares the calculated angle with the previously-mentioned threshold value. When the calculated angle is equal to or greater than the threshold value, the angle deciding section 84 designates the second log data piece as an object to be erased. In this case, the data thinning section 83 erases the designated second log data piece from the log buffer. On the other hand, when the calculated angle is smaller than the threshold value, the angle deciding section 84 does not designate the second log data piece as an object to be erased. In this case, the second log data piece continues to be in the log buffer.

Figure 10:
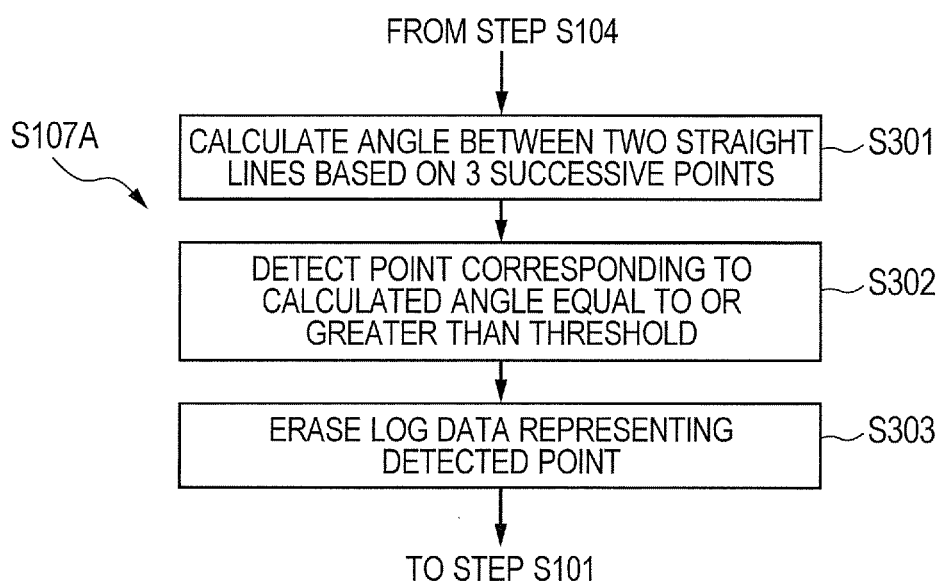
FIG. 10 is a flowchart of the details of a data thinning block in the second embodiment of this invention.

FIG. 10 shows the details of a data thinning block S107A which replaces the data thinning block S107 in FIG. 6. As shown in FIG. 10, the data thinning block S107A has sequential steps S301, S302, and S303. The step S301 follows the step S104 in FIG. 6. The step S303 is followed by the step S101 in FIG. 6.

In the step S301, the angle deciding section 84 reads out three successive log data pieces (first, second, and third log data pieces) from the log buffer in the storage device 34. Then, the angle deciding section 84 calculates the first straight line connecting the positions represented by the first and second log data pieces, and the second straight line connecting the positions represented by the second and third log data pieces. The angle deciding section 84 calculates the angle between the first and second straight lines at the position represented by the second log data piece.

In the step S302 following the step S301, the angle deciding section 84 compares the calculated angle with the threshold value. When the calculated angle is equal to or greater than the threshold value, the angle deciding section 84 designates the second log data piece as an object to be erased. On the other hand, when the calculated angle is smaller than the threshold value, the angle deciding section 84 does not designate the second log data piece as a to-be-erased object.

In the step S303 subsequent to the step S302, the data thinning section 83 accesses one among the log data pieces in the log buffer which is designated by the angle deciding section 84 as an object to be erased. The data thinning section 83 erases the designated log data piece from the related log data storage area in the log buffer. Thereby, this log data storage area is made usable for storing a new log data piece. In the absence of such a designated log data piece, the data thinning section 83 holds the log data pieces in the log buffer as they are.

The above-mentioned processes in each of the steps S301-S303 may be implemented for each of all combinations of successive three among the log data pieces in the log buffer. The above-mentioned processes in the sequence of the steps S301-S303 may be iterated for all combinations of successive three among the log data pieces in the log buffer while every implementation of the processes in the sequence is assigned to one combination. The data thinning process by the block S107A may be applied to only one or more of all combinations of successive three among the log data pieces in the log buffer. As the data thinning process is applied to more of all combinations, more log data pieces can be erased from the log buffer and more log data storage areas in the log buffer will be usable for storing new log data pieces.

Thinning out log data pieces in the log buffer may be performed at a prescribed thinning rate as in the first embodiment of this invention. According to a first example, the data thinning process by the block S107A continues to be repetitively performed until the number of log data pieces each designated as a to-be-erased object reaches a predetermined value corresponding to the prescribed thinning rate. According to a second example, in the case where the number of log data pieces each designated as a to-be-erased object exceeds the predetermined value corresponding to the prescribed thinning rate as a result of the application of the data thinning process by the block S107A to all combinations of successive three among the log data pieces in the log buffer, the designated log data pieces are arranged in order of how the related angle is close to the threshold value or order of increasing the related angle. In the second example, a given number of log data pieces at serial places starting from one corresponding to the related angle closest to the threshold value or starting from one corresponding to the greatest related angle are selected from the arranged designated log data pieces. The given number is predetermined to correspond to the prescribed thinning rate. In the second example, selected ones of the designated log data pieces remain labeled as objects to be erased while unselected ones are excluded from the to-be-erased objects.

Figure 8D:
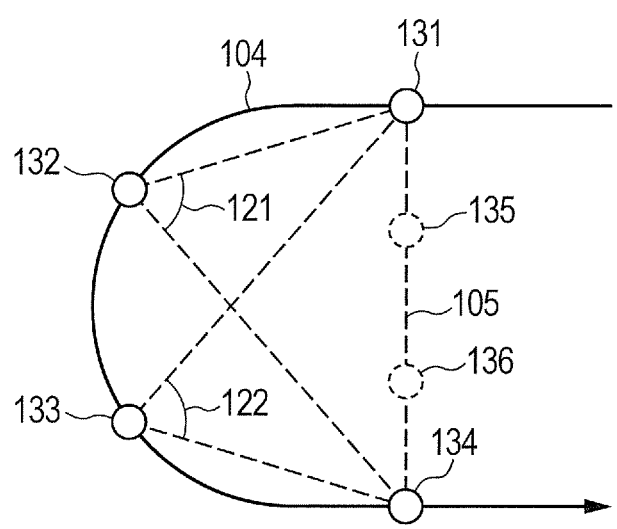
FIG. 8D is a diagram of a third example of the route taken by the vehicle and positions at which log data pieces are generated respectively.

Three successive log data pieces in the log buffer for a decision about a to-be-erased object may be replaced by three non-successive log data pieces arranged in order of generation time. With reference to FIG. 8D, on a curved route 104 taken by the vehicle, there are equally-spaced positions 131, 132, 133, and 134 at each of which a log data piece is generated and stored into the log buffer in the storage device 34. According to a first example, log data pieces generated at the positions 131, 132, and 134 are used for a decision about a to-be-erased object, and are called first, second, and third positions respectively. Since it is detected from the angle 121 between the straight lines at the second position 132 that the direction of travel of the vehicle at the third position 134 is changed from that at the first position 131, the log data piece generated at the second position 132 is not designated as object to be designated. Therefore, the log data piece generated at the second position 132 is left as it is. Thus, it is possible to prevent erasure of the log data piece generated at the second position 132 and interpolation responsive to the log data pieces generated at the first and third positions 131 and 134 which would erroneously recognize a position 135 on the straight line 105 between the first and third positions 131 and 134 as the second position 132. Furthermore, it is possible to prevent the straight line 105 from being recognized as a portion of a route taken by the vehicle. According to a second example, log data pieces generated at the positions 131, 133, and 134 are used for a decision about a to-be-erased object, and are called first, second, and third positions respectively. Since it is detected from the angle 122 between the straight lines at the second position 133 that the direction of travel of the vehicle at the third position 134 is changed from that at the first position 131, the log data piece generated at the second position 133 is not designated as an object to be designated. Therefore, the log data piece generated at the second position 133 is left as it is. Thus, it is possible to prevent erasure of the log data piece generated at the second position 133 and interpolation responsive to the log data pieces generated at the first and third positions 131 and 134 which would erroneously recognize a position 136 on the straight line 105 between the first and third positions 131 and 134 as the second position 133. Furthermore, it is possible to prevent the straight line 105 from being recognized as a portion of a route taken by the vehicle.

As previously described, three log data pieces in the log buffer, that is, a first log data piece, a second log data piece generated after the generation of the first log data piece, and a third log date piece generated after the generation of the second log data piece are used for a decision about a to-be-erased object regarding the second log data piece. Specifically, a decision is made about whether or not the second log data piece is designated as a to-be-erased object on the basis of the relation among the positions represented by the first, second, and third log data pieces. In more detail, the first straight line is calculated which connects the positions represented by the first and third log data pieces. The second straight line is calculated which connects the positions represented by the second and third log data pieces. The angle formed between the first straight line and the second straight line at the position represented by the second log data piece is calculated. The calculated angle is compared with the threshold value. When the calculated angle is equal to or greater than the threshold value, the second log data piece is designated as an object to be erased. On the other hand, when the calculated angle is smaller than the threshold value, the second log data piece is not designated as a to-be-erased object. Preferably, the second log data piece designated as a to-be-erased object is actually erased from the related log data storage area in the log buffer. Alternatively, the log data storage area storing the second log data piece designated as a to-be-erased object may be changed into an overwritable state, that is, a state where a new log data piece can be accepted and written over the stored second log data piece. This state change is performed by the controller 37A. On the other hand, the second log data piece not designated as a to-be-erased object is left in the related log data storage area in the log buffer as it is. The log data storage area storing the second log data piece not designated as a to-be-erased object may be held in a write-protection state, that is, a state where a new log data piece is inhibited from being accepted and written over the stored second log data piece.

As previously mentioned, the position represented by a log data piece generated and stored during the travel of the vehicle along a curved course can not be correctly recovered by interpolation. Since such a log data piece is prevented from being erased, it is possible to suppress a reduction in the accuracy of the route taken by the vehicle which is computed from the positions represented by non-erased log data pieces.

Third Embodiment

A third embodiment of this invention is similar to the first embodiment thereof except for design changes mentioned hereafter. In the third embodiment of this invention, a method of thinning out log data pieces in the storage device 34 is designed to further suppress a reduction in the accuracy of the route taken by the vehicle which is computed from non-erased log data pieces.

Figure 11A:
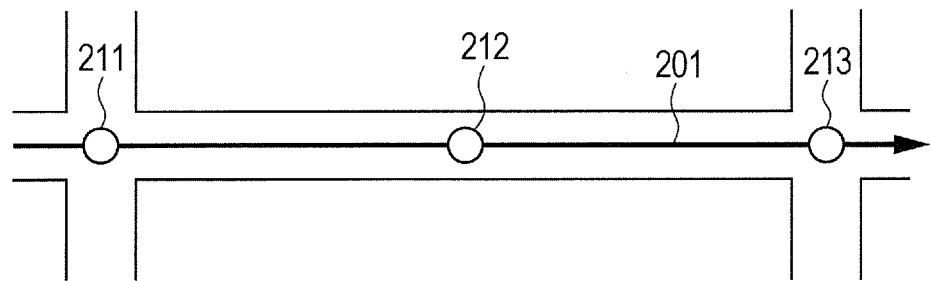
FIG. 11A is a diagram of a first example of roads, the route taken by the vehicle, and positions at which log data pieces are generated respectively.

With reference to FIG. 11A, on a route 201 taken by the vehicle, there are spaced positions (locations) 211, 212, and 213 at each of which a log data piece is generated and stored into the log buffer in the storage device 34. Each generated log data piece represents corresponding one of the positions 211, 212, and 213. In the case where a detour or by-road is absent from the portion of the route 201 between the positions 211 and 213 as shown in FIG. 11A, if the log data piece generated at the position 212 is erased, the route portion taken by the vehicle between the positions 211 and 213 can be uniquely decided on the basis of a related map. In other words, the route portion can be correctly computed from the positions 211 and 213. Thus, even if the log data piece generated at the position 212 is erased so that only the log data pieces generated at the positions 211 and 213 are sent to the server 50 from the navigation apparatus 30, the server 50 can correctly recognize or detect the route potion taken by the vehicle on the basis of the positions 211 and 213 represented by the log data pieces sent from the navigation apparatus 30 and the related map represented by map information in the storage 52. Accordingly, in this case, the server 50 can generate correct information for a client or clients from the correctly recognized route portion and can provide the generated correct information to the client or clients.

Figure 11B:
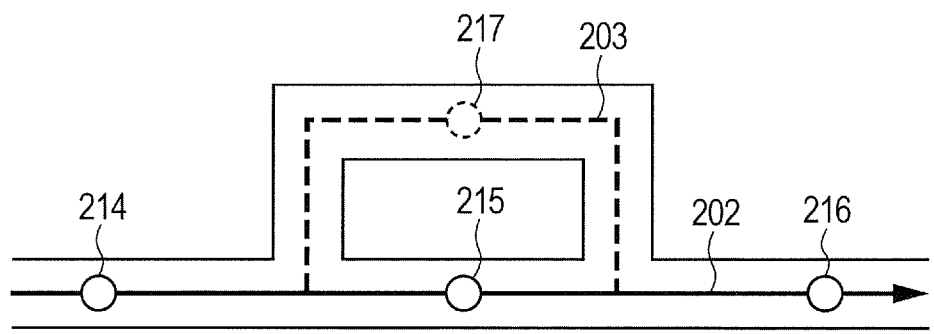
FIG. 11B is a diagram of a second example of roads, the route taken by the vehicle, and positions at which log data pieces are generated respectively.

With reference to FIG. 11B, on a route 202 taken by the vehicle, there are spaced positions 214, 215, and 216 at each of which a log data piece is generated and stored into the log buffer in the storage device 34. Each generated log data piece represents corresponding one of the positions 214, 215, and 216. In the case where a detour or by-road 203 is present in the portion of the route 202 between the positions 214 and 216 as shown in FIG. 11B, if the log data piece generated at the position 215 was erased, the route portion taken by the vehicle between the positions 214 and 216 could not be uniquely decided on the basis of a related map for the following reason. Specifically, in the case where the position 215 exists between the connections of the detour 203 with the route 202 as shown in FIG. 11B, if the log data piece generated at the position 215 was erased, it would be difficult to decide which of the detour 203 and the portion of the route 202 the vehicle actually takes or which of a position 217 on the detour 203 and the position 215 on the route 202 the vehicle actually passes. Thus, the detour 203 might be erroneously recognized as a route portion taken by the vehicle. Accordingly, if the log data piece generated at the position 215 was erased so that only the log data pieces generated at the positions 214 and 216 were sent to the server 50 from the navigation apparatus 30, the server 50 might incorrectly recognize or detect the route potion taken by the vehicle on the basis of the positions 214 and 216 represented by the log data pieces sent from the navigation apparatus 30 and the related map represented by the map information. Therefore, in this case, the server 50 might generate incorrect information for a client or clients from the incorrectly recognized route portion and provide the generated incorrect information to the client or clients.

Accordingly, to prevent the server 50 from providing incorrect information to the client or clients, the navigation apparatus 30 makes a decision regarding whether a detour is present in or absent from a route portion between the positions represented by first and third log data pieces on the basis of a related map represented by the map information in the storage device 34. In the absence of a detour, a second log data piece between the first and third log data pieces in terms of generation time (store time) is designated as an object to be erased. On the other hand, in the presence of a detour, the second log data piece is not designated as a to-be-erased object.

Figure 12:
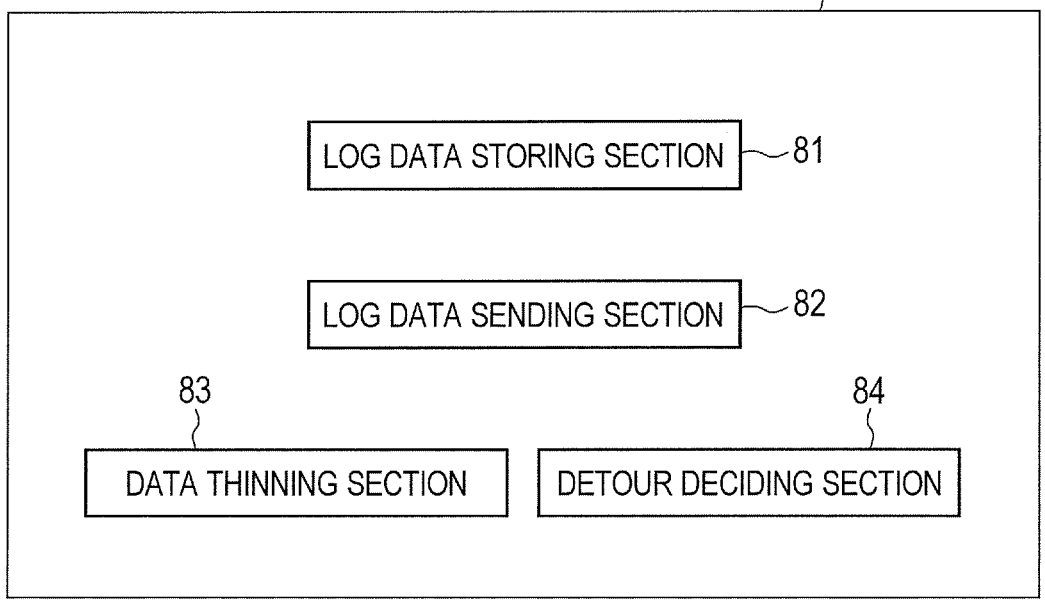
FIG. 12 is a diagram of a controller in a navigation apparatus according to a third embodiment of this invention.

FIG. 12 shows a controller 37B used instead of the controller 37 in FIGS. 2 and 4. The controller 37B is similar to the controller 37 except that a detour deciding section 85 is additionally provided therein.

The detour deciding section 85 selects two from log data pieces in the log buffer in the storage device 34. The detour deciding section 85 decides whether a detour is present in or absent from a route portion between the positions represented by the selected log data pieces. In the absence of a detour, the detour deciding section 85 searches the log buffer for a log data piece or pieces (a target log data piece or pieces) between the selected log data pieces in terms of generation time. The detour deciding section 85 designates the target log data piece or pieces as an object or objects to be erased. On the other hand, in the presence of a detour, the detour deciding section 85 does not perform the designation concerning a to-be-erased object or objects.

Figure 13:
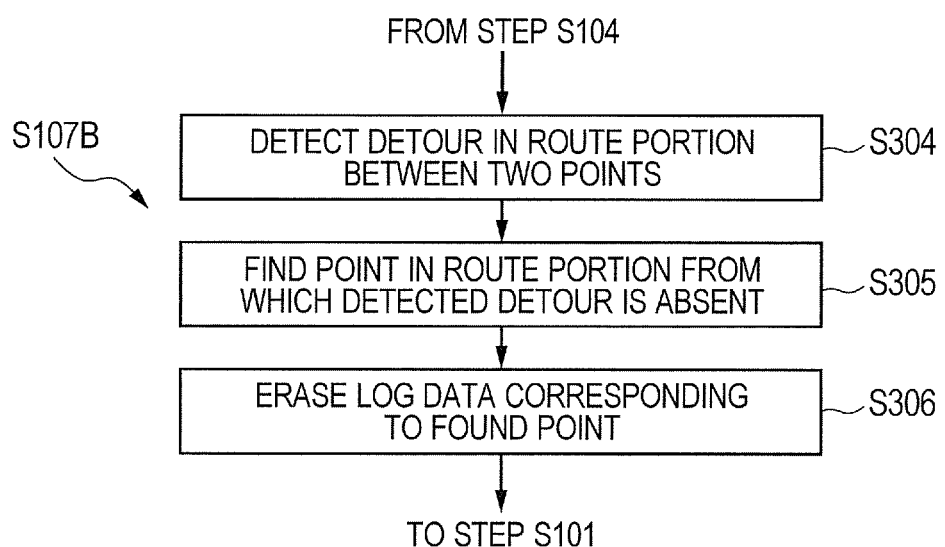
FIG. 13 is a flowchart of the details of a data thinning block in the third embodiment of this invention.

FIG. 13 shows the details of a data thinning block S107B which replaces the data thinning block S107 in FIG. 6. As shown in FIG. 13, the data thinning block S107B has sequential steps S304, S305, and S306. The step S304 follows the step S104 in FIG. 6. The step S306 is followed by the step S101 in FIG. 6.

In the step S304, the detour deciding section 85 selects two from log data pieces in the log buffer in the storage device 34. The detour deciding section 85 decides whether a detour is present in or absent from a route portion between the positions represented by the selected log data pieces on the basis of the map information in the storage device 34.

In the step S305 following the step S304, the detour deciding section 85 searches the log buffer for a log data piece or pieces (a target log data piece or pieces) between the selected log data pieces in terms of generation time when the step S304 detects the absence of a detour. The detour deciding section 85 designates the target log data piece or pieces as an object or objects to be erased. On the other hand, the detour deciding section 85 does not perform the designation concerning a to-be-erased object or objects when the step S304 detects the presence of a detour.

In the step S306 subsequent to the step S305, the data thinning section 83 accesses one or ones among the log data pieces in the log buffer which are designated by the detour deciding section 85 as an object or objects to be erased. The data thinning section 83 erases the designated log data piece or pieces from the related log data storage area or areas in the log buffer. Thereby, the log data storage area or areas are made usable for storing a new log data piece or pieces. In the absence of such a designated log data piece, the data thinning section 83 holds the log data pieces in the log buffer as they are.

The above-mentioned processes in each of the steps S304-S306 may be implemented for each of all combinations of two among the log data pieces in the log buffer. The above-mentioned processes in the sequence of the steps S304-S306 may be iterated for all combinations of two among the log data pieces in the log buffer while every implementation of the processes in the sequence is assigned to one combination. The data thinning process by the block S107B may be applied to only one or more of all combinations of two among the log data pieces in the log buffer. As the data thinning process is applied to more of all combinations, more log data pieces can be erased from the log buffer and more log data storage areas in the log buffer will be usable for storing new log data pieces.

Thinning out log data pieces in the log buffer may be performed at a prescribed thinning rate as in the first embodiment of this invention. According to an example, the data thinning process by the block S107B continues to be repetitively performed until the number of log data pieces each designated as a to-be-erased object reaches a predetermined value corresponding to the prescribed thinning rate.

Preferably, selected two among log data pieces in the log buffer are such that one or more log data pieces are between the selected log data pieces in terms of generation time. Most preferably, selected two among log data pieces in the log buffer are such that only one log data piece is between the selected log data pieces in terms of generation time. In this case, the data thinning process is applied to combinations of two among the log data pieces in the log buffer where the two meet the condition that only one log data piece is between them in terms of generation time, and more log data pieces can be erased from the log buffer and more log data storage areas in the log buffer can be used for storing new log data pieces.

As will be explained hereafter, the above-mentioned data thinning process may be modified or replaced by another process provided that a route can be uniquely decided even after the implementation of the process.

Figure 11C:
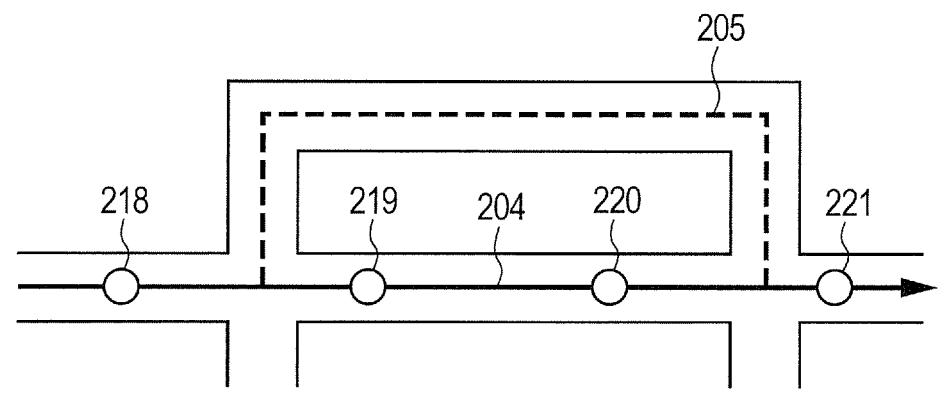
FIG. 11C is a diagram of a third example of roads, the route taken by the vehicle, and positions at which log data pieces are generated respectively.

With reference to FIG. 11C, on a route 204 taken by the vehicle, there are spaced positions 218, 219, 220, and 221 at each of which a log data piece is generated and stored into the log buffer in the storage device 34. Each generated log data piece represents corresponding one of the positions 218, 219, 220, and 221. There is a detour or by-road 205 with respect to the route 204. The positions 219 and 220 are between the points of connections of the route 204 with the detour 205. Provided that at least one of the log data pieces representing the positions 219 and 220 is left in the log buffer as it is, the route 204 can be correctly recognized. In other words, it is possible to prevent the detour 205 from being erroneously recognized as a route portion taken by the vehicle. Thus, it is good to erase one of the log data pieces representative of the positions 219 and 220 from the log buffer.

Accordingly, the detour deciding section 85 may decide whether or not at least one connection with a detour (one fork) is present in a route portion between the positions represented by selected two among log data pieces in the log buffer on the basis of the map information in the storage device 34. In this case, when at least one connection with a detour is not present, the detour deciding section 85 may designate one of the two log data pieces as a to-be-erased object to allow writing a new log data piece into one of the log data storage areas storing the two log data pieces. In other words, when at least one connection with a detour is not present, the detour deciding section 85 may inhibit writing a new log data piece into one of the log data storage areas storing the two log data pieces. On the other hand, when at least one connection with a detour is present, the detour deciding section 85 may inhibit writing new log data pieces into the log data storage areas storing the two log data pieces. Preferably, the two log data pieces are successive in terms of generation time. This design enables more log data pieces to be erased from the log buffer and more new log data pieces to be stored thereinto.

As previously described, two are selected from log data pieces in the log buffer, and a decision is made concerning whether a detour is present in or absent from a route portion between the positions represented by the selected log data pieces on the basis of the map information. When a detour is absent, a new log data piece or pieces are allowed to be written into a log data storage area or areas storing a log data piece or pieces representing a position or positions between the positions represented by the selected log data pieces. On the other hand, when a detour is present, a new log data piece or pieces are inhibited from being written into a log data storage area or areas storing a log data piece or pieces representing a position or positions between the positions represented by the selected log data pieces. Thereby, log data pieces in the log buffer are thinned out in a manner such that a route portion taken by the vehicle can be uniquely decided on the basis of log data pieces left in the log buffer. Thus, it is possible to further suppress a reduction in the accuracy of the route taken by the vehicle which is computed from the positions represented by remaining log data pieces.

The server 50 receives, from the navigation apparatus 30, log data pieces remaining after undergoing the data thinning process. The server 50 detects the route taken by the vehicle on the basis of the received log data pieces and the map information in the storage 52. Preferably, the map information used by the navigation apparatus 30 for the data thinning process and the map information used by the server 50 for detection of the route are equal in positions of detours. Most preferably, the map information in the storage device 34 in the navigation apparatus 30 and the map information in the storage 52 in the server 50 are equal in map contents.

The navigation apparatus 30 may receive map information from the server 50 at a proper timing, and perform the data thinning process through the use of the received map information. In this case, the map information used by the navigation apparatus 34 is equalized to the map information used by the server 50. Thus, the navigation apparatus 30 may use one-line map information.

Fourth Embodiment

A fourth embodiment of this invention is similar to the third embodiment thereof except for design changes mentioned hereafter. A data thinning process in the fourth embodiment of this invention is a modification of that in the third embodiment thereof.

Generally, forks in an expressway are interchanges and junctions only. The fourth embodiment of this invention is designed in view of this fact. Specifically, during the travel of the vehicle along an expressway, interchanges at the expressway are detected as forks (connections with detours) used in a data thinning process. During the travel along an expressway, when an interchange is absent from a route portion between the positions represented by selected two among log data pieces in the log buffer, a log data piece or pieces between the selected log data pieces in terms of generation time (store time) are designated as a to-be-erased object or objects.

Figure 14:
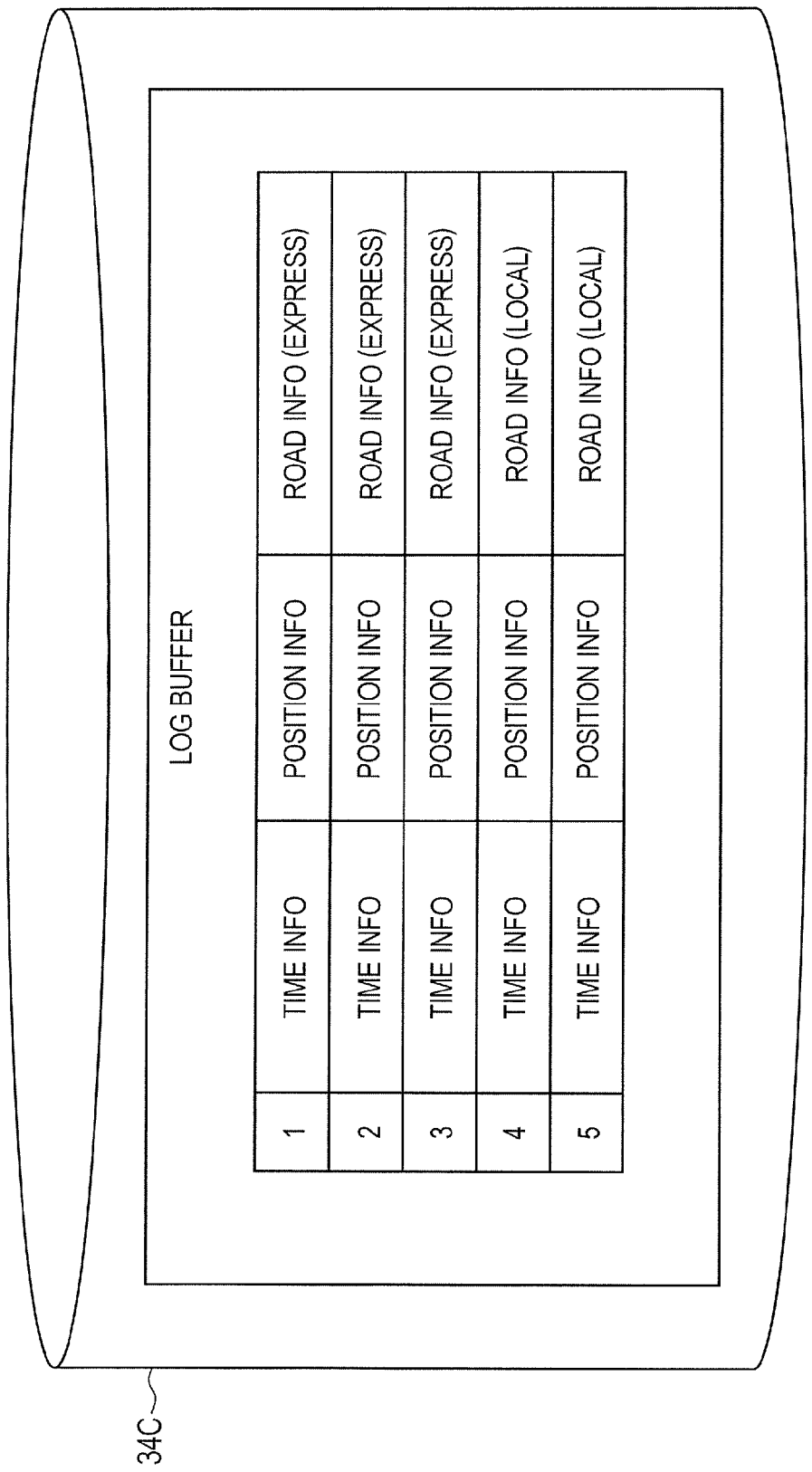
FIG. 14 is a diagram of a storage device in a navigation apparatus according to a fourth embodiment of this invention.

FIG. 14 shows a storage device 34C which replaces the storage device 34 in FIGS. 2 and 5. A road information piece is generated when every log data piece is generated. The road information piece represents whether a road along which the vehicle is traveling is an expressway or a local road. Briefly, the road information piece denotes an expressway or a local road. When each log data piece is stored into the log buffer in the storage device 34C, a corresponding road information piece is stored into the log buffer at a place adjoining the place of the log data piece. Thus, in the log buffer, the stored log data piece and the stored road information piece are in correspondence or in a set. Each log data piece contains a positional information piece representing the position of the vehicle which occurs at a log timing. Thus, by collating a vehicle position represented by a log data piece with a map represented by the map information in the storage device 34C, it is possible to decide whether the vehicle is traveling along an expressway or a local road.

Figure 15:
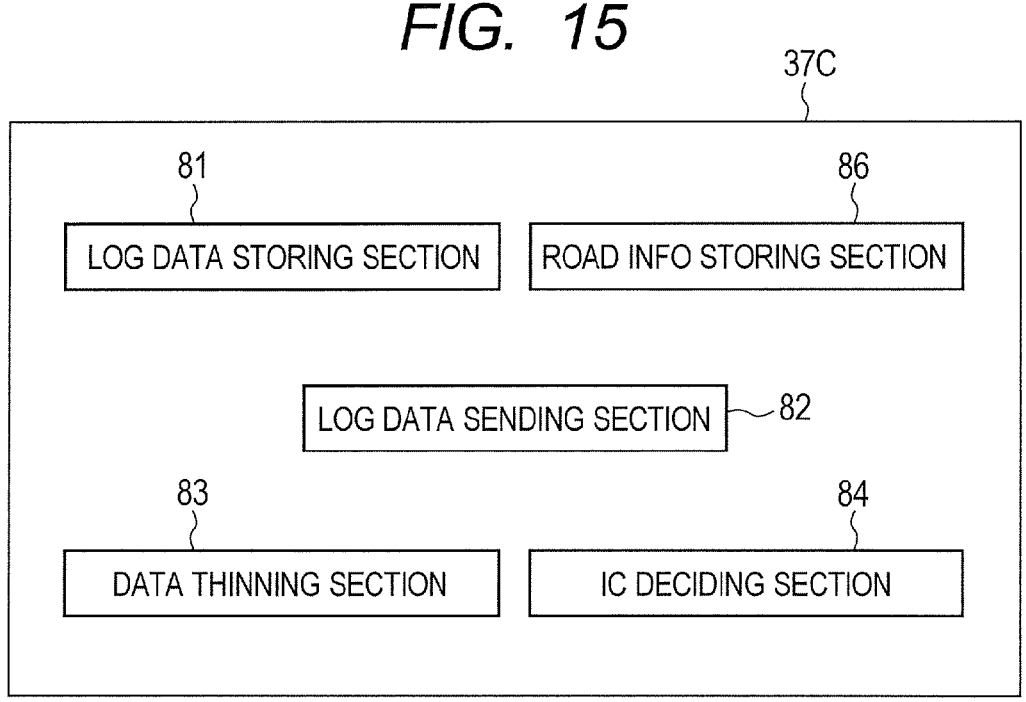
FIG. 15 is a diagram of a controller in the navigation apparatus in the fourth embodiment of this invention.

FIG. 15 shows a controller 37C used instead of the controller 37 in FIGS. 2 and 4. The controller 37C is similar to the controller 37 except that a road information storing section 86 and an IC (interchange) deciding section 87 are additionally provided therein. At every log timing, the IC deciding section 87 collates the position represented by the information from the GPS 41 receiver with the map information in the storage device 34C, and thereby decides whether the vehicle is traveling along an expressway or a local road. The IC deciding section 87 generates, from the result of the decision, a road information piece representing whether the vehicle is traveling along an expressway or a local road. The road information storing section 86 stores the generated road information piece into the log buffer in the storage device 34C in a manner such that the road information piece and the log data piece generated at the same log timing will be in correspondence or in a set.

The IC deciding section 87 refers to road information pieces in the log buffer, and selects two from log data pieces in the log buffer which correspond to road information pieces each representative of the travel along an expressway. The IC deciding section 87 refers to the map information and thereby decides whether or not an interchange is present in or absent from a route portion between the positions represented by the selected log data pieces. In the absence of an interchange, the IC deciding section 87 searches the log buffer for a log data piece or pieces (a target log data piece or pieces) between the selected log data pieces in terms of generation time. The IC deciding section 87 designates the target log data piece or pieces as an object or objects to be erased. On the other hand, in the presence of an exchange, the IC deciding section 87 does not perform the designation concerning a to-be-erased object or objects.

Figure 16:
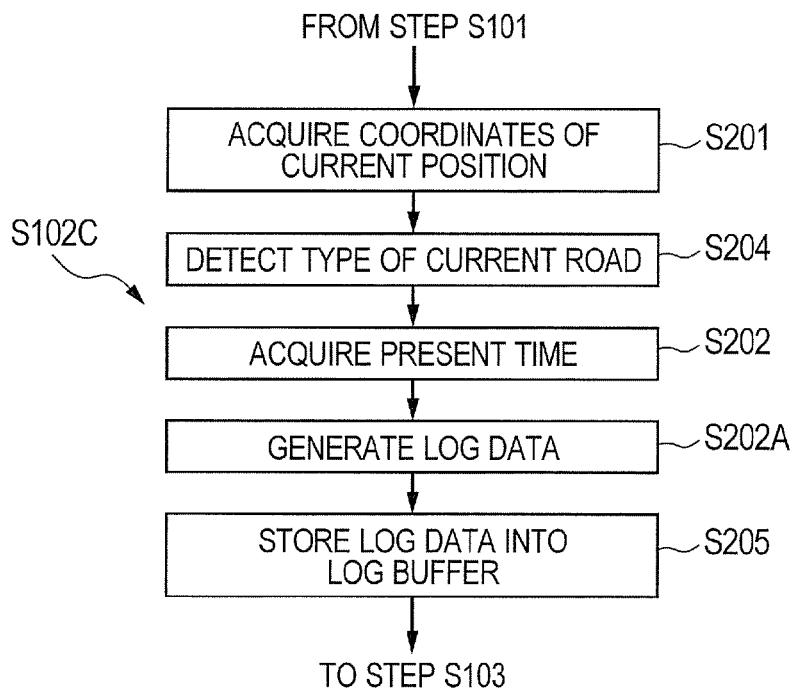
FIG. 16 is a flowchart of the details of a log data storing block in the fourth embodiment of this invention.

FIG. 16 shows the details of a log data storing block S102C which replaces the log data storing block S102 in FIG. 6. As shown in FIG. 16, the log data storing block S102C has a sequence of steps S201, S204, S202, S202A, and S205. The step S201 follows the step S101 of FIG. 6. The step S205 is followed by the step S103 of FIG. 6. The steps S201, S202, and S202A are the same as those in FIG. 6.

In the step S204 between the steps S201 and S202, the IC deciding section 87 detects the type of a road along which the vehicle is traveling, and generates a road information piece representative of the detected road type at the present log timing. Specifically, the IC deciding section 87 collates the position represented by the information from the GPS 41 receiver with the map information in the storage device 34C, and thereby decides whether the vehicle is traveling along an expressway or a local road. The IC deciding section 87 generates, from the result of the decision, a road information piece representing whether the vehicle is traveling along an expressway or a local road.

In the step S205 following the step S202A, the log data storing section 81 stores the generated log data piece into unoccupied one among the log data storage areas in the log buffer. Furthermore, the road information storing section 86 stores the generated road information piece into the log buffer in the storage device 34C in a manner such that the road information piece and the log data piece generated at the same log timing will be in correspondence or in a set.

The IC deciding section 87 selects, from log data pieces in the log buffer, two which correspond to road information pieces each denoting an express way. The IC deciding section 87 searches the log buffer for a target log data piece or pieces between the selected log data pieces in terms of generation time. The IC deciding section 87 designates the target log data piece or pieces as a to-be-erased object or objects when a corresponding road information piece or pieces denote an expressway. On the other hand, the IC deciding section 87 does not designate the target log data piece or pieces as a to-be-erased object or objects when a corresponding road information piece or pieces denote a local road. Thus, it is possible to prevent the occurrence of the problem that in the case where the vehicle moves from an expressway to a local road and travels along the local road before returning from the local road to the expressway, a log data piece generated during the travel along the local road is erased.

The IC deciding section 87 may detect junctions rather than interchanges. The IC deciding section 87 may detect forks rather than interchanges. The forks are interchanges and junctions.

As previously described, from log data pieces in the log buffer, two are selected which correspond to road information pieces each denoting an expressway. By referring to the map information, a decision is made concerning whether or not an interchange is present in or absent from a route portion between the positions represented by the selected log data pieces. When an interchange is absent, a new log data piece or pieces are allowed to be written into a log data storage area or areas storing a log data piece or pieces between the selected log data pieces in terms of generation time. On the other hand, when an interchange is present, a new log data piece or pieces are inhibited from being written into a log data storage area or areas storing a log data piece or pieces between the selected log data pieces in terms of generation time. Thereby, log data pieces in the log buffer are thinned out in a manner such that a route portion taken by the vehicle can be uniquely decided on the basis of log data pieces left in the log buffer. Thus, it is possible to further suppress a reduction in the accuracy of the route taken by the vehicle which is computed from the positions represented by remaining log data pieces.

Only log data pieces generated and stored during the travel along an expressway are candidates for objects to be erased, and only interchanges are detected for the decision concerning whether or not log data pieces are designated as to-be-erased objects. Log data pieces generated during the travel along an interchange-less portion of an expressway are thinned out. Thereby, it is possible to reduce the processing load on the navigation apparatus 30.

Fifth Embodiment

A fifth embodiment of this invention is similar to the first embodiment thereof except for design changes mentioned hereafter. In the fifth embodiment of this invention, a storage device 34D replaces the storage device 34 in FIGS. 2 and 5, and a method of thinning out log data pieces in the storage device 34D is designed to further suppress a reduction in the accuracy of the route taken by the vehicle which is computed from non-erased log data pieces.

The navigation apparatus 30 is a car navigation system. Thus, the navigation apparatus 30 searches the map represented by the information in the storage device 34D for an optimum route from a departure point to a destination, and indicates the optimum route (search-result route) to the user. In the event that the vehicle deviates from the optimum route, the navigation apparatus 30 searches the map again for a new optimum route from the current position of the vehicle to the destination, and indicates the new optimum route (new search-result route) to the user.

Therefore, the navigation apparatus 30 generates information representing an updateable search-result route. Generally, the information representing the search-result route is stored in the storage device 34D.

In the case where the vehicle remains traveling along the search-result route, the search-result route agrees with a route actually taken by the vehicle. Thus, in this case, if log data pieces generated during the travel along the search-result route are thinned out, positions passed by the vehicle can be correctly recovered through interpolation responsive to the search-result route so that a route actually taken by the vehicle can be correctly recognized.

Accordingly, log data pieces generated during the travel along the search-result route are designated as to-be-erased objects. On the other hand, log data pieces generated during the travel along a course deviating from the search-result route are not designated as to-be-erased objects.

Figure 17:
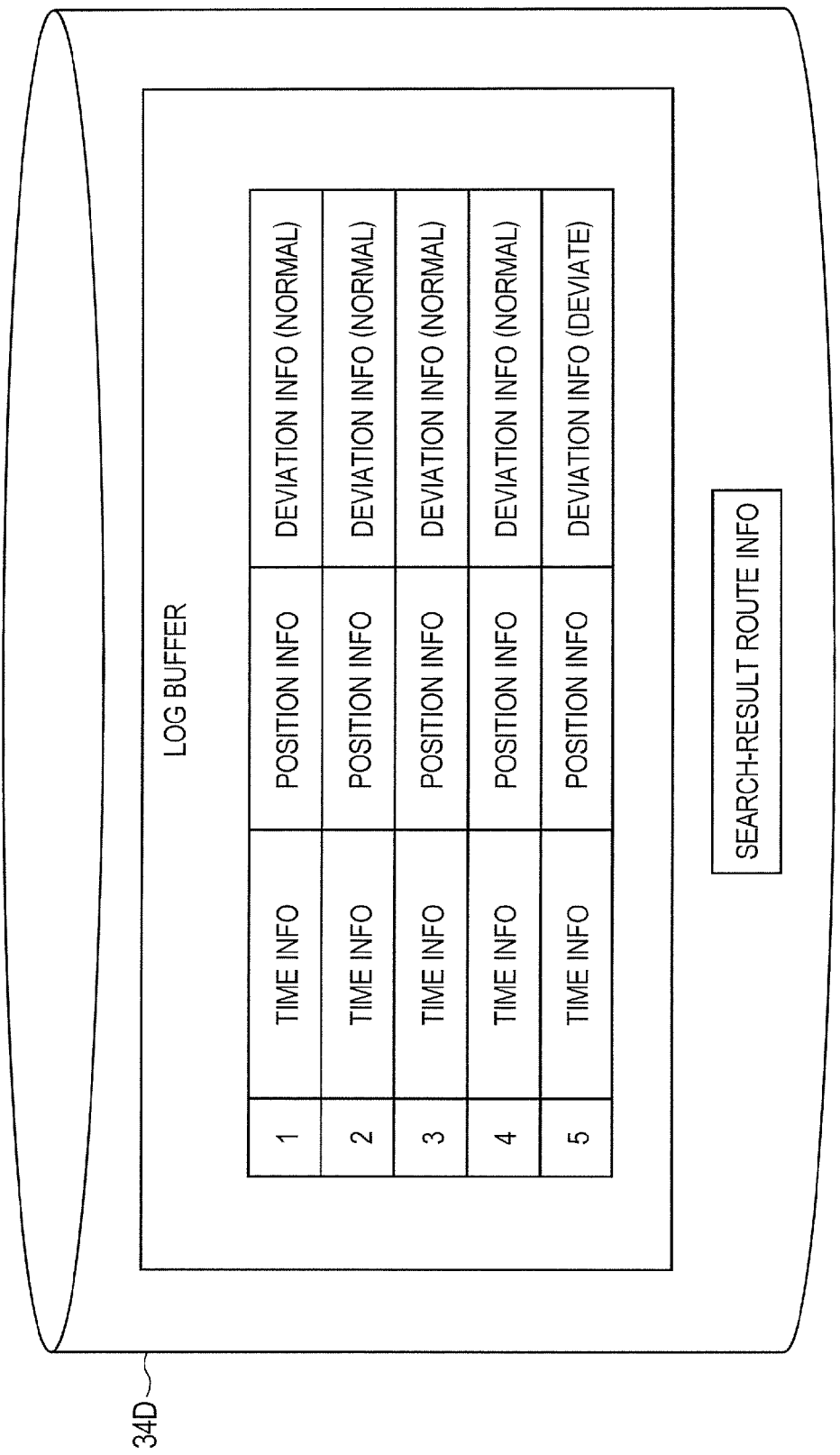
FIG. 17 is a diagram of a storage device in a navigation apparatus according to a fifth embodiment of this invention.

FIG. 17 shows the details of the storage device 34D. A deviation information piece is generated when every log data piece is generated. The deviation information piece indicates whether the vehicle position represented by the corresponding log data piece is on or off the search-result route. When every log data piece is stored into the log buffer in the storage device 34D, a corresponding deviation information piece is stored into the log buffer at a place adjoining the place of the log data piece. Thus, in the log buffer, the stored log data piece and the stored deviation information piece are in correspondence or in a set. Each log data piece contains a positional information piece representing the position of the vehicle which occurs at a log timing. Thus, by collating a vehicle position represented by a log data piece with a search-result route represented by the information in the storage device 34D, it is possible to decide whether or not the vehicle is off the search-result route at the time point same as the generation time of the log data piece. A deviation information piece is generated in accordance with the result of this decision.

In FIG. 17, a deviation information piece "normal" indicates that the vehicle position represented by the corresponding log data piece is on the search-result route. On the other hand, a deviation information piece "deviate" indicates that the vehicle position represented by the corresponding log data piece is off the search-result route.

Figure 18:
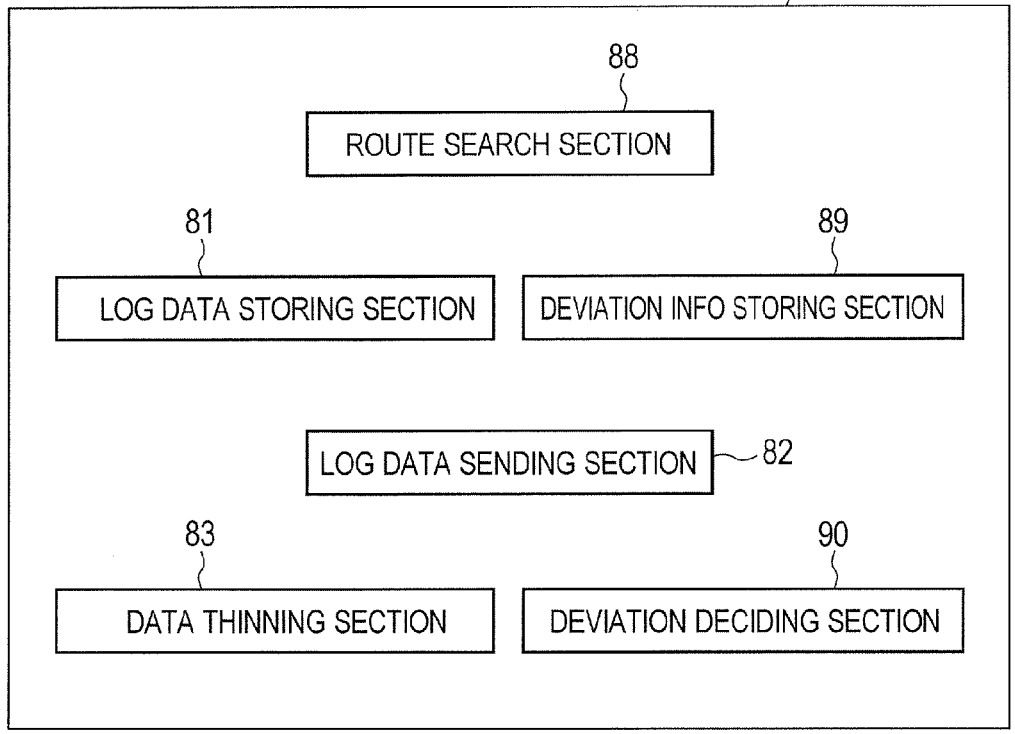
FIG. 18 is a diagram of a controller in the navigation apparatus in the fifth embodiment of this invention.

FIG. 18 shows a controller 37D used instead of the controller 37 in FIGS. 2 and 4. The controller 37D is similar to the controller 37 except that a route search section 88, a deviation information storing section 89, and a deviation deciding section 90 are additionally provided therein.

The route search section 88 searches for an optimum route from the current position of the vehicle to a destination appointed by the user, and indicates the optimum route (search-result route) to the user. When the user actuates the touch panel 31 and thereby inputs an appointed destination into the navigation apparatus 30, the touch panel 31 feeds input information representative of the destination to the controller 37D. The route search section 88 searches the map represented by the map information in the storage device 34 for an optimum route from the current position of the vehicle to the destination represented by the input information. Preferably, the route search section 88 derives the current position of the vehicle from the information outputted by the GPS receiver 41. The route search section 88 stores information representative of the search-result route (optimum route) into the storage device 34D. The route search section 88 generates picture information representing a map with the search-result route thereon, and feeds the generated picture information to the graphic device 32. Then, the graphic device 32 controls the LCD 33 to indicate the map with the search-result route thereon that is represented by the picture information. In this way, the search-result route is indicated to the user.

The route search section 88 decides whether the vehicle travels along or deviates form the search-result route by collating the current position of the vehicle with the search-result route. When deciding that the vehicle deviates from the search-result route, the route search section 88 performs the route search again to update the search-result route. The route search section 88 performs the above decision at each of timings temporally spaced at prescribed time intervals or each of timings corresponding to positions spaced at prescribed travel distance intervals.

At every log timing, the deviation information storing section 89 derives the current position of the vehicle from the information outputted by the GPS receiver 41, and decides whether the vehicle travels along or deviates from the search-result route by collating the current vehicle position with the search-result route given by the route search section 88. In response to the result of this decision, the deviation information storing section 89 generates a deviation information piece representing whether the vehicle travels along or deviates from the search-result route. The deviation information storing section 89 stores the generated deviation information piece into the log buffer in the storage device 34D in a manner such that the stored deviation information piece corresponds to a stored log data piece generated at the log timing same as that for the stored deviation information piece. Thus, in the log buffer, the stored log data piece and the stored deviation information piece are in correspondence or in a set.

The deviation deciding section 90 refers to each of deviation information pieces in the log buffer and thereby decides whether each of log data pieces in the log buffer is generated when the vehicle travels along or deviates from the search-result route. The deviation deciding section 90 designates a log data piece or pieces each decided to be generated when the vehicle travels along the search-result route as a to-be-erased object or objects. On the other hand, the deviation deciding section 90 does not designate a log data piece or pieces each decided to be generated when the vehicle deviates from the search-result route. Specifically, the deviation deciding section 90 designates a log data piece or pieces each corresponding to a deviation information piece "normal" as a to-be-erased object or objects. On the other hand, the deviation deciding section 90 does not designate a log data piece or pieces each corresponding to a deviation information piece "deviate".

Figure 19:
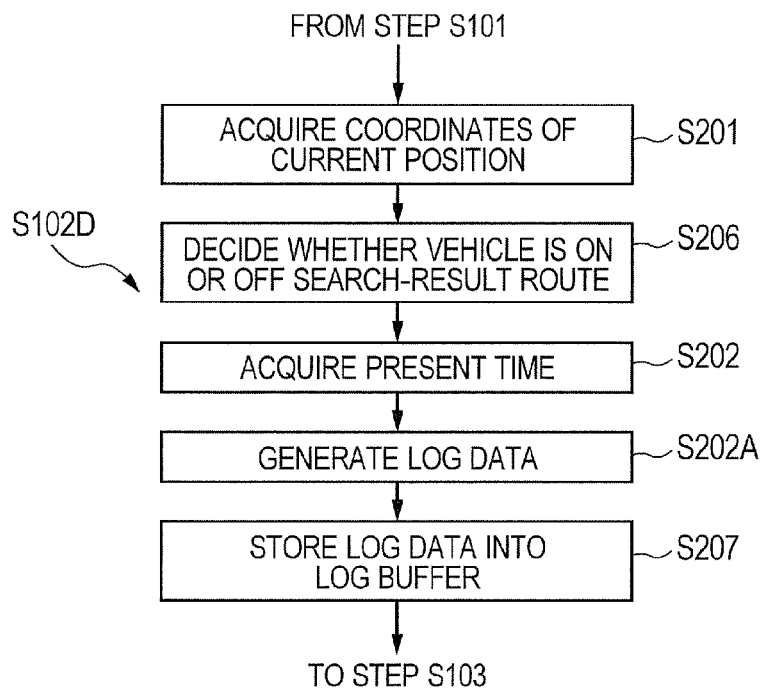
FIG. 19 is a flowchart of the details of a log data storing block in the fifth embodiment of this invention.

FIG. 19 shows the details of a log data storing block S102D which replaces the log data storing block S102 in FIG. 6. As shown in FIG. 19, the log data storing block S102D has a sequence of steps S201, S206, S202, S202A, and S207. The step S201 follows the step S101 of FIG. 6. The step S207 is followed by the step S103 of FIG. 6. The steps S201, S202, and S202A are the same as those in FIG. 6.

In the step S206 between the steps S201 and S202, the deviation information storing section 89 decides whether the vehicle travels along or deviates from the search-result route. Furthermore, in response to the result of this decision, the deviation information storing section 89 generates a deviation information piece representing whether the vehicle travels along or deviates from the search-result route.

In the step S207 following the step S202A, the log data storing section 81 stores the generated log data piece into unoccupied one among the log data storage areas in the log buffer. Furthermore, the deviation information storing section 89 stores the generated deviation information piece into the log buffer in the storage device 34C in a manner such that the deviation information piece and the log data piece generated at the same log timing will be in correspondence or in a set.

Figure 20:
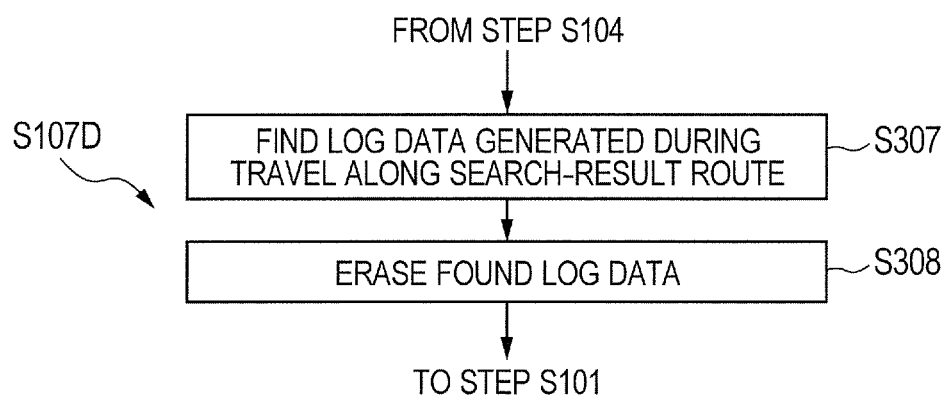
FIG. 20 is a flowchart of the details of a data thinning block in the fifth embodiment of this invention.

FIG. 20 shows the details of a data thinning block S107D which replaces the data thinning block S107 in FIG. 6. As shown in FIG. 20, the data thinning block S107D has sequential steps S307 and S308. The step S307 follows the step S104 in FIG. 6. The step S308 is followed by the step S101 in FIG. 6.

In the step S307, the deviation deciding section 90 refers to each of deviation information pieces in the log buffer and thereby decides whether each of log data pieces in the log buffer is generated when the vehicle travels along or deviates from the search-result route. The deviation deciding section 90 designates a log data piece or pieces each decided to be generated when the vehicle travels along the search-result route as a to-be-erased object or objects. On the other hand, the deviation deciding section 90 does not designate a log data piece or pieces each decided to be generated when the vehicle deviates from the search-result route.

In the step S308 following the step S307, the data thinning section 83 accesses one or ones among the log data pieces in the log buffer which are designated by the deviation deciding section 90 as a to-be-erased object or objects. The data thinning section 83 erases the designated log data piece or pieces from the related log data storage area or areas in the log buffer. At the same time, the data thinning section 83 erases the deviation information piece or pieces corresponding to the designated log data piece or pieces from the log buffer. Thereby, the foregoing log data storage area or areas are made usable for storing a new log data piece or pieces. In the absence of such a designated log data piece, the data thinning section 83 holds the log data pieces and the corresponding deviation information pieces in the log buffer as they are.

As previously described, even if log data pieces generated during the travel of the vehicle along the search-result route are erased, the positions the vehicle has passed can be correctly recovered through interpolation responsive to the search-result route. Preferably, the server 50 is provided with a route search engine equivalent to the route search section 88 in the navigation apparatus 30. In this case, the navigation apparatus 30 sends information representative of a departure point or a current vehicle position and a destination to the server 50 from time to time. The route search engine in the server 50 searches the map represented by the information in the storage 52 for an optimum route (search-result route) from the departure point or the current vehicle position to the destination. Thus, the server 50 has information representative of the search-result route same as that decided in the navigation apparatus 30. By performing interpolation using log data pieces sent from the navigation apparatus 30 and the search-result route, the server 50 recovers positions the vehicle has passed which correspond to the positions represented by log data pieces erased in the navigation apparatus 30. In other words, the server 50 recovers the log data pieces erased in the navigation apparatus 30.

Preferably, the server 50 generates a time information piece in each recovered log data piece through interpolation responsive to time information pieces in log data pieces preceding and following the recovered log data piece in terms of generation time (store time). For example, in the case where a recovered log data piece is between two log data pieces in terms of generation time, a time information piece representative of a time point between time points indicated by time information pieces in the two log data pieces is generated and used as that assigned to the recovered log data piece.

The above-mentioned recovery of erased log data pieces may be performed in the navigation apparatus 30 rather than the server 50. In this case, the recovered log data pieces are sent from the navigation apparatus 30 to the server 50 when the session between the navigation apparatus 30 and the server 50 is restored to normal conditions so that the navigation apparatus 30 and the server 50 can communicate with each other again. Thus, the server 50 can correctly recognize or detect the route taken by the vehicle in response to the log data pieces sent from the navigation apparatus 30. Therefore, the server 50 can provide correct information to the client or clients.

Each log data piece designated as a to-be-erased object may be moved from the log buffer to another zone in the storage device 34D instead of being erased therefrom. In this case, a log data piece or pieces are sent from the zone in the storage device 34D to the server 50 when the session between the navigation apparatus 30 and the server 50 is restored to normal conditions.

It is preferable to erase all of log data pieces from the log buffer which are generated during the travel of the vehicle along the search-result route. Alternatively, thinning out log data pieces in the log buffer may be performed at a prescribed thinning rate as in the first embodiment of this invention. For example, the data thinning process by the block S107D continues to be repetitively performed until the number of log data pieces each designated as a to-be-erased object reaches a predetermined value corresponding to the prescribed thinning rate.

A new log data piece is allowed to be written into a log data storage area storing a log data piece generated during the travel of the vehicle along the search-result route and hence designated as a to-be-erased object. On the other hand, a new log data piece is inhibited from being written into a log data storage area storing a log data piece generated at a vehicle position off the search-result route and hence not designated as a to-be-erased object.

Positions the vehicle has passed can be recovered through interpolation responsive to the search-result route so that the actual route taken by the vehicle can be correctly detected. Thus, it is possible to further suppress a reduction in the accuracy of the route taken by the vehicle which is computed from the positions represented by non-erased log data pieces.

Sixth Embodiment

A sixth embodiment of this invention is similar to the first embodiment thereof except for design changes mentioned hereafter. In the sixth embodiment of this invention, a storage device 34E replaces the storage device 34 in FIGS. 2 and 5, and a method of thinning out log data pieces in the storage device 34E is designed to be more proper in suppressing a reduction in the accuracy of the route taken by the vehicle which is computed from non-erased log data pieces. Preferably, log timings are timings temporally spaced at prescribed time intervals (constant time intervals).

Figure 21A:
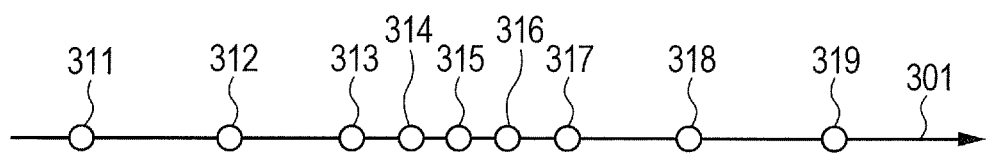
FIG. 21A is a diagram of a fourth example of the route taken by the vehicle and positions at which log data pieces are generated respectively.

With reference to FIG. 21A, on a route 301 taken by the vehicle, there are positions (locations) 311-319 at each of which a log data piece is generated and stored into the log buffer in the storage device 34E. The positions 311-319 occur in conditions where the vehicle decelerates and thereafter accelerates. During the travel of the vehicle at a low speed (corresponding to the interval between the positions 313 and 317), the spaces between the positions represented by generated log data pieces are relatively narrow. Thus, even if some or all of log data pieces generated during the travel of the vehicle at a low speed are erased, there will not occur a significant reduction in the accuracy of a route taken by the vehicle which is computed from log data pieces.

Accordingly, a log data piece generated during the low-speed travel of the vehicle is designated as a to-be-erased object. On the other hand, a log data piece generated during the intermediate-speed or high-speed travel of the vehicle is not designated as a to-be-erased object.

Figure 22:
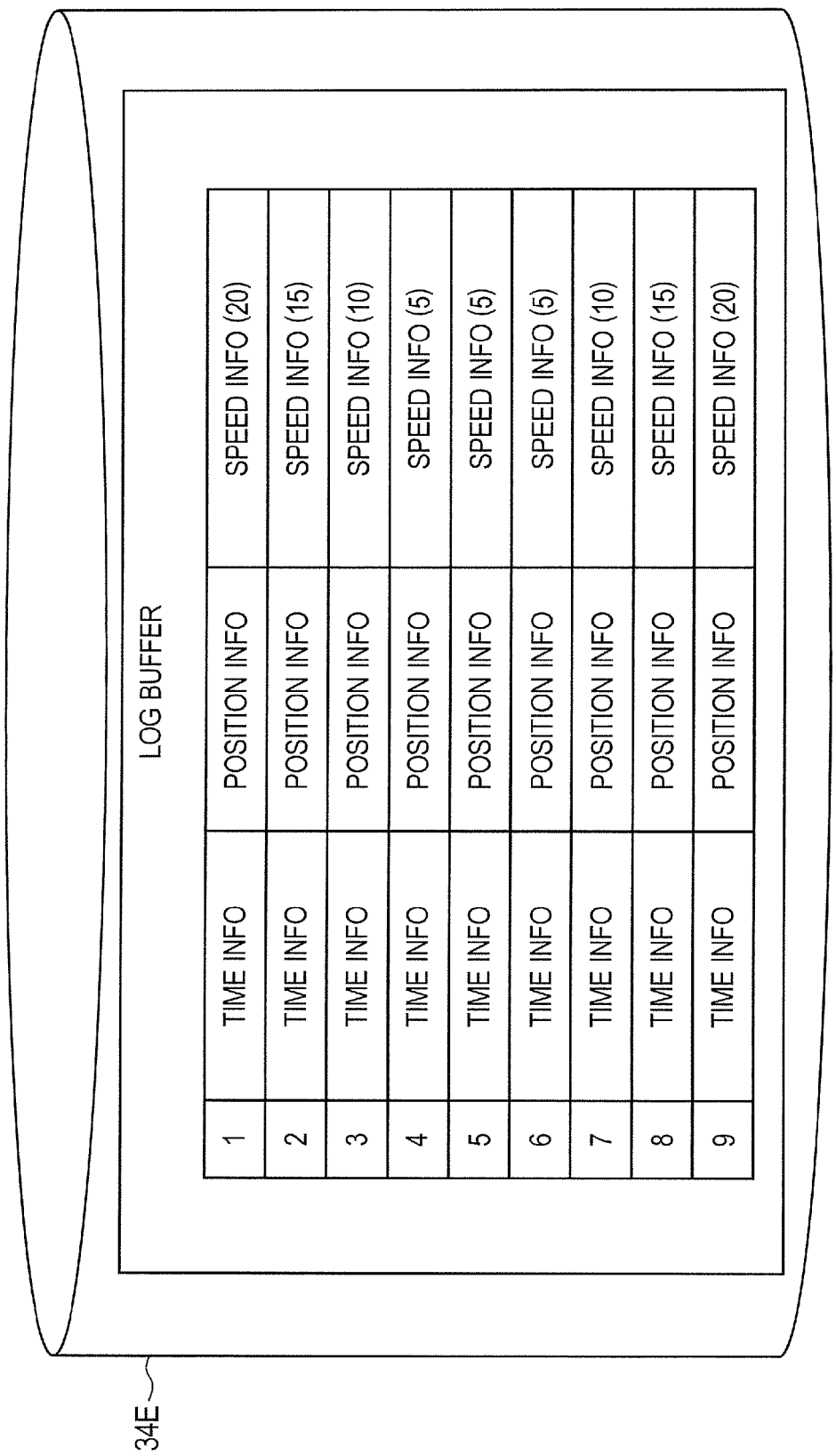
FIG. 22 is a diagram of a storage device in a navigation apparatus according to a sixth embodiment of this invention.

FIG. 22 shows the details of the storage device 34E. A speed information piece is generated when every log data piece is generated. The speed information piece represents the current speed of the vehicle. Thus, the speed information piece represents the vehicle speed occurring at the moment of the generation of the corresponding log data piece. When every log data piece is stored into the log buffer in the storage device 34E, a corresponding speed information piece is stored into the log buffer at a place adjoining the place of the log data piece. Accordingly, in the log buffer, a log data piece and a corresponding speed information piece are in correspondence or in a set. By referring to a speed information piece in the log buffer, it is possible to detect the vehicle speed occurring at the moment of the generation of a corresponding log data piece.

Figure 23:
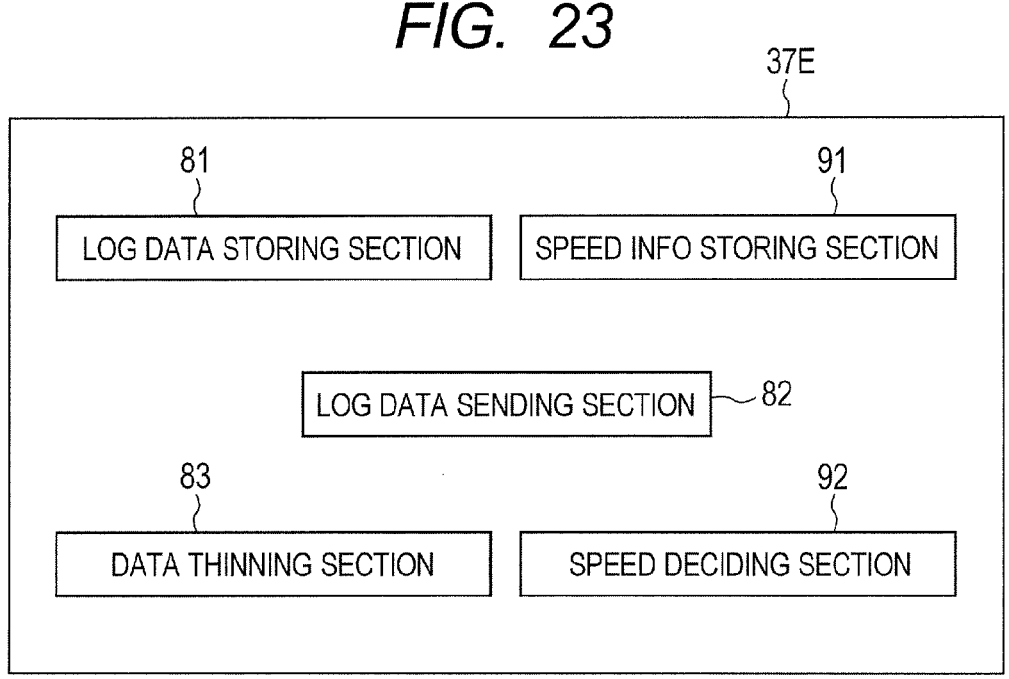
FIG. 23 is a diagram of a controller in the navigation apparatus in the sixth embodiment of this invention.

FIG. 23 shows a controller 37E used instead of the controller 37 in FIGS. 2 and 4. The controller 37E is similar to the controller 37 except that a speed information storing section 91 and a speed deciding section 92 are additionally provided therein.

At every log timing, the speed information storing section 91 generates a speed information piece representative of the current speed of the vehicle on the basis of the information outputted from the vehicle speed pulse input section 44. The speed information storing section 91 stores the generated speed information piece into the log buffer in the storage device 34E in a manner such that the speed information piece and the log data piece generated at the same log timing will be in correspondence or in a set.

The speed deciding section 92 refers to speed information pieces in the log buffer and sorts log data pieces in the log buffer in order of increasing vehicle speed represented by a corresponding speed information piece. Then, the speed deciding section 92 chooses successive log data pieces from the sorted log data pieces in order of vehicle speed starting from the lowest. The number of the chosen log data pieces corresponds to, for example, a prescribed thinning rate. The speed deciding section 92 designates the chosen log data pieces as to-be-erased objects. On the other hand, the speed deciding section 92 does not designate other log data pieces in the log buffer as to-be-erased objects.

The thinning section 83 erases the designated log data pieces from the related log data storage areas in the log buffer. At the same time, the data thinning section 83 erases the speed information pieces corresponding to the designated log data pieces from the log buffer. Thereby, the foregoing log data storage areas are made usable for storing new log data pieces. In the absence of such designated log data pieces, the data thinning section 83 holds the log data pieces and the corresponding speed information pieces in the log buffer as they are.

Figure 24:
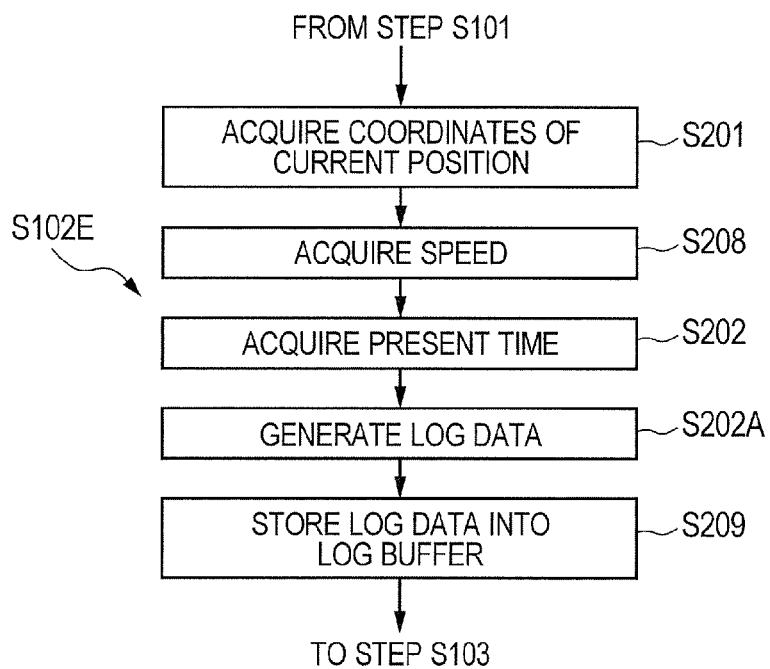
FIG. 24 is a flowchart of the details of a log data storing block in the sixth embodiment of this invention.

FIG. 24 shows the details of a log data storing block S102E which replaces the log data storing block S102 in FIG. 6. As shown in FIG. 24, the log data storing block S102E has a sequence of steps S201, S208, S202, S202A, and S209. The step S201 follows the step S101 of FIG. 6. The step S209 is followed by the step S103 of FIG. 6. The steps S201, S202, and S202A are the same as those in FIG. 6.

In the step S208 between the steps S201 and S202, the speed information storing section 91 accepts the vehicle speed information outputted from the vehicle speed pulse input section 44. The speed information storing section 91 generates a speed information piece representative of the current speed of the vehicle from the accepted vehicle speed information.

In the step S209 following the step S202A, the log data storing section 81 stores the generated log data piece into unoccupied one among the log data storage areas in the log buffer in the storage device 34E. Furthermore, the speed information storing section 91 stores the generated speed information piece into the log buffer in a manner such that the speed information piece and the log data piece generated at the same log timing will be in correspondence or in a set.

Figure 25:
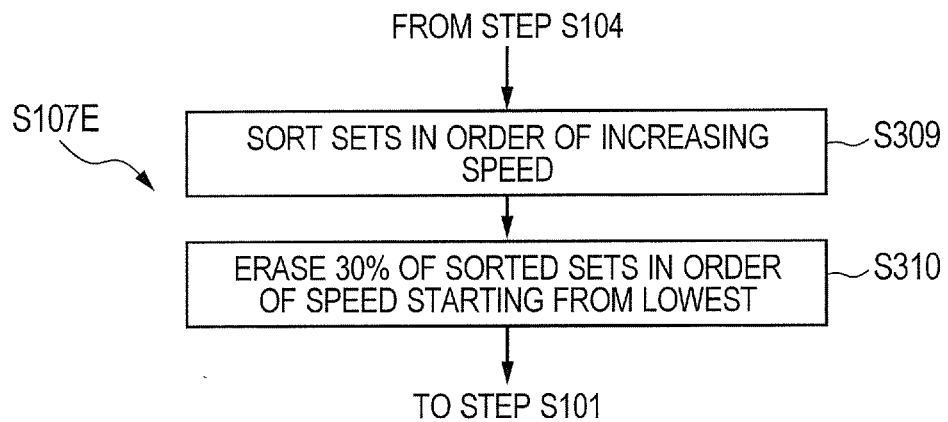
FIG. 25 is a flowchart of the details of a data thinning block in the sixth embodiment of this invention.

FIG. 25 shows the details of a data thinning block S107E which replaces the data thinning block S107 in FIG. 6. As shown in FIG. 25, the data thinning block S107E has sequential steps S309 and S310. The step S309 follows the step S104 in FIG. 6. The step S310 is followed by the step S101 in FIG. 6.

In the step S309, the speed deciding section 92 refers to speed information pieces in the log buffer and thereby sorts sets of log data pieces and speed information pieces in order of increasing speed represented by a speed information piece. Then, the speed deciding section 92 chooses successive ones among the sorted sets in order of speed starting from the lowest. The number of the chosen sets is equal to, for example, 30% of the total number of the sets in the log buffer. The speed deciding section 92 designates the chosen sets as to-be-erased objects. On the other hand, the speed deciding section 92 does not designate other sets in the log buffer.

In the step S310 following the step S309, the data thinning section 83 accesses ones among the sets of log data pieces and speed information pieces in the log buffer which are designated by the speed deciding section 92 as to-be-erased objects. The data thinning section 83 erases the designated sets from related storage areas in the log buffer. Thereby, the foregoing storage areas are made usable for storing new sets of log data pieces and speed information pieces.

In the above description, the thinning rate is equal to, for example, 30%. Thus, the thinning rate may be equal to a value different from 30%.

Figure 21B:
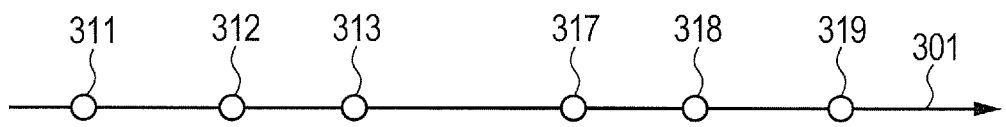
FIG. 21B corresponds to FIG. 21A and is another diagram of the above fourth example where some of generated log data pieces are erased and there are indicated only positions at which the remaining log data pieces are generated.

For example, the log data pieces in the log buffer in FIG. 22 are successively generated at the positions 311-319 in FIG. 21A, respectively. The uppermost log data piece in FIG. 22 is generated at the position 311 while the lowermost log data piece therein is generated at the position 319. The vehicle speeds represented by the speed information pieces in FIG. 22 are "20", "15", "10", "5", "5", "5", "10", "15", and "20" for the positions 311-319, respectively. In the interval between the positions 313 and 317, the vehicle speed is relatively low so that the spaces between the positions 313-317 are relatively narrow. The sets of the log data pieces and the speed information pieces are sorted in order of increasing vehicle speed represented by a speed information piece. The sorted sets are erased from the log buffer on a one-by-one basis in order of increasing vehicle speed until the number of the erased sets reaches the value corresponding to the thinning rate. For example, the three sets representing the lowest vehicle speed "5", that is, the three sets having the log data pieces generated at the positions 314, 315, and 316, are erased from the log buffer. In this case, the positions represented by the remaining log data pieces are those denoted by 311-313 and 317-319 as shown in FIG. 21B. Thus, log data pieces representing positions in an interval for which the vehicle speed is relatively low are erased preferentially. In other words, log data pieces representing positions with narrow spaces therebetween are erased preferentially. Accordingly, for an interval traveled by the vehicle in which many log data pieces are generated and the spaces between the positions represented by the generated log data pieces are relatively narrow, the generated log data pieces are erased preferentially. Therefore, it is possible to further suppress a reduction in the accuracy of the route taken by the vehicle which is computed from the positions represented by remaining log data pieces.

The above-mentioned method of thinning out log data pieces may be replaced by the following method. Specifically, each log data piece in the log buffer which corresponds to a speed information piece representing a speed lower than a predetermined threshold value is designated as a to-be-erased object. On the other hand, each log data piece in the log buffer which corresponds to a speed information piece representing a speed equal to or higher than the predetermined threshold value is not designated.

As previously described, a log data piece and a speed information piece representing the speed of the vehicle which occurs at the moment of generation of the log data piece are stored into the log buffer in a manner such that the stored log data piece and the stored speed information will be in correspondence or in a set.

A new log data piece is allowed to be written into a log data storage area storing a log data piece corresponding to a speed information piece representing a speed decided to be so low as to meet a prescribed condition (a condition based on the threshold value or the thinning rate). On the other hand, a new log data piece is inhibited from being written into a log data storage area storing a log data piece corresponding to a speed information piece representing a speed decided to be not so low.

For an interval traveled by the vehicle at a relatively low speed in which many log data pieces are generated, the generated log data pieces are erased preferentially. Therefore, it is possible to further suppress a reduction in the accuracy of the route taken by the vehicle which is computed from the positions represented by remaining log data pieces.

Seventh Embodiment

A seventh embodiment of this invention is similar to the first embodiment thereof except for design changes mentioned hereafter. In the seventh embodiment of this invention, a storage device 34F replaces the storage device 34 in FIGS. 2 and 5, and a method of thinning out log data pieces in the storage device 34F is designed to be more proper in suppressing a reduction in the accuracy of the route taken by the vehicle which is computed from non-erased log data pieces.

Figure 26A:
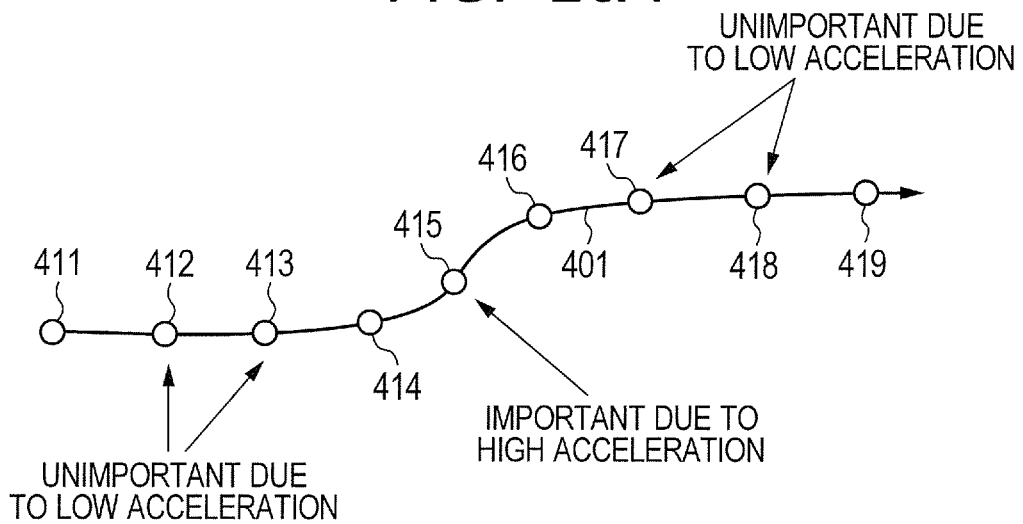
FIG. 26A is a diagram of a fifth example of the route taken by the vehicle and positions at which log data pieces are generated respectively.

With reference to FIG. 26A, on a curved route 401 taken by the vehicle, there are positions (locations) 411-419 at each of which a log data piece is generated and stored into the log buffer in the storage device 34F. In the route portion between the positions 414 and 416, the direction of travel of the vehicle significantly changes. If log data pieces generated during a change of the direction of travel of the vehicle were erased, it would be difficult to correctly recover positions passed by the vehicle through interpolation.

When the vehicle travels along the curved portion of the route 401 between the positions 414 and 416, the acceleration of the vehicle in its transverse direction is high. When the vehicle passes the positions 412, 413, 417, and 418, the direction of travel of the vehicle hardly changes so that the acceleration of the vehicle in its transverse direction is low. If log data pieces generated during the travel of the vehicle at a low transverse-direction acceleration are erased, the positions represented by the erased log data pieces can be correctly recovered through interpolation. On the other hand, if log data pieces generated during the travel of the vehicle at a high transverse-direction acceleration were erased, the positions represented by the erased log data pieces could not be correctly recovered through interpolation.

Accordingly, a log data piece generated during the travel of the vehicle at a low transverse-direction acceleration is designated as a to-be-erased object. On the other hand, a log data piece generated during the travel of the vehicle at an intermediate or high transverse-direction acceleration is not designated as a to-be-erased object.

Figure 27:
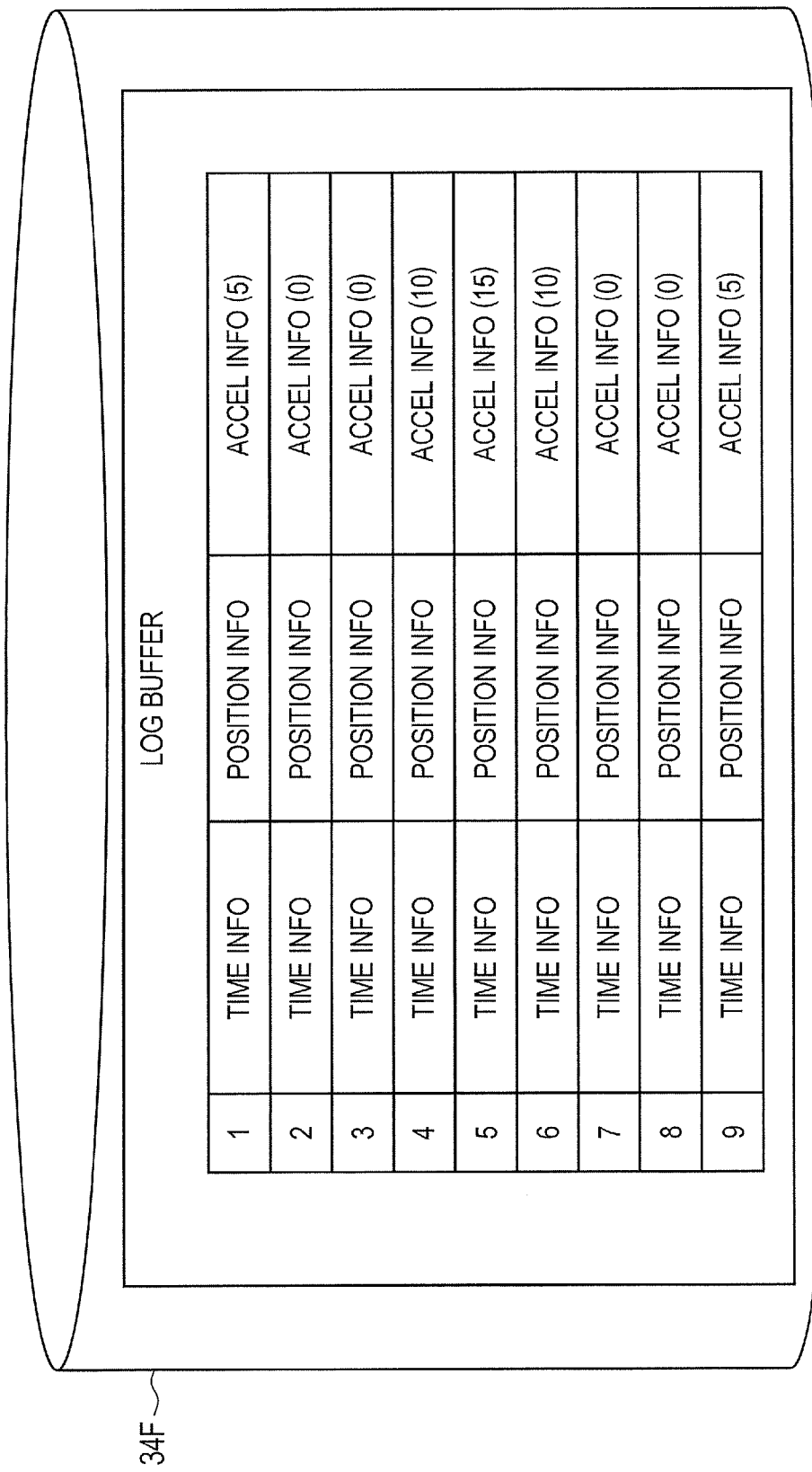
FIG. 27 is a diagram of a storage device in a navigation apparatus according to a seventh embodiment of this invention.

FIG. 27 shows the details of the storage device 34F. An acceleration information piece is generated when every log data piece is generated. The acceleration information piece represents the current acceleration of the vehicle in its transverse direction. Thus, the acceleration information piece represents the transverse-direction acceleration of the vehicle which occurs at the moment of the generation of the corresponding log data piece. When every log data piece is stored into the log buffer in the storage device 34F, a corresponding acceleration information piece is stored into the log buffer at a place adjoining the place of the log data piece. Accordingly, in the log buffer, a log data piece and a corresponding acceleration information piece are in correspondence or in a set. By referring to an acceleration information piece in the log buffer, it is possible to detect the transverse-direction acceleration of the vehicle which occurs at the moment of the generation of a corresponding log data piece.

Figure 28:
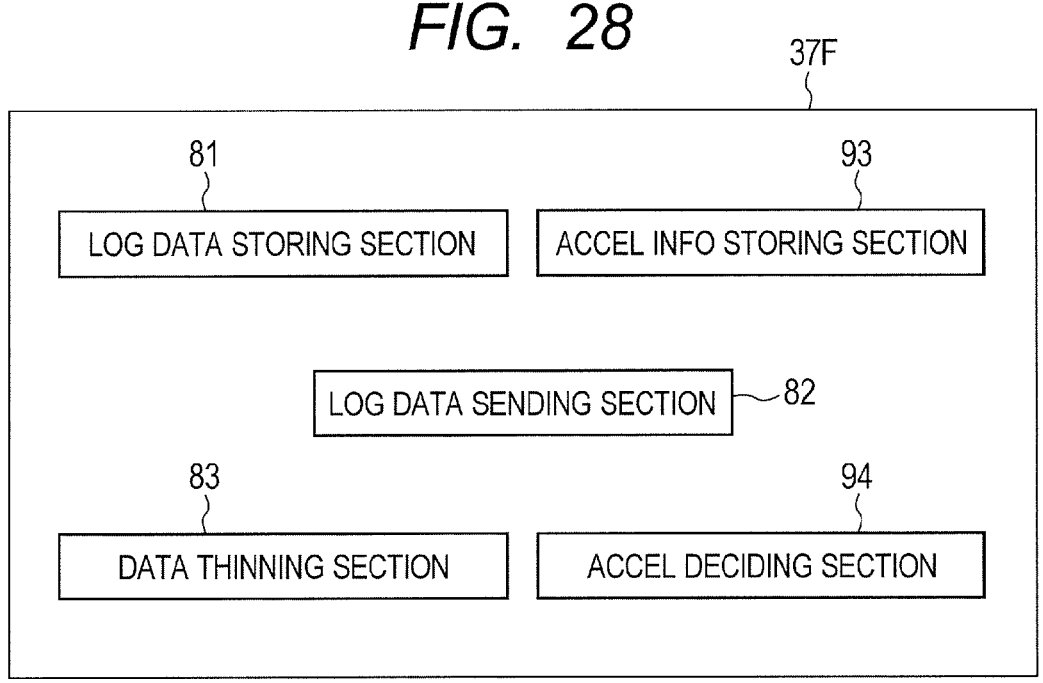
FIG. 28 is a diagram of a controller in the navigation apparatus in the seventh embodiment of this invention.

FIG. 28 shows a controller 37F used instead of the controller 37 in FIGS. 2 and 4. The controller 37F is similar to the controller 37 except that an acceleration information storing section 93 and an acceleration deciding section 94 are additionally provided therein.

At every log timing, the acceleration information storing section 93 generates an acceleration information piece representative of the current transverse-direction acceleration of the vehicle on the basis of the information outputted from the acceleration sensor 43. The acceleration information storing section 93 stores the generated acceleration information piece into the log buffer in the storage device 34F in a manner such that the acceleration information piece and the log data piece generated at the same log timing will be in correspondence or in a set.

The acceleration deciding section 94 refers to acceleration information pieces in the log buffer and sorts log data pieces in the log buffer in order of increasing vehicle acceleration represented by a corresponding acceleration information piece. Then, the acceleration deciding section 94 chooses successive log data pieces from the sorted log data pieces in order of vehicle acceleration starting from the lowest. The number of the chosen log data pieces corresponds to, for example, a prescribed thinning rate. The acceleration deciding section 94 designates the chosen log data pieces as to-be-erased objects. On the other hand, the acceleration deciding section 92 does not designate other log data pieces in the log buffer.

The thinning section 83 erases the designated log data pieces from the related log data storage areas in the log buffer. At the same time, the data thinning section 83 erases the acceleration information pieces corresponding to the designated log data pieces from the log buffer.

Figure 29:
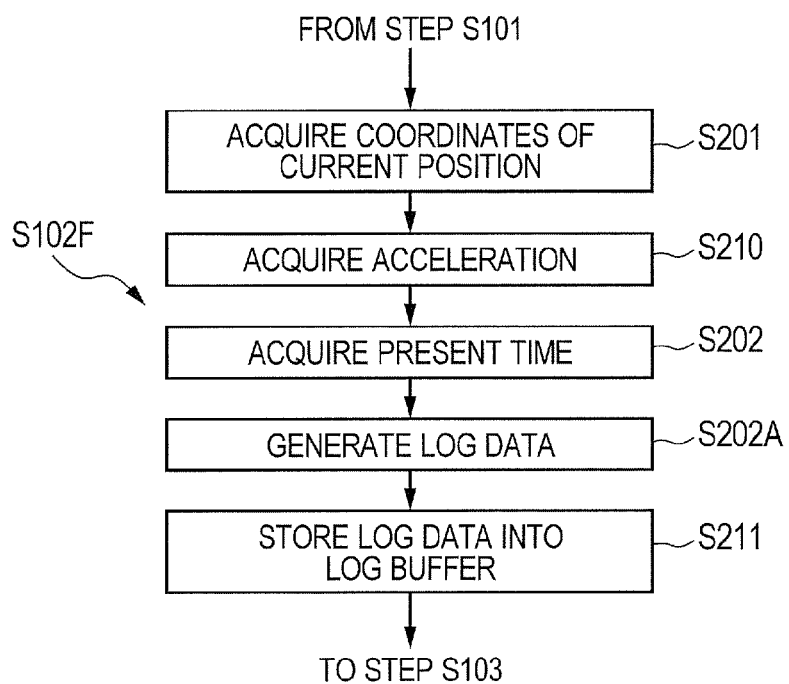
FIG. 29 is a flowchart of the details of a log data storing block in the seventh embodiment of this invention.

FIG. 29 shows the details of a log data storing block S102F which replaces the log data storing block S102 in FIG. 6. As shown in FIG. 29, the log data storing block S102F has a sequence of steps S201, S210, S202, S202A, and S211. The step S201 follows the step S101 of FIG. 6. The step S211 is followed by the step S103 of FIG. 6. The steps S201, S202, and S202A are the same as those in FIG. 6.

In the step S210 between the steps S201 and S202, the acceleration information storing section 93 derives the current transverse-direction acceleration of the vehicle from the information outputted by the acceleration sensor 43. Specifically, the acceleration information storing section 93 extracts an information piece representative of the current transverse-direction acceleration of the vehicle from the information outputted by the acceleration sensor 43. The acceleration information storing section 93 labels the extracted information piece as an acceleration information piece.

In the step S211 following the step S202A, the log data storing section 81 stores the generated log data piece into unoccupied one among the log data storage areas in the log buffer. Furthermore, the acceleration information storing section 93 stores the generated acceleration information piece into the log buffer in the storage device 34F in a manner such that the acceleration information piece and the log data piece generated at the same log timing will be in correspondence or in a set.

Figure 30:
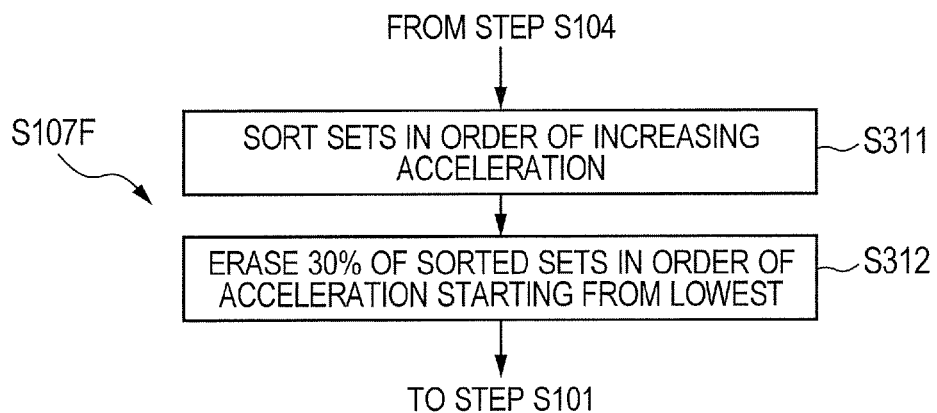
FIG. 30 is a flowchart of the details of a data thinning block in the seventh embodiment of this invention.

FIG. 30 shows the details of a data thinning block S107F which replaces the data thinning block S107 in FIG. 6. As shown in FIG. 30, the data thinning block S107F has sequential steps S311 and S312. The step S311 follows the step S104 in FIG. 6. The step S312 is followed by the step S101 in FIG. 6.

In the step S311, the acceleration deciding section 94 refers to acceleration information pieces in the log buffer and thereby sorts sets of log data pieces and acceleration information pieces in order of increasing acceleration represented by an acceleration information piece. Specifically, the acceleration deciding section 94 calculates the absolute values of the accelerations represented by the acceleration information pieces, that is, the magnitudes of the accelerations in both the leftward transverse direction and the rightward transverse direction. The acceleration deciding section 94 compares the calculated acceleration magnitudes to sort the sets in order of increasing acceleration. The acceleration deciding section 94 chooses successive ones among the sorted sets in order of acceleration starting from the lowest. The number of the chosen sets is equal to, for example, 30% of the total number of the sets in the log buffer. The acceleration deciding section 94 designates the chosen sets as to-be-erased objects. On the other hand, the acceleration deciding section 94 does not designate other sets in the log buffer.

In the step S312 following the step S311, the data thinning section 83 accesses ones among the sets of log data pieces and acceleration information pieces in the log buffer which are designated by the acceleration deciding section 94 as to-be-erased objects. The data thinning section 83 erases the designated sets from related storage areas in the log buffer. Thereby, the foregoing storage areas are made usable for storing new sets of log data pieces and acceleration information pieces.

In the above description, the thinning rate is equal to, for example, 30%. Thus, the thinning rate may be equal to a value different from 30%.

Figure 26B:
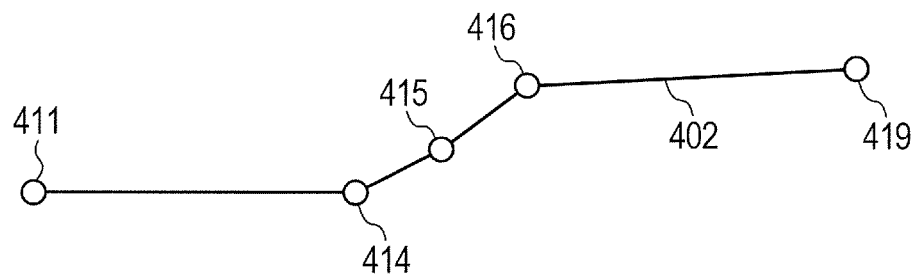
FIG. 26B corresponds to FIG. 26A and is another diagram of the above fifth example where some of generated log data pieces are erased and there are indicated only positions at which the remaining log data pieces are generated, and there is also indicated a route taken by the vehicle that is computed from the remaining log data pieces through interpolation.

For example, the log data pieces in the log buffer in FIG. 27 are successively generated at the positions 411-419 in FIG. 26A, respectively. The uppermost log data piece in FIG. 27 is generated at the position 411 while the lowermost log data piece therein is generated at the position 419. The vehicle accelerations represented by the acceleration information pieces in FIG. 27 are "5", "0", "0", "10", "15", "10", "0", "0", and "5" for the positions 411-419, respectively. In the interval between the positions 413 and 417, the direction of travel of the vehicle significantly changes so that the acceleration of the vehicle in its transverse direction is relatively high. The 5 sets of the log data pieces and the acceleration information pieces are sorted in order of increasing vehicle acceleration represented by an acceleration information piece. The sorted sets are erased from the log buffer on a one-by-one basis in order of increasing vehicle acceleration until the number of the erased sets reaches the value corresponding to the thinning rate. For example, the four sets representing the lowest vehicle acceleration "0", that is, the four sets having the log data pieces generated at the positions 412, 413, 417, and 418, are erased from the log buffer. In this case, the positions represented by the remaining log data pieces are those denoted by 411, 414-416, and 419 as shown in FIG. 26B. A computed route 402 taken by the vehicle is obtained by connecting the positions 411, 414-416, and 419 via straight line segments. As made clear from FIGS. 26A and 26B, the computed route 402 is sufficiently close to the actual route 401. Therefore, it is possible to further suppress a reduction in the accuracy of the route taken by the vehicle which is computed from the positions represented by non-erased log data pieces.

The above-mentioned method of thinning out log data pieces may be replaced by the following method. Specifically, a log data piece in the log buffer which corresponds to an acceleration information piece representing an acceleration lower than a predetermined threshold value is designated as a to-be-erased object. On the other hand, a log data piece in the log buffer which corresponds to an acceleration information piece representing an acceleration equal to or higher than the predetermined threshold value is not designated.

In general, a typical vehicle driver decelerates the related vehicle when it enters a curve in a road, and accelerates the vehicle when it moves from the curve to a straight portion of the road. Thus, for the travel of the vehicle along a curve, a certain acceleration of the vehicle occurs in its longitudinal direction also. Accordingly, regarding the generation of each acceleration information piece, the acceleration of the vehicle in its longitudinal direction which is detected by the acceleration sensor 43 may be used instead of the transverse-direction acceleration.

When the vehicle travels along a curve, the orientation of the vehicle changes so that a certain angular velocity of the vehicle occurs. Accordingly, the angular velocity detected by the gyro sensor 42 may be used instead of the acceleration. In this case, each acceleration information piece is replaced by an information piece representing the angular velocity of the vehicle which occurs at the moment of generation of a log data piece.

When the direction of travel of the vehicle changes, physical quantities related to the speed of the vehicle change also. Examples of the physical quantities are the acceleration, the angular velocity, and the angular acceleration. Each of the physical quantities may be used for the generation of information pieces corresponding to respective log data pieces.

As previously described, a log data piece and an acceleration information piece representing the transverse-direction acceleration of the vehicle which occurs at the moment of generation of the log data piece are stored into the log buffer in a manner such that the stored log data piece and the stored acceleration information will be in correspondence or in a set. A new log data piece is allowed to be written into a log data storage area storing a log data piece corresponding to an acceleration information piece representing an acceleration decided to be so low as to meet a prescribed condition (a condition based on the threshold value or the thinning rate). On the other hand, a new log data piece is inhibited from being written into a log data storage area storing a log data piece corresponding to an acceleration information piece representing an acceleration decided to be not so low.

If log data pieces generated during the travel of the vehicle along a curve in a road were erased, they could not be correctly recovered through interpolation. As previously described, such log data pieces are prevented from being erased. Therefore, it is possible to further suppress a reduction in the accuracy of the route taken by the vehicle which is computed from the positions represented by non-erased log data pieces.

Eighth Embodiment

An eighth embodiment of this invention is similar to the first embodiment thereof except for design changes mentioned hereafter. In the eighth embodiment of this invention, certain ones among log data pieces which would be designated as to-be-erased objects in the seventh embodiment of this invention are not designated as to-be-erased objects. Thus, the eighth embodiment of this invention is designed to further suppress a reduction in the accuracy of the route taken by the vehicle which is computed from non-erased log data pieces. In the eighth embodiment of this invention, a storage device 34G replaces the storage device 34 in FIGS. 2 and 5.

Figure 31A:
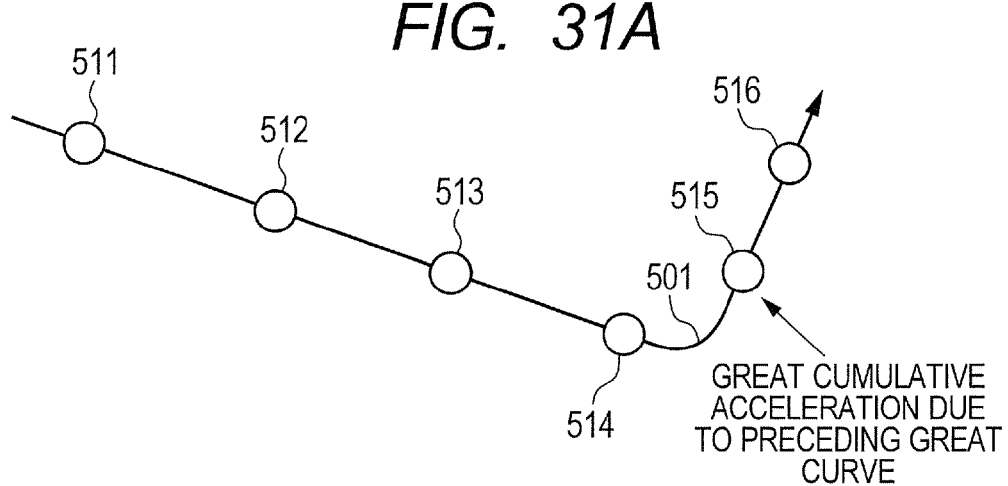
FIG. 31A is a diagram of a sixth example of the route taken by the vehicle and positions at which log data pieces are generated respectively.
Figure 31B:
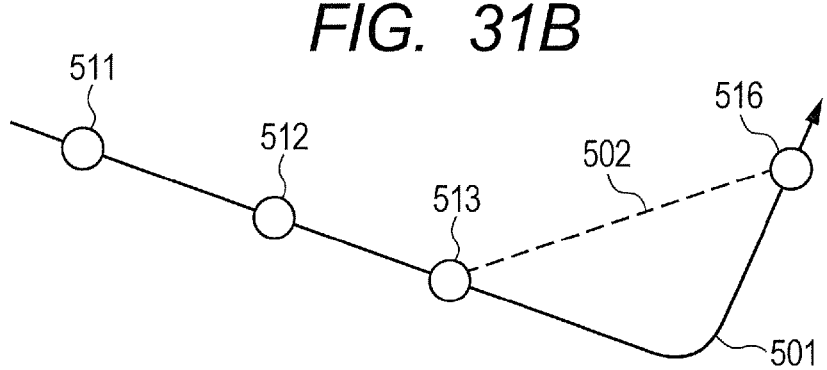
FIG. 31B corresponds to FIG. 31A and is another diagram of the above sixth example where some of generated log data pieces are erased and there are indicated only positions at which the remaining log data pieces are generated, and a route taken by the vehicle that is computed from the remaining log data pieces through interpolation is indicated also in addition to the actual route.

With reference to FIG. 31A, on a route 501 with a curve which is taken by the vehicle, there are positions (locations) 511-516 at each of which a log data piece is generated and stored into the log buffer in the storage device 34G. In the route portion between the positions 514 and 515, the direction of travel of the vehicle greatly changes. If the log data pieces generated at the positions 514 and 515 were erased, it would be difficult to correctly recover positions passed by the vehicle through interpolation. Specifically, as shown in FIG. 31B, a wrong route portion 502 would be computed from the positions 511-513, and 516 represented by the remaining log data pieces through interpolation.

In FIG. 31A, the route portion between the positions 514 and 515 has a curve, and a straight route portion extends up to one end of the curve though the position 514 and another straight route portion extends from the other end of the curve through the position 515. Thus, in the seventh embodiment of this invention, the log data pieces generated at the positions 514 and 515 might be designated as to-be-erased objects due to the absence of a transverse-direction acceleration from the vehicle passing the positions 514 and 515.

During the time interval between every two successive log timings (first and second log timing), the transverse-direction acceleration of the vehicle is detected plural times. The detected accelerations are added up to obtain a cumulative acceleration. The cumulative acceleration is compared to a predetermined threshold value to decide whether the cumulative acceleration is relatively small or great. In the case where the cumulative acceleration is smaller than the threshold value, a log data piece generated at the second log timing is designated as a to-be-erased object. On the other hand, in the case where the cumulative acceleration is equal to or greater than the threshold value, the log data piece generated at the second log timing is not designated as a to-be-erased object. In this case, the log data piece generated at the first log timing is not designated as a to-be-erased object also.

With reference to FIG. 31A, the route portion between the positions 514 and 515 has a curve, and hence the vehicle undergoes significant transverse-direction acceleration when traveling along the route portion. Thus, for the route portion between the positions 514 and 515, the cumulative acceleration is relatively great (equal to or greater than the threshold value). Therefore, the log data piece generated at the position 515 is not designated as a to-be-erased object. In addition, the log data piece generated at the position 514 is not designated as a to-be-erased object also.

FIG. 32 shows the details of the storage device 34G. A cumulative acceleration information piece is generated when every log data piece is generated. The cumulative acceleration information piece represents a cumulative acceleration equal to the result of adding up the accelerations of the vehicle in its transverse direction which have been detected during the time interval between the present log timing and the immediately preceding log timing. Thus, the cumulative acceleration information piece represents the cumulative transverse-direction acceleration of the vehicle which occurs at the moment of the generation of the corresponding log data piece. When every log data piece is stored into the log buffer in the storage device 34G, a corresponding cumulative acceleration information piece is stored into the log buffer at a place adjoining the place of the log data piece. Accordingly, in the log buffer, a log data piece and a corresponding cumulative acceleration information piece are in correspondence or in a set. By referring to a cumulative acceleration information piece in the log buffer, it is possible to detect the cumulative transverse-direction acceleration of the vehicle which occurs at the moment of the generation of a corresponding log data piece.

Figure 33:
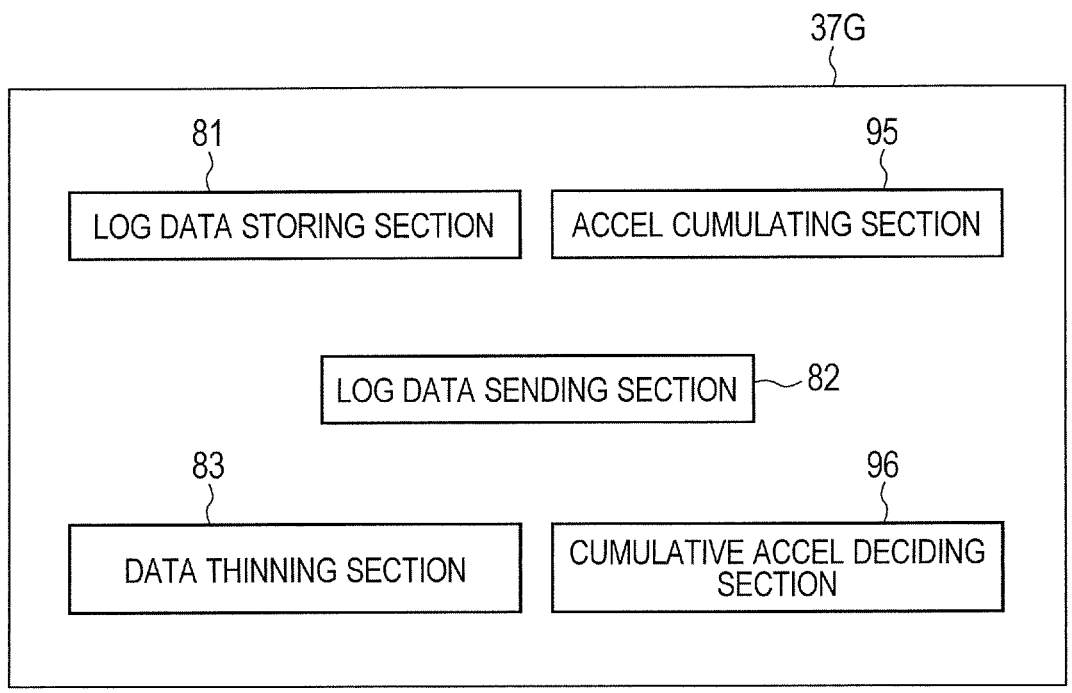
FIG. 33 is a diagram of a controller in the navigation apparatus in the eighth embodiment of this invention.

FIG. 33 shows a controller 37G used instead of the controller 37 in FIGS. 2 and 4. The controller 37G is similar to the controller 37 except that an acceleration cumulating section 95 and a cumulative acceleration deciding section 96 are additionally provided therein.

Acceleration detection timings spaced at prescribed time intervals are generated. At every acceleration detection timing, the acceleration cumulating section 95 derives the current transverse-direction acceleration of the vehicle from the information outputted by the acceleration sensor 43. For every time interval between two successive log timings, the acceleration cumulating section 95 adds up the derived accelerations to calculate a cumulative acceleration.

Preferably, the acceleration detection timings are timings spaced at prescribed intervals. For example, the acceleration detection timings are timings temporally spaced at prescribed time intervals. The acceleration detection timings may be timings corresponding to positions spaced at prescribed travel distance intervals. The time intervals between the acceleration detection timings are shorter than those between log timings.

At every log timing, the acceleration cumulating section 95 generates a cumulative acceleration information piece representing the latest cumulative acceleration. The acceleration cumulating section 95 stores the generated cumulative acceleration information piece into the log buffer in the storage device 34G in a manner such that the cumulative acceleration information piece and the log data piece generated at the same log timing will be in correspondence or in a set. Then, the acceleration cumulating section 95 resets a variable used as an indication of the cumulative acceleration. The acceleration cumulating section 95 restarts adding up derived accelerations to calculate a cumulative acceleration. Adding up will be continued until the next log timing.

The cumulative acceleration deciding section 96 refers to cumulative acceleration information pieces in the log buffer and sorts log data pieces in the log buffer in order of increasing cumulative acceleration represented by a corresponding cumulative acceleration information piece. Then, the cumulative acceleration deciding section 96 chooses successive log data pieces from the sorted log data pieces in order of cumulative acceleration starting from the lowest. The number of the chosen log data pieces corresponds to, for example, a prescribed thinning rate. The cumulative acceleration deciding section 96 designates the chosen log data pieces as to-be-erased objects. On the other hand, the cumulative acceleration deciding section 96 does not designate other log data pieces in the log buffer.

Furthermore, the cumulative acceleration deciding section 96 sorts the log data pieces in the log buffer in order of decreasing cumulative acceleration represented by a corresponding cumulative acceleration information piece. Then, the cumulative acceleration deciding section 96 chooses successive log data pieces from the sorted log data pieces in order of cumulative acceleration starting from the highest. The number of the chosen log data pieces corresponds to, for example, a prescribed choice rate. The cumulative acceleration deciding section 96 searches the log data pieces in the log buffer for those (search-result log data pieces) immediately preceding the chosen log data pieces in terms of generation time respectively, and excludes the search-result log data pieces from the to-be-erased objects.

The thinning section 83 erases the designated log data pieces (the to-be-erased log data pieces) from the related log data storage areas in the log buffer. At the same time, the data thinning section 83 erases the cumulative acceleration information pieces corresponding to the designated log data pieces from the log buffer.

Figure 34:
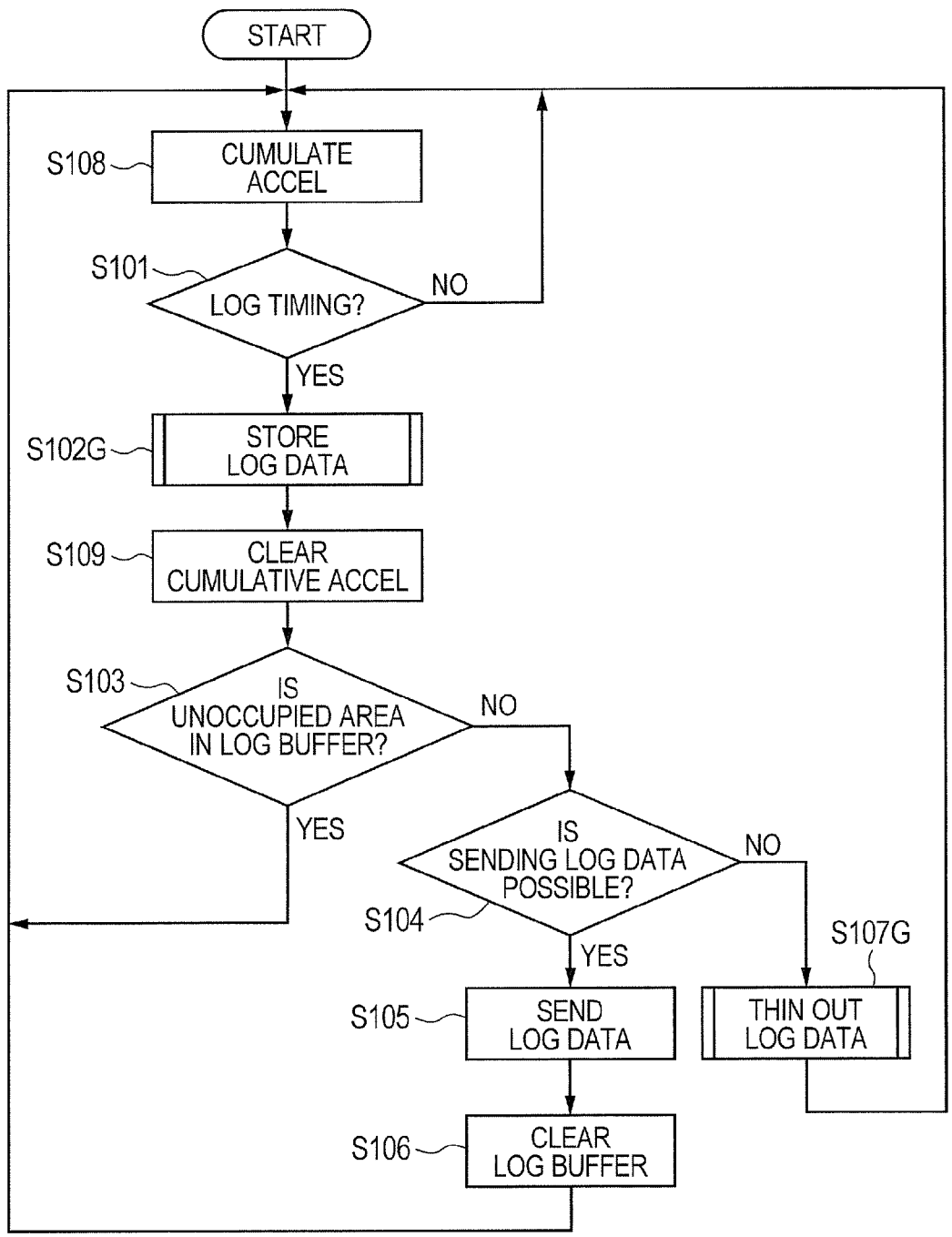
FIG. 34 is a flowchart of a segment of a computer program for the controller in FIG. 33 which relates to a tracklog process.

FIG. 34 is a flowchart of a segment of a computer program for the controller 37G which relates to a tracklog process. The program segment in FIG. 34 is similar to that in FIG. 6 except for the following points. The program segment in FIG. 34 has added steps S108 and S109. The step S108 immediately precedes the step S101. The step S109 immediately precedes the step S103. The program segment in FIG. 34 has a log data storing block S102G and a data thinning block S107G instead of the log data storing block S102 and the data thinning block S107 in FIG. 6 respectively.

The step S108 is repetitively executed until the step S101 decides that the present time is a log timing. During the repetitive execution of the step S108, the acceleration cumulating section 95 detects the current transverse-direction acceleration of the vehicle from the information outputted by the acceleration sensor 43 at every acceleration detection timing. The acceleration cumulating section 95 adds up the detected accelerations to calculate a cumulative acceleration. Preferably, the acceleration cumulating section 95 adds up the absolute values or magnitudes of the detected accelerations to treat acceleration in the leftward transverse direction and that in the rightward transverse direction equally.

In the step S109 following the block S102G, the acceleration cumulating section 95 resets or clears the calculated cumulative acceleration to zero.

FIG. 35 shows the details of the log data storing block S102G. As shown in FIG. 35, the log data storing block S102F has a sequence of steps S201, S212, S202, S202A, and S213. The step S201 follows the step S101 of FIG. 34. The step S213 is followed by the step S109 of FIG. 34. The steps S201, S202, and S202A are the same as those in FIG. 6.

In the step S212 between the steps S201 and S202, the acceleration cumulating section 95 labels the latest cumulative acceleration as a final cumulative acceleration. The acceleration cumulating section 95 generates a cumulative acceleration information piece representing the final cumulative acceleration.

In the step S213 following the step S202A, the log data storing section 81 stores the generated log data piece into unoccupied one among the log data storage areas in the log buffer in the storage device 34G. Furthermore, the acceleration cumulating section 95 stores the generated cumulative acceleration information piece into the log buffer in a manner such that the cumulative acceleration information piece and the log data piece generated at the same log timing will be in correspondence or in a set.

FIG. 36 shows the details of the data thinning block S107G. As shown in FIG. 36, the data thinning block S107G has a sequence of steps S313-S316. The step S313 follows the step S104 in FIG. 34. The step S316 is followed by the step S108 in FIG. 34.

In the step S313, the cumulative acceleration deciding section 96 refers to cumulative acceleration information pieces in the log buffer and thereby sorts sets of log data pieces and cumulative acceleration information pieces in order of increasing cumulative acceleration represented by a cumulative acceleration information piece.

In the step S314 following the step S313, the cumulative acceleration deciding section 96 chooses successive ones among the sorted sets in order of cumulative acceleration starting from the lowest. The number of the chosen sets is equal to, for example, 30% of the total number of the sets in the log buffer. Thus, the prescribed thinning rate corresponding to the number of the chosen sets is equal to, for example, 30%. The cumulative acceleration deciding section 96 designates the chosen sets as to-be-erased objects. On the other hand, the cumulative acceleration deciding section 96 does not designate other sets in the log buffer.

In the step S315 subsequent to the step S314, the cumulative acceleration deciding section 96 refers to the cumulative acceleration information pieces in the log buffer and thereby sorts the sets of the log data pieces and the cumulative acceleration information pieces in order of decreasing cumulative acceleration represented by a cumulative acceleration information piece. Then, the cumulative acceleration deciding section 96 chooses successive ones among the sorted sets in order of cumulative acceleration starting from the highest. The number of the chosen sets is given by a prescribed choice rate. The number of the chosen sets is equal to, for example, 30% of the total number of the sets in the log buffer. Thus, the prescribed choice rate is equal to, for example, 30%. The cumulative acceleration deciding section 96 searches the sets in the log buffer for those (search-result sets) having log data pieces immediately preceding the log data pieces in the chosen sets in terms of generation time respectively, and excludes the search-result sets from the to-be-erased objects.

In the step S316 following the step S315, the data thinning section 83 accesses ones among the sets of log data pieces and cumulative acceleration information pieces in the log buffer which remain designated by the cumulative acceleration deciding section 96 as to-be-erased objects. The data thinning section 83 erases the designated sets from related storage areas in the log buffer. Thereby, the foregoing storage areas are made usable for storing new sets of log data pieces and cumulative acceleration information pieces.

In the above description, the thinning rate is equal to, for example, 30%. Thus, the thinning rate may be equal to a value different from 30%. The choice rate is equal to, for example, 30%. Thus, the choice rate may be equal to a value different from 30%.

For example, the log data pieces in the log buffer in FIG. 32 are successively generated at the positions 511-516 in FIG. 31A, respectively. The uppermost log data piece in FIG. 32 is generated at the position 511 while the lowermost log data piece therein is generated at the position 516. The vehicle cumulative accelerations represented by the cumulative acceleration information pieces in FIG. 32 are "0", "0", "0", "0", "20", and "0" for the positions 511-516, respectively. In the interval between the positions 514 and 515, the direction of travel of the vehicle significantly changes so that the cumulative transverse-direction acceleration of the vehicle which occurs at the moment corresponding to the position 515 is relatively high. In this case, the log data piece representing the position 515 corresponding to the high cumulative acceleration, and the log data piece representing the position 514 (the log data piece immediately preceding the aforesaid log data piece in terms of generation time) are excluded from the to-be-erased objects. Thus, it is possible to prevent the wrong route portion 502 (FIG. 31B) from being recognized as an actual route portion taken by the vehicle. Therefore, it is possible to further suppress a reduction in the accuracy of the route taken by the vehicle which is computed from the positions represented by non-erased log data pieces.

The above-mentioned method of thinning out log data pieces may be replaced by the following method. Specifically, a log data piece in the log buffer which corresponds to a cumulative acceleration information piece representing a cumulative acceleration lower than a predetermined threshold value is designated as a to-be-erased object. On the other hand, a log data piece in the log buffer which corresponds to a cumulative acceleration information piece representing a cumulative acceleration equal to or higher than the predetermined threshold value is not designated.

As previously mentioned, the cumulative acceleration deciding section 96 sorts the log data pieces in the log buffer in order of decreasing cumulative acceleration represented by a corresponding cumulative acceleration information piece. Then, the cumulative acceleration deciding section 96 chooses successive ones among the sorted log data pieces in order of cumulative acceleration starting from the highest. The number of the chosen log data pieces is given by the prescribed choice rate. The cumulative acceleration deciding section 96 searches the log buffer for the log data pieces immediately preceding the chosen log data pieces in terms of generation time respectively, and excludes the search-result log data pieces from the to-be-erased objects. These actions of the cumulative acceleration deciding section 96 may be replaced by the following actions. Specifically, the cumulative acceleration deciding section 96 chooses, from the log data pieces in the log buffer, those each corresponding to a cumulative acceleration information representing a cumulative acceleration equal to or higher than a prescribed threshold value. The cumulative acceleration deciding section 96 searches the log buffer for the log data pieces immediately preceding the chosen log data pieces in terms of generation time respectively, and excludes the search-result log data pieces from the to-be-erased objects.

The longitudinal-direction acceleration or the angular velocity of the vehicle may be used instead of the transverse-direction acceleration thereof.

As previously described, a log data piece and a cumulative acceleration information piece representing the cumulative transverse-direction acceleration of the vehicle which occurs at the moment of generation of the log data piece are stored into the log buffer in a manner such that the stored log data piece and the stored acceleration information will be in correspondence or in a set. A new log data piece is allowed to be written into a log data storage area storing a log data piece corresponding to a cumulative acceleration information piece representing a cumulative acceleration decided to be so low as to meet a prescribed condition (a condition based on the threshold value or the thinning rate). On the other hand, a new log data piece is inhibited from being written into a log data storage area storing a log data piece corresponding to a cumulative acceleration information piece representing a cumulative acceleration decided to be not so low.

If log data pieces generated during the travel of the vehicle along a curve in a road and log data pieces generated immediately before and immediately after the travel were erased, they could not be correctly recovered through interpolation. As previously described, such log data pieces are prevented from being erased. Therefore, it is possible to further suppress a reduction in the accuracy of the route taken by the vehicle which is computed from the positions represented by non-erased log data pieces.

Ninth Embodiment

A ninth embodiment of this invention is similar to the first embodiment thereof except for design changes mentioned hereafter.

Figure 37:
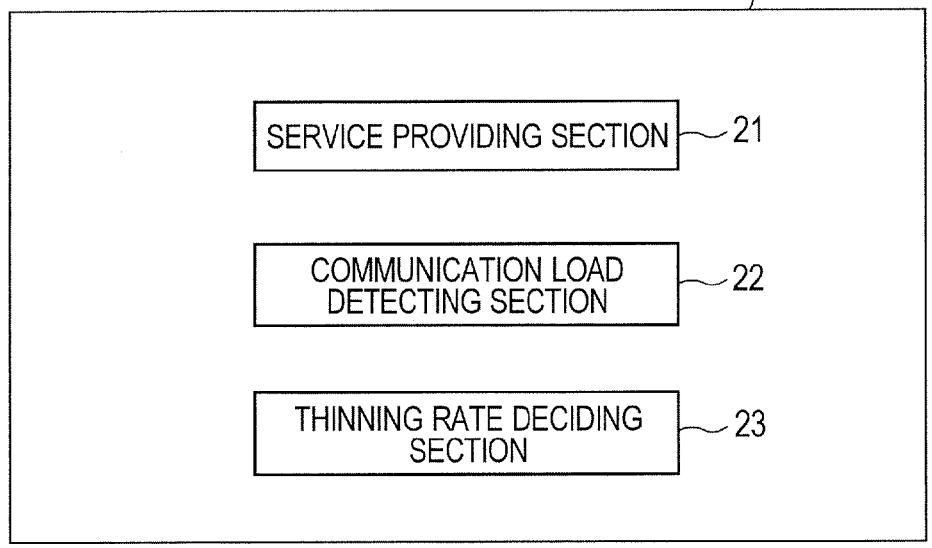
FIG. 37 is a diagram of a controller in a server according to a ninth embodiment of this invention.

FIG. 37 shows a controller 51H in the server 50 which replaces the controller 51 in FIG. 3. The controller 51H includes a service providing section 21, a communication load detecting section 22, and a thinning rate deciding section 23.

The service providing section 21 performs processes for providing various services. The service providing section 21 corresponds to the web application 71, the web server 72, and the database 73 in FIG. 3.

The communication load detecting section 22 detects a communication load on the server 50. The communication load detecting section 22 detects, for example, the number of sessions established for transmission of log data pieces between the server 50 and navigation apparatuses as an indication of a communication load. In this case, the communication load detecting section 22 may detect the number of sessions in established states at every given instant. Alternatively, the communication load detecting section 22 may detect the number of sessions established during every predetermined time. The communication load detecting section 22 may detect the number of sessions established between the server 50 and navigation apparatuses plus the number of sessions established between the server 50 and other information processing apparatuses (for example, clients) as an indication of a communication load.

The thinning rate deciding section 23 decides a thinning rate to be used in the navigation apparatus 30 on the basis of the communication load detected by the communication load detecting section 22. The thinning rate deciding section 23 generates thinning rate information representative of the decided thinning rate. The thinning rate deciding section 23 sends the thinning rate information to the navigation apparatus 30 via the communication device 53. The navigation apparatus 30 implements thinning out log data pieces at a rate equal to the thinning rate represented by the thinning rate information sent from the server 50.

Preferably, the decided thinning rate increases as the detected communication load increases. According to a first example, information representative of a prescribed function relating communication load with thinning rate is prepared in the storage 52. The prescribed function is designed so that inputting a communication load (for example, the number of sessions) into the function causes a corresponding thinning rate to be outputted therefrom. Accordingly, the detected communication load is inputted into the function, and a thinning rate outputted therefrom is labeled as the decided thinning rate. According to a second example, information representative of a table relating communication load with thinning rate is prepared in the storage 52. By referring to the table in response to the detected communication load, a corresponding thinning rate is obtained. The obtained thinning rate is labeled as the decided thinning rate.

Thus, as the communication load on the server 50 is greater, the thinning rate in the navigation apparatus 30 for thinning out log data pieces is increased. The increase in the thinning rate delays the moment at which the log buffer becomes fully occupied by log data pieces again. Therefore, as the communication load on the server 50 is greater, the time intervals between the moments of sending log data pieces from the navigation apparatus 30 to the server 50 are extended. The extended time intervals can reduce the communication load on the server 50.

Figure 38:
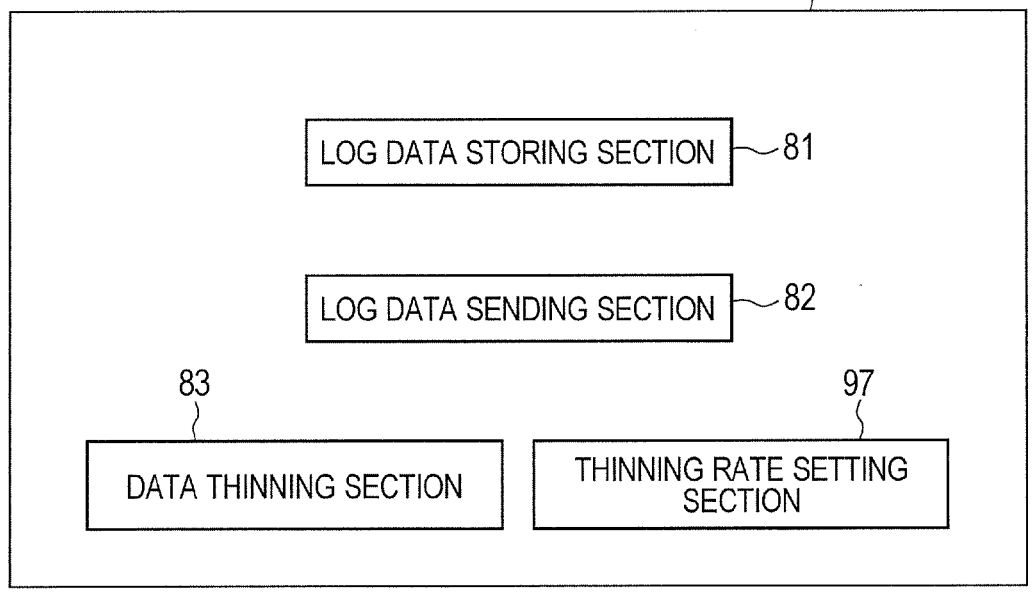
FIG. 38 is a diagram of a controller in a navigation apparatus in the ninth embodiment of this invention.

FIG. 38 shows a controller 37H used instead of the controller 37 in FIGS. 2 and 4. The controller 37H is similar to the controller 37 except that a thinning rate setting section 97 is additionally provided therein.

The thinning rate setting section 97 receives the thinning rate information from the server 50 via the communication device 38. The thinning rate setting section 97 updates the old thinning rate in accordance with the decided thinning rate represented by the received thinning rate information. Specifically, the navigation apparatus 30 is designed so that thinning rate information representative of a thinning rate is stored in the storage device 34. The controller 37H thins out log data pieces at a thinning rate equal to that represented by the thinning rate information in the storage device 34. Each time thinning rate information from the server 50 is received, the thinning rate setting section 97 replaces the thinning rate information in the storage device 34 with the received thinning rate information. In this way, the thinning rate information in the storage device 34 is updated in accordance with the received thinning rate information. Then, the controller 37H thins out log data pieces at a thinning rate equal to that represented by the new thinning rate information in the storage device 34. In other words, the controller 37H thins out log data pieces at a thinning rate equal to that represented by the received thinning rate information.

Figure 39:
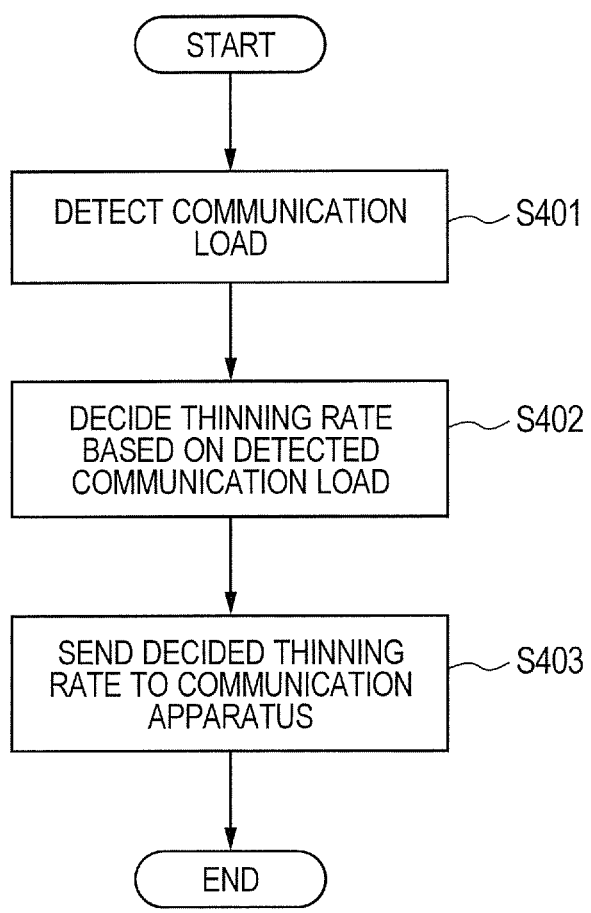
FIG. 39 is a flowchart of a segment of a computer program for the controller in FIG. 37 which relates to a thinning rate changing process.

FIG. 39 is a flowchart of a segment of a computer program for the controller 51H which relates to a thinning rate changing process. The program segment in FIG. 39 is repetitively executed.

With reference to FIG. 39, in a first step S401 of the program segment, the communication load detecting section 22 detects a communication load on the server 50.

In a step S402 following the step S401, the thinning rate deciding section 23 decides a thinning rate to be used in the navigation apparatus 30 (each of connected navigation apparatuses) on the basis of the communication load detected by the communication load detecting section 22. The thinning rate deciding section 23 generates thinning rate information representative of the decided thinning rate.

In a step S403 subsequent to the step S402, the thinning rate deciding section 23 sends the thinning rate information to the navigation apparatus 30 via the communication device 53. As a result, the navigation apparatus 30 implements thinning out log data pieces at a rate equal to the decided thinning rate. After the step S403, the current execution cycle of the program segment ends.

As previously mentioned, the server 50 decides a thinning rate to be used in the navigation apparatus 30 on the basis of the applied communication load. Then, the server 50 notifies the decided thinning rate to the navigation apparatus 30, and the notified thinning rate is actually used by the navigation apparatus 30. These actions may be replaced by the following action. The server 50 extends the intervals between log timings used in the navigation apparatus 30 as the applied communication load increases.

In the event that sending log data pieces from the navigation apparatus 30 to the server 50 is impossible, the navigation apparatus 30 thins out the log data pieces at a thinning rate which is greater as the communication load on the server 50 increases. Thus, the conditions for choosing ones from among log data pieces and designating the chosen log data pieces as to-be-erased objects are such that the number of to-be-erased log data pieces occurring per unit time increases as the communication load increases.

Thus, as the communication load on the server 50 is greater, the thinning rate in the navigation apparatus 30 for thinning out log data pieces is increased. The increase in the thinning rate delays the moment at which the log buffer becomes fully occupied by log data pieces again. Therefore, as the communication load on the server 50 is greater, the time intervals between the moments of sending log data pieces from the navigation apparatus 30 to the server 50 are extended. The extended time intervals can reduce the communication load on the server 50.

Tenth Embodiment

A tenth embodiment of this invention is similar to the first embodiment thereof except for design changes mentioned hereafter.

Figure 40:
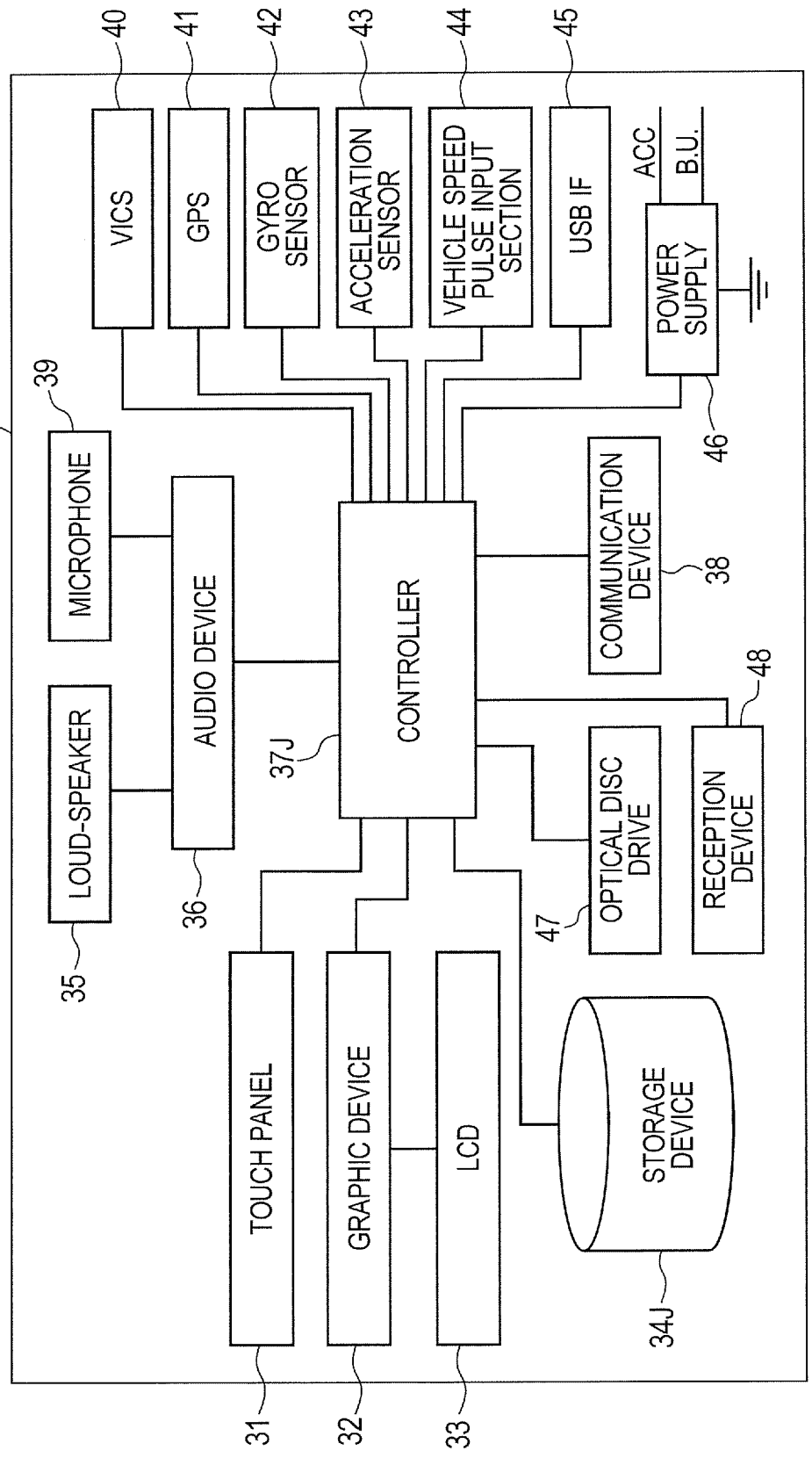
FIG. 40 is a block diagram of a navigation apparatus according to a tenth embodiment of this invention.

FIG. 40 shows a navigation apparatus 30J which replaces the navigation apparatus 30 in FIGS. 1 and 2. The navigation apparatus 30J includes an optical disc drive 47 and a reception device (radio receiver) 48. The navigation apparatus 30J includes a storage device 34J and a controller 37J instead of the storage device 34 and the controller 37 in FIG. 2.

The optical disc drive 47 reads out information from an optical disc, and outputs the read-out information to the controller 37J. The optical disc is, for example, a CD-ROM, a CD-R, a CD-R/W, a DVD-ROM, a DVD-R, or a DVD-RW. Preferably, the optical disc stores music-related information such as music audio information (information representative of music audio) or music metadata. The music metadata indicates, for example, a tune name, an artist name, an album name, a release year, and a music genre.

The reception device 48 receives radio waves. The reception device 48 demodulates the received radio waves into information representing radio audio. The reception device 48 outputs the radio audio information to the controller 37J.

An audio player is connected to the USB interface 45. When music is played back by the audio player in response to user's request, the audio player inputs music-related information into the USB interface 45. The USB interface 45 passes the input music-related information to the controller 37J.

Figure 41:
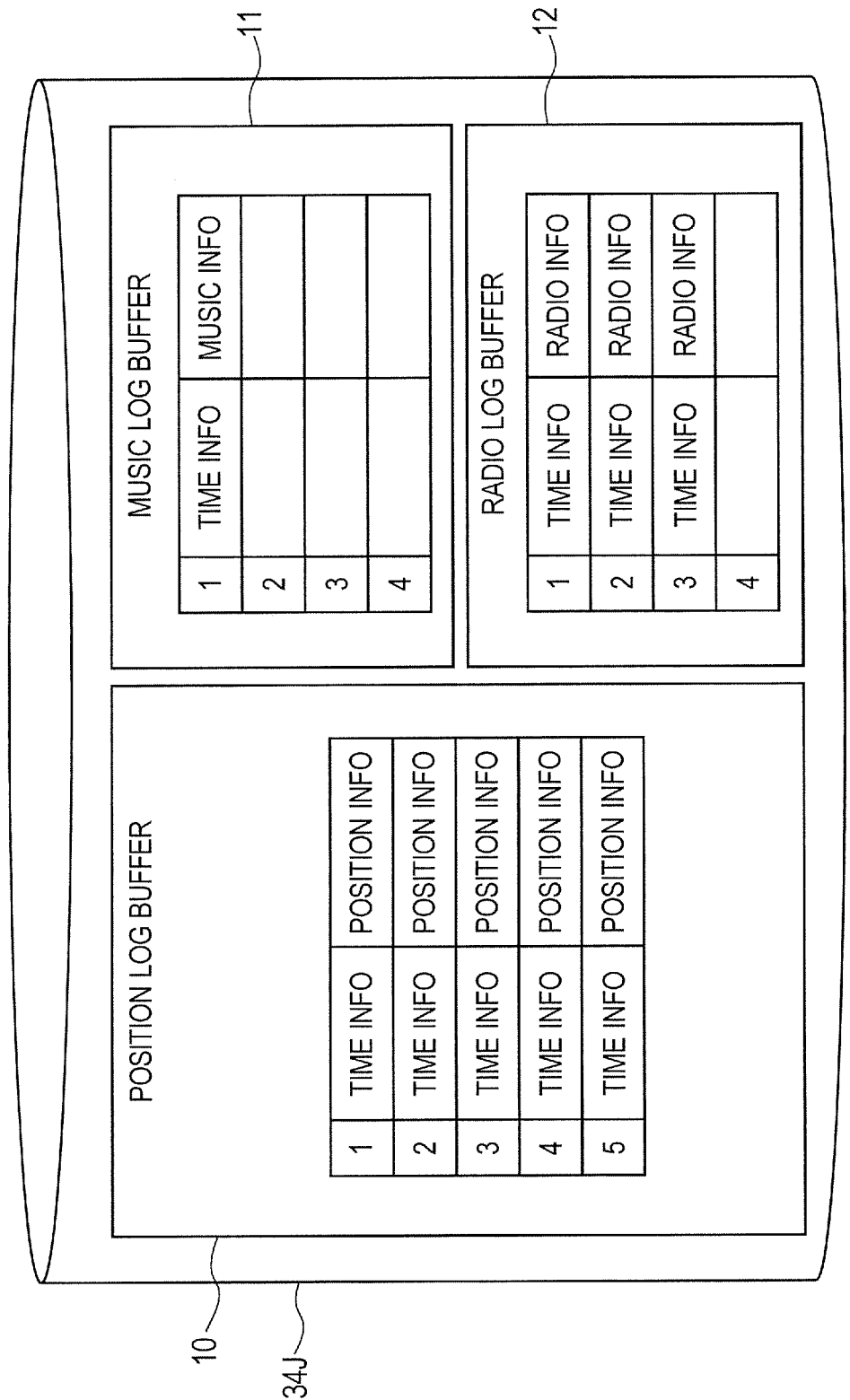
FIG. 41 is a diagram of a storage device in FIG. 40.

As shown in FIG. 41, the storage device 34J includes a log buffer 10, a music log buffer 11, and a radio log buffer 12. The log buffer 10 is similar to that in FIG. 5. The log buffer 10 may be referred to as the position log buffer 10 also. Log data pieces in the log buffer 10 may be referred to as position log data pieces also.

The music log buffer 11 has a prescribed number of storage areas for respective music log data pieces. Each music log data piece is generated and stored into the music log buffer 11 when the navigation apparatus 30 plays back music in response to user's request. Each music log data piece includes a set of a time information piece and a music information piece. The time information piece represents the time at which the music is played back. The music information piece relates to the played-back music. The music information piece represents, for example, the contents of music metadata.

The radio log buffer 12 has a prescribed number of storage areas for respective radio log data pieces. Each radio log data piece is generated and stored into the music log buffer 11 when the navigation apparatus 30 receives a radio program in response to user's request. Each radio log data piece includes a set of a time information piece and a radio information piece. The time information piece represents the time at which the radio program is played back. The radio information piece relates to the received radio program. The radio information piece represents, for example, a radio channel via which the radio program is transmitted.

Figure 42:
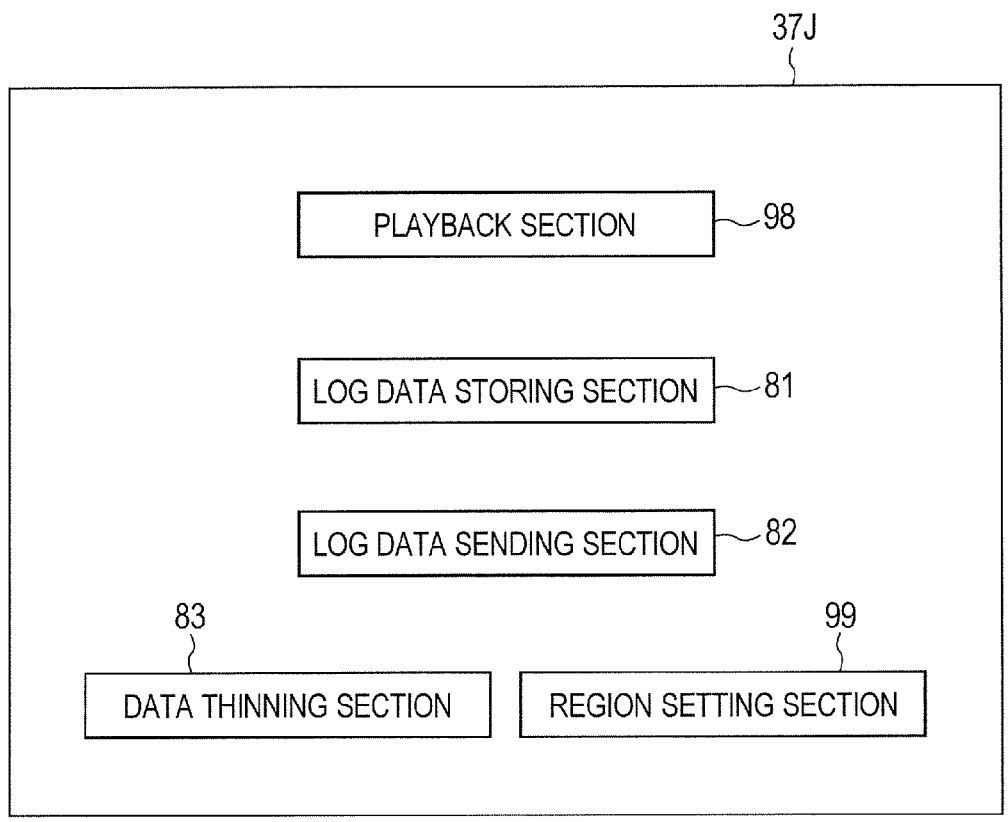
FIG. 42 is a diagram of a controller in FIG. 40.

With reference to FIG. 42, the controller 37J is similar to the controller 37 in FIGS. 2 and 4 except that a playback section 98 and a region setting section 99 are additionally provided therein.

The playback section 98 operates for playing back music or receiving and recovering a radio program. When the user actuates the touch panel 31 and thereby inputs, into the navigation apparatus 30J, a request for playing back music, the touch panel 31 outputs information representative of the request to the controller 37J. The playback section 98 obtains music audio information and music metadata from an optical disc via the optical disc drive 47 in accordance with the request represented by the information outputted by the touch panel 31. The playback section 98 feeds the obtained music audio information to the audio device 36. The playback section 98 receives music audio information and music metadata from the USB interface 45. The playback section 98 feeds the received music audio information to the audio device 36.

The audio device 36 drives the loudspeaker or loudspeakers 35 in response to the music audio information fed from the playback section 98 so that sounds of music represented by the music audio information are emitted from the loudspeaker or loudspeakers 35. In this way, the music represented by the music audio information is reproduced. When the music is reproduced, the playback section 98 generates a music information piece on the basis of the corresponding music metadata. Furthermore, the playback section 98 generates a time information piece representing the time at which the music is reproduced. The playback section 98 combines the generated music information piece and the generated time information piece into a music log data piece. The playback section 98 stores the music log data piece into one of the storage areas in the music log buffer 11.

When the user actuates the touch panel 31 and thereby inputs, into the navigation apparatus 30J, a request for receiving and recovering a radio program, the touch panel 31 outputs information representative of the request to the controller 37J. When the user actuates the touch panel 31 and thereby inputs a desired radio channel into the navigation apparatus 30J, the touch panel 31 outputs information representative of the desired radio channel to the controller 37J. The playback section 98 controls the reception device 48 in response to the request and the desired radio channel represented by the information outputted from the touch panel 31 so that the reception device 48 will tune in to the desired channel and receive and recover a radio program (radio audio). Thus, the playback section 98 receives radio audio information representative of the radio program from the reception device 48. The playback section 98 feeds the received radio audio information to the audio device 36.

The audio device 36 drives the loudspeaker or loudspeakers 35 in response to the radio audio information fed from the playback section 98 so that sounds of the radio audio (radio program) represented by the radio audio information are emitted from the loudspeaker or loudspeakers 35. In this way, the radio audio represented by the radio audio information is reproduced.

Specifically, the playback section 98 feeds, to the audio device 36, radio audio information transmitted via a radio channel identical with the desired radio channel. Thereby, the radio audio information transmitted via the radio channel desired by the user is reproduced. When the radio audio is reproduced, the playback section 98 generates a radio information piece representing the radio channel desired by the user. Furthermore, the playback section 98 generates a time information piece representing the time at which the radio audio is reproduced. The playback section 98 combines the generated radio information piece and the generated time information piece into a radio log data piece. The playback section 98 stores the radio log data piece into one of the storage areas in the radio log buffer 12.

At every transmission timing, the navigation apparatus 30J sends position log data pieces, music log data pieces, and radio log data pieces from the log buffers 10, 11, and 12 to the server 50. Thereby, the server 50 can obtain travel history information indicating the route taken by the vehicle, the metadata about the music played back during the travel, and the radio channel or channels tuned in during the travel.

The region setting section 99 changes the ratio in size among regions in the storage device 34J which are assigned to the position log buffer 10, the audio log buffer 11, and the radio log buffer 12 respectively. In the event that the log data sending section 82 has failed to send log data pieces to the server 50 at a transmission timing, the region setting section 99 decides whether or not the related data thinning process has already been performed.

Preferably, when the data thinning section 83 has completed thinning out log data pieces, the controller 37J stores a specified signal into the storage device 34J which represents that the data thinning process has already been performed. By referring to the specified signal in the storage device 34J, the region setting section 99 carries out the above-mentioned decision. It is preferable to erase the specified signal from the storage device 34J when the log data sending section 82 succeeds in sending the log data pieces to the server 50.

In the case where it is decided that the related data thinning process has already been performed, the region setting section 99 changes the ratio in size among the regions in the storage device 34J which are assigned to the log buffers 10, 11, and 12 respectively. Specifically, the region setting section 99 narrows at least one of the regions for the music log buffer 11 and the radio log buffer 12 while expanding the region for the position log buffer 10. For example, an unoccupied portion of at least one of the regions for the music log buffer 11 and the radio log buffer 12 is partially added to the region for the position log buffer 10. Therefore, the region for the position log buffer 10 is expanded, and log data pieces can continue to be stored into the position log buffer 10 for a longer term.

The above change of the sizes of the regions for the log buffers 10, 11, and 12 may be in one of various ways including first and second ways explained below. In the first way, calculation is made as to the rate in size of the occupied portion of each of the music log buffer 11 and the radio log buffer 12 to the whole thereof. The calculated occupancy rates of the music log buffer 11 and the radio log buffer 12 are compared. The region for one of the music log buffer 11 and the radio log buffer 12 which has the lower occupancy rate is narrowed, whereas the region for the position log buffer 10 is expanded accordingly. In FIG. 41, the occupancy rate of the music log buffer 11 is 25% since only one among four log data storage areas therein is occupied. On the other hand, the occupancy rate of the radio log buffer 12 is 75% since three among four log data storage areas therein are occupied. Therefore, in this case, the region for the music log buffer 11 is narrowed, whereas the region for the position log buffer 10 is expanded accordingly. For example, unoccupied two among the four log data storage areas in the music log buffer 11 are newly labeled as log data storage areas in the position log buffer 10. As understood from the above description, the region for one of the music log buffer 11 and the radio log buffer 12 which is more room for accepting data is preferentially used to expand the region for the position log buffer 10. Thus, the regions for the music log buffer 11 and the radio log buffer 12 are properly used to expand the region for the position log buffer 10 while the music log buffer 11 and the radio log buffer 12 are reliably prevented from being fully occupied by corresponding log data pieces.

In the second way, the size of each music log data piece and that of each radio log data piece are compared. The region for one of the music log buffer 11 and the radio log buffer 12 which is assigned to data pieces having a smaller size is narrowed, whereas the region for the position log buffer 10 is expanded accordingly. As previously mentioned, a radio information piece in each radio log data piece represents, for example, a radio channel only. On the other hand, a music information piece in each music log data piece represents, for example, the contents of music metadata. Thus, in this case, each music log data piece is greater in size than each radio log data piece. Therefore, the region for the radio log buffer 12 is narrowed, whereas the region for the position log buffer 10 is expanded accordingly.

The above change of the sizes of the regions for the log buffers 10, 11, and 12 is suited especially to the case where the normal sizes of the regions for the music log buffer 11 and the radio log buffer 12 are equal.

Figure 43:
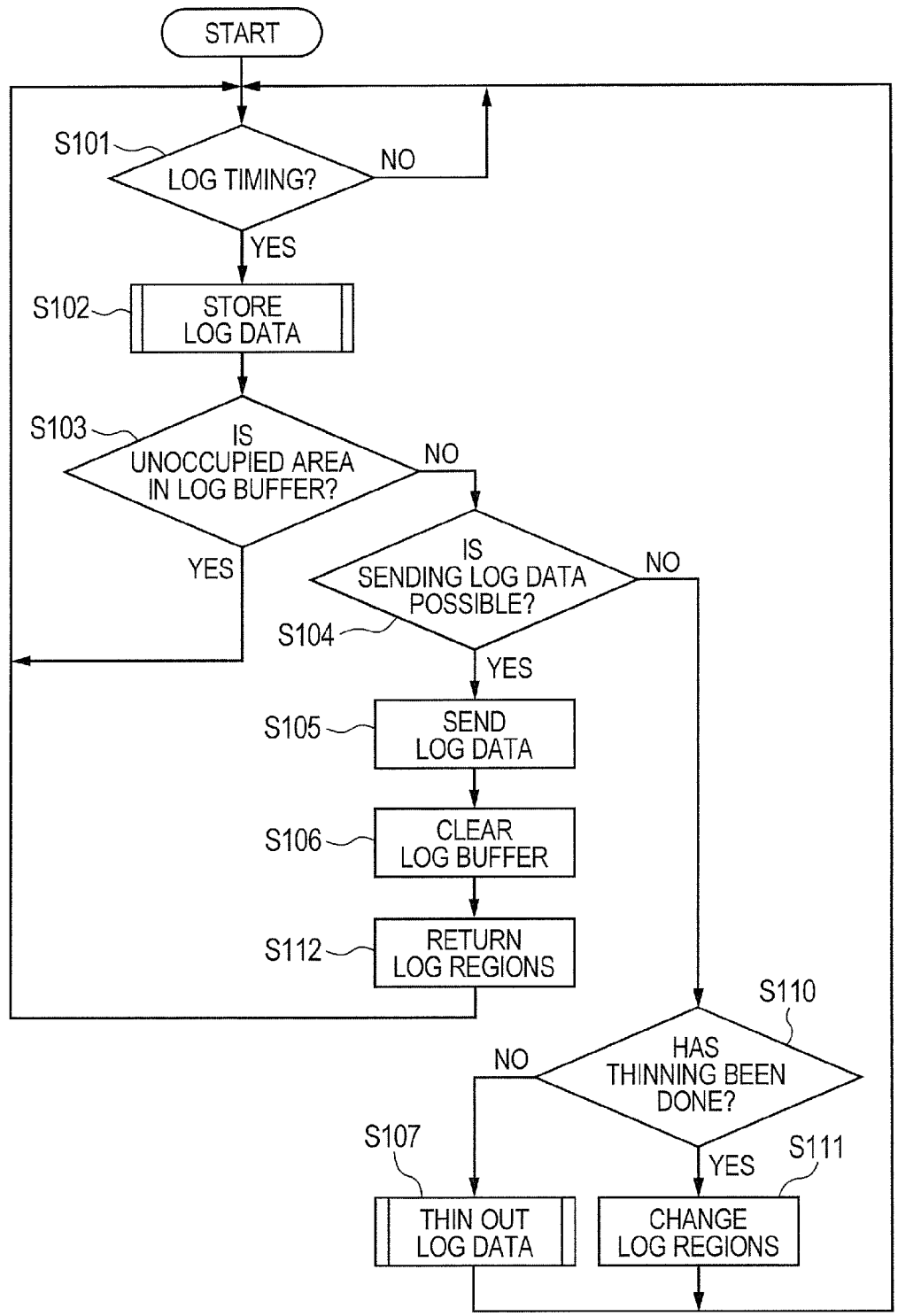
FIG. 43 is a flowchart of a segment of a computer program for the controller in FIG. 42 which relates to a tracklog process.

FIG. 43 is a flowchart of a segment of a computer program for the controller 37J which relates to a tracklog process. The program segment in FIG. 43 is similar to that in FIG. 6 except for the following points. The program segment in FIG. 43 has added steps S110, S111, and S112. The step S110 immediately follows the step S104. The step S111 is located between the steps S110 and S101. The block S107 is located between the steps S110 and the step S101. The step S112 is located between the steps S106 and S101.

When it is decided in the step S104 that sending log data pieces to the server 50 is impossible, the program advances from the step S104 to the step S110.

In the step S110, the region setting section 99 decides whether or not the data thinning process has already been performed. When the data thinning process has already been performed, the program advances from the step S110 to the step S111. Otherwise, the program advances from the step S110 to the block S107.

In the block S107, the data thinning section 83 thins out position log data pieces in the position log data buffer 10. After the block S107, the program returns to the step S101.

In the step S111, the region setting section 99 changes, from the original, the ratio in size among regions in the storage device 34J which are assigned to the position log buffer 10, the music log buffer 11, and the radio log buffer 12 respectively. After the step S111, the program returns to the step S101.

When it is decided in the step S104 that sending log data pieces to the server 50 is possible, the program advances from the step S104 to the step S105.

In the step S105, the log data sending section 82 reads out position log data pieces from all the log data storage areas in the position log buffer 10, and reads out all music log data pieces and radio log data pieces from the music log buffer 11 and the radio log buffer 12. Furthermore, the log data sending section 82 sends the read-out log data pieces to the server 50 via the communication device 38.

In the step S106 following the step S105, the log data sending section 82 clears the log buffers 10, 11, and 12 so that all the log data storage areas in the log buffers 10, 11, and 12 are made usable for accepting new log data pieces.

In the step S112 following the step S106, the region setting section 99 returns or resets, to the original, the ratio in size among regions in the storage device 34J which are assigned to the log buffers 10, 11, and 12 respectively if the ratio has been changed in the step S111. After the step S112, the program returns to the step S101.

As described above, in addition to position log data pieces inclusive of positional information pieces, music log data pieces inclusive of music information pieces and radio log data pieces inclusive of radio information pieces are stored in the navigation apparatus 30J before being sent to the server 50. Information pieces to be sent to the server 50 may differ from the music information pieces and the radio information pieces. Preferably, information pieces to be sent to the server 50 represent contents played back by the navigation apparatus 30J. For example, the navigation apparatus 30J is designed to receive and monitor a television program. In this case, a television information piece having contents related to the monitored television program is stored in the navigation apparatus 30J before being sent to the server 50. The television information piece represents, for example, the television channel for the monitored television program.

As understood from the above description, timings of transmitting music log data pieces and radio log data pieces to the server 50 are the same as those of transmitting position log data pieces. The transmission timings for music log data pieces and radio log data pieces may differ from those for position log data pieces. For example, when the music log buffer 11 is fully occupied, the log data sending section 82 sends music log data pieces from the music log buffer 11 to the server 50 and erases the music log data pieces from the music log buffer 11. In this case, the log data storage areas in the music log buffer 11 are made usable for accepting new music log data pieces. Similarly, radio log data pieces and the radio log buffer 12 may be handled.

As previously mentioned, when the data thinning process has already been performed, the region setting section 99 changes the ratio in size among the regions in the storage device 34J which are assigned to the log buffers 10, 11, and 12 respectively. This action may be replaced by the following action. In the event that the log data sending section 82 has failed to send log data pieces to the server 50, the region setting section 99 changes the ratio even when the data thinning process has not been performed yet.

As understood from the above description, when sensing position log data pieces to the server 50 is impossible, new position log data pieces are allowed to be written into unoccupied log data storage areas in at least one of the music log buffer 11 and the radio log buffer 12. Thus, more position information pieces can be stored in the storage device 34J. Furthermore, position log data pieces can continue to be stored into the position log buffer 10 for a longer term.

Eleventh Embodiment

An eleventh embodiment of this invention is similar to the first embodiment thereof except for design changes mentioned hereafter.

Consideration is given of a route portion where many positional information pieces are generated at positions spaced at short intervals. If some of the generated positional information pieces are erased, the route portion can be computed with an acceptable accuracy through interpolation using the remaining positional information pieces as mentioned regarding the sixth embodiment of this invention. Since the original positional information pieces are generated at positions spaced at short intervals, the intervals between the positions represented by the remaining positional information pieces are not so long and hence the remaining positional information pieces are effective in accurately computing the route portion through interpolation.

In view of the above, the sixth embodiment of this invention is designed to implement the following actions. In the case where the distance between the positions represented by two positional information pieces is shorter than a predetermined threshold value, one of the positional information pieces is designated as a to-be-erased object. On the other hand, in the case where the distance is equal to or longer than the threshold value, none of the positional information pieces is designated as a to-be-erased object.

Figure 44:
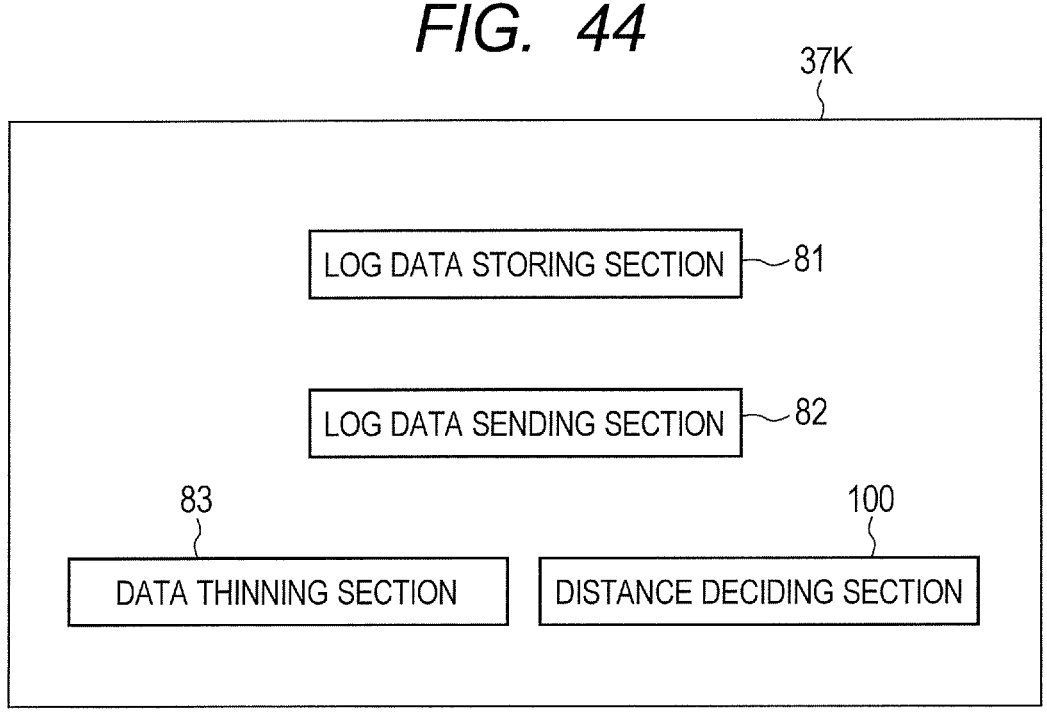
FIG. 44 is a diagram of a controller in a navigation apparatus according to an eleventh embodiment of this invention.

FIG. 44 shows a controller 37K used instead of the controller 37 in FIGS. 2 and 4. The controller 37K is similar to the controller 37 except that a distance deciding section 100 is additionally provided therein.

The distance deciding section 100 refers to a pair of log data pieces in the log buffer. For the pair, the distance deciding section 100 decides whether or not the distance between the positions represented by positional information pieces in the two log data pieces is shorter than a predetermined threshold value. When the distance is shorter than the threshold value, the distance deciding section 100 designates one of the two log data pieces as a to-be-erased object. On the other hand, when the distance is equal to or longer than the threshold value, the distance deciding section 100 designates none of the two log data pieces as a to-be-erased object.

The data thinning section 83 actually erases, from the log buffer, a log data piece designated as a to-be-erased object by the distance deciding section 100.

The pair which the distance deciding section 100 refers to may be changed among all possible pairs or selected ones of all possible pairs of log data pieces in the log buffer. Preferably, the log data pieces in the pair are successive or adjacent in terms of generation time.

Figure 45:
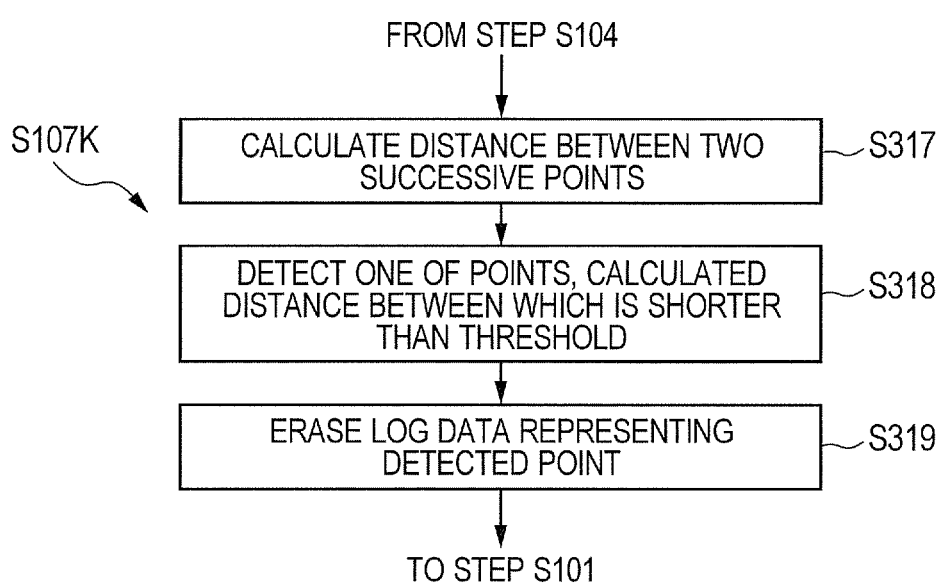
FIG. 45 is a flowchart of the details of a data thinning block in the eleventh embodiment of this invention.

FIG. 45 shows the details of a data thinning block S107K which replaces the data thinning block S107 in FIG. 6. As shown in FIG. 45, the data thinning block S107K has sequential steps S317, S318, and S319. The step S317 follows the step S104 in FIG. 6. The step S319 is followed by the step S101 in FIG. 6.

In the step S317, the distance deciding section 100 refers to a pair of log data pieces in the log buffer. For the pair, the distance deciding section 100 calculates the distance between the positions represented by positional information pieces in the two log data pieces.

In the step S318 following the step S317, the distance deciding section 100 decides whether or not the calculated distance is shorter than the threshold value. When the distance is shorter than the threshold value, the distance deciding section 100 designates one of the two log data pieces as a to-be-erased object. On the other hand, when the distance is equal to or longer than the threshold value, the distance deciding section 100 designates none of the two log data pieces as a to-be-erased object.

Preferably, the log data pieces in the pair are successive or adjacent in terms of generation time. In this case, it is possible to more properly detect two positional information pieces representing close positions.

In the step S319 subsequent to the step S318, the data thinning section 83 erases, from the log buffer, a log data piece designated as a to-be-erased object by the distance deciding section 100. Thereby, the log data storage area in the log buffer which is assigned to the designated log data piece is made usable for storing a new log data piece.

The above-mentioned processes in each of the steps S317-S319 may be implemented for each of all combinations of two (pair) among the log data pieces in the log buffer. The above-mentioned processes in the sequence of the steps S317-S319 may be iterated for all combinations of two (pair) among the log data pieces in the log buffer while every implementation of the processes in the sequence is assigned to one combination. Preferably, regarding the selection of pairs from the log data pieces in the log buffer, every log data piece which has already been designated as a to-be-erased object is excluded from the selection targets. In this case, it is possible to prevent all of two or more log data pieces successive in terms of generation time from being designated as to-be-erased objects. Thus, it is possible to prevent the distances between the positions represented by the remaining log data pieces from being excessively long.

The data thinning process by the block S107K may be applied to only one or more of all combinations of two among the log data pieces in the log buffer. As the data thinning process is applied to more of all combinations, more log data pieces can be erased from the log buffer and more log data storage areas in the log buffer will be made usable for storing new log data pieces.

Thinning out log data pieces in the log buffer may be performed at a prescribed thinning rate as in the first embodiment of this invention. According to a first example, the data thinning process by the block S107K continues to be repetitively performed until the number of log data pieces each designated as an object to be erased reaches a predetermined value corresponding to the prescribed thinning rate. According to a second example, in the case where the number of log data pieces each designated as an object to be erased exceeds the predetermined value corresponding to the prescribed thinning rate as a result of the application of the data thinning process by the block S107K to all combinations of two among the log data pieces in the log buffer, the designated log data pieces are arranged in order of increasing the related distance between the positions represented by a designated log data piece and the other log data piece in each combination. In the second example, a given number of log data pieces at serial places starting from one corresponding to the shortest related distance are selected from the arranged designated log data pieces. The given number is predetermined to correspond to the prescribed thinning rate. In the second example, selected ones of the designated log data pieces remain labeled as objects to be erased while unselected ones are excluded from the to-be-erased objects.

As previously mentioned, when the distance between the positions represented by two among log data pieces in the log buffer is shorter than the threshold value, a new log data piece is allowed to be written into one of the log data storage areas in the log buffer which are assigned to the two log data pieces. On the other hand, when the distance is equal to or longer than the threshold value, a new log data piece is inhibited from being written into each of the log data storage areas assigned to the two log data pieces.

Accordingly, log data pieces are thinned out without making excessively long the distances between the positions represented by the remaining log data pieces. Thus, it is possible to further suppress a reduction in the accuracy of the route taken by the vehicle which is computed from the positions represented by non-erased log data pieces.

Twelfth Embodiment

A twelfth embodiment of this invention is similar to one of the first to eleventh embodiments thereof except for the following point.

In the twelfth embodiment of this invention, every timing of sending log data pieces from the navigation apparatus to the server 50 is a timing at which the rate of occupancy of the log buffer by log data pieces reaches a predetermined value.

Thirteenth Embodiment

A thirteenth embodiment of this invention is similar to one of the first to twelfth embodiments thereof except for design changes mentioned hereafter.

Generally, roads are simple and rough in the countryside, whereas they are complicated and fine in a city. Accordingly, for the countryside, even if log data pieces are thinned out at a high rate, the route taken by the vehicle can be computed with an acceptable accuracy through interpolation using the remaining log data pieces. On the other hand, for a city, if log data pieces were thinned out at a high rate, the route taken by the vehicle could not be correctly computed.

In view of the above, the thirteenth embodiment of this invention is designed as follows. A thinning rate or a threshold value are set so that more log data pieces will be erased during the travel of the vehicle in the countryside, and less log data pieces will be erased during the travel of the vehicle in a city.

The map information has an additional piece for superimposing the countryside and cities on the map. The controller in the navigation apparatus collates the position derived from the information outputted by the GPS receiver 41 with the map represented by the map information to decide whether the current position of the vehicle is in the countryside or a city. Thus, log data pieces generated during the travel in the countryside are distinguished from those generated during the travel in a city.

A signal representing a first prescribed thinning rate or a first prescribed threshold value for the travel in the countryside, and a signal representing a second prescribed thinning rate or a second prescribed threshold value for the travel in a city are stored in the storage device in the navigation apparatus. Preferably, the second thinning rate is greater than the first thinning rate. The second threshold value is greater than the first threshold value.

The first thinning rate or the first threshold value is applied to thinning out log data pieces generated during the travel in the countryside. On the other hand, the second thinning rate or the second threshold value is applied to thinning out log data pieces generated during the travel in a city.

Fourteenth Embodiment

A fourteenth embodiment of this invention is a combination of at least two of the first to thirteenth embodiments thereof. Thus, the fourteenth embodiment of this invention performs at least two different data thinning processes.

Preferably, each log data piece designated as a to-be-erased object by one data thinning process and not designated so by one or more other data thinning processes is finally excluded from to-be-erased objects. Alternatively, such a log data piece may be finally designated as a to-be-erased object.

The designation by specified one of different data thinning process may be used preferentially over the designation or designations by the other or others.

The fourteenth embodiment of this invention which includes the ninth embodiment thereof may be designed so that the server 50 can change the threshold value in the navigation apparatus in addition to the thinning rate. In this case, different thinning rates or different threshold values may be applied to the different data thinning processes, respectively.

Fifteenth Embodiment

A fifteenth embodiment of this invention is similar to one of the first to fourteenth embodiments thereof except for the following design changes.

In the data thinning process, erasing a log data piece from a log data storage area in the log buffer to allow a new log data piece to be written into that log data storage area is replaced by the following action. Specifically, the controller in the navigation apparatus prepares state indication flags in the log buffer which correspond to the log data storage areas therein respectively. Every state indication flag of "0" represents that the corresponding log data storage area is unoccupied. Every state indication flag of "1" represents that the corresponding log data storage area is occupied.

The data thinning section 83 accesses each state indication flag corresponding to a log data storage area storing a log data piece designated as a to-be-erased object, and updates the accessed state indication flag to "0" representing that the log data storage area is unoccupied. At this time, the data thinning section 83 does not erase the log data piece designated as a to-be-erased object from the log data storage area. Thus, for each log data storage area storing a log data piece designated as a to-be-erased object, the data thinning section 83 changes a corresponding state indication flag to "0" without erasing the log data piece. The log data storing section 81 stores a new log data piece into a log data storage area corresponding to a state indication flag of "0". Thus, the new log data piece is written over a log data piece designated as a to-be-erased object.

Sixteenth Embodiment

A sixteenth embodiment of this invention is similar to one of the first to fourteenth embodiments thereof except for the following design changes.

The controller in the navigation apparatus prepares write protection flags in the log buffer which correspond to the log data storage areas therein respectively. Every write protection flag of "0" represents that a new log data piece may be written into the corresponding log data storage area or written over a current log data piece in the corresponding log data storage area. Every write protection flag of "1" ("on") represents that a new log data piece should be inhibited from being written into the corresponding log data storage area or written over a current log data piece in the corresponding log data storage area. Thus, every write protection flag of "1" protects a current log data piece in the corresponding log data storage area. Initially, the controller in the navigation apparatus sets all the write protection flags to "0" ("off").

In one of the blocks S102 and S102C-S102G, the log data storing section 81 stores a generated log data piece into a log data storage area in the log buffer which corresponds to a write protection flag of "0". Then, the log data storing section 81 updates that write protection flag to "1".

In the step S103, the log data sending section 82 decides whether or not at least one of the write protection flags in the log buffer is "0". When at least one of the write protection flags is "0", the program returns from the step S103 to the step S101 or the step S108. Otherwise, the program advances from the step S103 to the step S104.

In the step S106, the log data sending section 82 resets or updates all the write protection flags in the log buffer to "0".

In the block S107, the data thinning section 83 resets or updates one or more of the write protection flags in the log buffer to "0". Alternatively, in one of the blocks S107A, S107B, S107D-S107G, and S107K, the data thinning section 83 accesses, among the write protection flags in the log buffer, one or more corresponding to a log data storage area or areas storing a log data piece or pieces designated as an object or objects to be erased. The data thinning section 83 resets or updates the accessed write protection flag or flags to "0".

Seventeenth Embodiment

A seventeenth embodiment of this invention is similar to one of the first to sixteenth embodiments thereof except for the following design changes.

The seventeenth embodiment of this invention includes a first computer having a CPU (Central Processing Unit) or an MPU (Micro Processing Unit), and a second computer having a CPU or an MPU. The first and second computers are assigned to the navigation apparatus and the server 50, respectively. The first computer, the CPU, or MPU therein executes a first computer program for providing the functions of the navigation apparatus, and hence the navigation apparatus is implemented accordingly. The second computer, the CPU, or MPU therein executes a second computer program for providing the functions of the server 50, and hence the server 50 is implemented accordingly.

Preferably, each of the first and second computer programs is stored in a non-transitory computer readable medium, and is fed therefrom to the first or second computer. The non-transitory computer readable medium includes one of tangible storage mediums of various types. Examples of the non-transitory computer readable mediums are a magnetic recording medium, a flexible magnetic recording disc, a magnetic tape, a magnetic recording disc in a hard disc drive, a magneto-optical recording medium, a magneto-optical recording disc, a CD-ROM, a CD-R, a CD-R/W, a semiconductor memory, a mask ROM, a PROM (Programmable ROM), an EPROM (Erasable PROM), a flash ROM, and a RAM.

Each of the first and second computer programs may be stored in a transitory computer readable medium before being fed therefrom to the first or second computer. Examples of the transitory computer readable medium are an electric signal, an optical signal, and an electromagnetic wave. The transitory computer readable medium can carry the first or second computer program to the first or second computer via a wired communication line or a wireless communication line. The wired communication line is, for example, an electric wire or an optical fiber.

Each of the first and second computer programs may be designed to perform the functions of the navigation apparatus or the server 50 in cooperation with an OS (Operating System) or application software on the first or second computer.

What is claimed is:

1. An on-vehicle apparatus comprising:
a storage device including a plurality of storage areas;
a positional information generating section for generating, at every one of a first prescribed timing, a positional information piece representing a position of the vehicle which occurs at said every one of the first prescribed timing, and for writing the generated positional information piece into one of the storage areas, wherein the positional information generating section includes a GPS receiver;

a positional information controlling section for sending positional information pieces in the storage areas to a positional information collecting apparatus at every one of a second prescribed timing, and for allowing new positional information pieces to be written into the storage areas in which the sent positional information pieces are stored; and wherein in cases where the positional information controlling section is not sending the positional information pieces in the storage areas to the positional information collecting apparatus, the positional information controlling section allows a new positional information piece or pieces to be written into one or more of the storage areas which store a positional information piece or pieces having not been sent yet;

an angle deciding section for, in cases where the positional information pieces having not been sent yet include a first positional information piece, a second positional information piece generated after generation of the first positional information piece, and a third positional information piece generated after generation of the second positional information piece, calculating a first straight line connecting a position represented by the first positional information piece and a position represented by the second positional information piece, calculating a second straight line connecting the position represented by the second positional information piece and a position represented by the third positional information piece, calculating an angle formed between the first straight line and the second straight line, and deciding whether or not the calculated angle is smaller than a prescribed threshold angle;

wherein in cases where the angle deciding section decides that the calculated angle is smaller than the prescribed threshold angle, the positional information controlling section inhibits a new positional information piece from being written into the storage area storing the second positional information piece.

2. An on-vehicle apparatus comprising:

a storage device including a plurality of storage areas;

a positional information generating section for generating, at every one of a first prescribed timing, a positional information piece representing a position of the vehicle which occurs at said every one of the first prescribed timing, and for writing the generated positional information piece into one of the storage areas, wherein the positional information generating section includes a GPS receiver;

a positional information controlling section for sending positional information pieces in the storage areas to a positional information collecting apparatus at every one of a second prescribed timing, and for allowing new positional information pieces to be written into the storage areas in which the sent positional information pieces are stored; and wherein in cases where the positional information controlling section is not sending the positional information pieces in the storage areas to the positional information collecting apparatus, the positional information controlling section allows a new positional information piece or pieces to be written into one or more of the storage areas which store a positional information piece or pieces having not been sent yet;

wherein the storage device stores information representing a map;

a detour deciding section for deciding whether or not a detour is present in a route portion between positions represented by two among the positional information pieces having not been sent yet on the basis of the map;

wherein in cases where the detour deciding section decides that a detour is present in the route portion, the positional information controlling section inhibits a new positional information piece from being written into the storage area storing a positional information piece generated between the moments of generation of said two among the positional information pieces.

3. An on-vehicle apparatus comprising:

a storage device including a plurality of storage areas;

a positional information generating section for generating, at every one of a first prescribed timing, a positional information piece representing a position of the vehicle which occurs at said every one of the first prescribed timing, and for writing the generated positional information piece into one of the storage areas, wherein the positional information generating section includes a GPS receiver;

a positional information controlling section for sending positional information pieces in the storage areas to a positional information collecting apparatus at every one of a second prescribed timing, and for allowing new positional information pieces to be written into the storage areas in which the sent positional information pieces are stored; and wherein in cases where the positional information controlling section is not sending the positional information pieces in the storage areas to the positional information collecting apparatus, the positional information controlling section allows a new positional information piece or pieces to be written into one or more of the storage areas which store a positional information piece or pieces having not been sent yet;

wherein the storage device stores information representing a map;

a fork deciding section for deciding whether or not a fork is present in a route portion between positions represented by two among the positional information pieces having not been sent yet on the basis of the map;

wherein in cases where the fork deciding section decides that a fork is present in the route portion, the positional information controlling section inhibits a new positional information piece from being written into one of the storage areas storing said two among the positional information pieces.

4. An on-vehicle apparatus comprising:

a storage device including a plurality of storage areas;

a positional information generating section for generating, at every one of a first prescribed timing, a positional information piece representing a position of the vehicle which occurs at said every one of the first prescribed timing, and for writing the generated positional information piece into one of the storage areas, wherein the positional information generating section includes a GPS receiver;

a positional information controlling section for sending positional information pieces in the storage areas to a positional information collecting apparatus at every one of a second prescribed timing, and for allowing new positional information pieces to be written into the storage areas in which the sent positional information pieces are stored; and wherein in cases where the positional information controlling section is not sending the positional information pieces in the storage areas to the positional information collecting apparatus, the positional information controlling section allows a new positional information piece or pieces to be written into one or more of the storage areas which store a positional information piece or pieces having not been sent yet;

a route search section for searching a desired route to a destination which should be taken by the vehicle;

a deviation information generating section for deciding whether or not the vehicle deviates from the desired route at every one of the first prescribed timing to generate a deviation information piece representing a result of said deciding, and for storing the generated deviation information piece into the storage device in a manner such that the generated deviation information piece and a positional information piece generated at the same one of the first prescribed timing are in correspondence; and a deviation deciding section for referring to the generated deviation information pieces and thereby detecting, among the positional information pieces having not been sent yet, a positional information piece or pieces generated during a term in which the vehicle deviates from the desire route;

wherein the positional information controlling section inhibits a new positional information piece or pieces from being written into the storage area or areas storing the positional information or pieces detected by the deviation deciding section.

5. An on-vehicle apparatus comprising:

a storage device including a plurality of storage areas;

a positional information generating section for generating, at every one of a first prescribed timing, a positional information piece representing a position of the vehicle which occurs at said every one of the first prescribed timing, and for writing the generated positional information piece into one of the storage areas, wherein the positional information generating section includes a GPS receiver;

a positional information controlling section for sending positional information pieces in the storage areas to a positional information collecting apparatus at every one of a second prescribed timing, and for allowing new positional information pieces to be written into the storage areas in which the sent positional information pieces are stored; and wherein in cases where the positional information controlling section is not sending the positional information pieces in the storage areas to the positional information collecting apparatus, the positional information controlling section allows a new positional information piece or pieces to be written into one or more of the storage areas which store a positional information piece or pieces having not been sent yet;

a distance deciding section for deciding whether or not the distance between positions represented by two among the positional information pieces having not been sent yet is shorter than a prescribed threshold distance;

wherein in cases where the distance deciding section decides that the distance between the positions is not shorter than the prescribed threshold distance, the positional information controlling section inhibits new positional information pieces from being written into the storage areas storing said two among the positional information pieces having not been sent yet.

6. An on-vehicle apparatus comprising:

a storage device including a plurality of storage areas;

a positional information generating section for generating, at every one of a first prescribed timing, a positional information piece representing a position of the vehicle which occurs at said every one of the first prescribed timing, and for writing the generated positional information piece into one of the storage areas, wherein the positional information generating section includes a GPS receiver;

a positional information controlling section for sending positional information pieces in the storage areas to a positional information collecting apparatus at every one of a second prescribed timing, and for allowing new positional information pieces to be written into the storage areas in which the sent positional information pieces are stored; and wherein in cases where the positional information controlling section is not sending the positional information pieces in the storage areas to the positional information collecting apparatus, the positional information controlling section allows a new positional information piece or pieces to be written into one or more of the storage areas which store a positional information piece or pieces having not been sent yet;

a speed-related information generating section for detecting a physical quantity related to a speed of the vehicle at every one of the first prescribed timing to generate a speed-related information piece representing the detected physical quantity, and for storing the generated speed-related information piece into the storage device in a manner such that the generated speed-related information piece and a positional information piece generated at the same one of the first prescribed timing are in correspondence; and a speed-related deciding section for deciding whether or not the physical quantity represented by the generated speed-related information piece meets prescribed conditions;

wherein in cases where the speed-related deciding section decides that the physical quantity represented by the speed-related information piece does not meet the prescribed conditions, the positional information controlling section inhibits a new positional information piece from being written into one of the storage areas which stores the positional information piece corresponding to said speed-related information piece.

7. An on-vehicle apparatus as recited in claim 6, wherein ones of the first prescribed timing are spaced at constant time intervals, and the physical quantity is the speed of the vehicle.

8. An on-vehicle apparatus as recited in claim 6, wherein the physical quantity is an acceleration of the vehicle in its transverse direction.

9. An on-vehicle apparatus as recited in claim 6, wherein the speed-related information generating section detects an acceleration of the vehicle in its transverse direction twice or more during a term between adjacent two of the first prescribed timing, and adds up the detected accelerations to obtain a cumulative acceleration and labels the obtained cumulative acceleration as a physical quantity corresponding to later one of said adjacent two of the first prescribed timing.

10. An on-vehicle apparatus as recited in claim 9, wherein:

the speed-related deciding section decides whether or not the cumulative acceleration represented by the speed-related information piece meets given conditions; and in cases where the speed-related deciding section decides that the cumulative acceleration represented by the speed-related information piece meets the given conditions, the positional information controlling section inhibits a new positional information piece from being written into one of the storage areas which stores the positional information piece corresponding to said speed-related information piece.

* * * * *